(12) United States Patent
Zhang et al.

(10) Patent No.: US 12,057,990 B2
(45) Date of Patent: Aug. 6, 2024

(54) NETWORK MANAGEMENT METHOD, APPARATUS, AND SYSTEM

(71) Applicant: HUAWEI TECHNOLOGIES CO., LTD., Shenzhen (CN)

(72) Inventors: Jian Zhang, Shanghai (CN); Xiaocheng Xing, Xi'an (CN); Yulian Han, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/192,846

(22) Filed: Mar. 30, 2023

(65) Prior Publication Data
US 2023/0246900 A1 Aug. 3, 2023

Related U.S. Application Data

(63) Continuation of application No. PCT/CN2021/098670, filed on Jun. 7, 2021.

(30) Foreign Application Priority Data

Sep. 30, 2020 (CN) .......................... 202011063058.2

(51) Int. Cl.
*H04L 41/044* (2022.01)
(52) U.S. Cl.
CPC .................. *H04L 41/044* (2013.01)
(58) Field of Classification Search
CPC ........................................................ H04L 41/044
See application file for complete search history.

(56) References Cited

U.S. PATENT DOCUMENTS

2008/0270593 A1* 10/2008 Hirsch ................ H04L 41/0233
709/224
2020/0112907 A1 4/2020 Dao et al.

FOREIGN PATENT DOCUMENTS

| CN | 109391498 A | 2/2019 |
| CN | 109768875 A | 5/2019 |

(Continued)

OTHER PUBLICATIONS

3GPP TS 28.541 V16.3.0 (Dec. 2019), 3rd Generation Partnership Project; Technical Specification Group Services and System Aspects; Management and orchestration; 5G Network Resource Model (NRM); Stage 2 and stage 3 (Release 16), 327 pages.

(Continued)

*Primary Examiner* — Brian Whipple
(74) *Attorney, Agent, or Firm* — HAUPTMAN HAM, LLP

(57) ABSTRACT

A network management method includes obtaining an analysis report of a first-hierarchy managed object from a management data analytics device, or a status report of at least one second-hierarchy managed object from a second-hierarchy network management device, and indicating, based on a performance indicator requirement of the first-hierarchy managed object and the analysis report or the status report, to the second-hierarchy network management device to manage the at least one second-hierarchy managed object. A first-hierarchy network management device is connected to the second-hierarchy network management device. The first-hierarchy network management device and the second-hierarchy network management device are configured to separately manage managed objects of different hierarchies. A managed object of the managed objects is a device, a network, or a service provided by the network. The first-hierarchy managed object includes the at least one second- (Continued)

---

S401: A first-hierarchy network management device obtains an analysis report of a first-hierarchy managed object from a management data analytics device, and/or obtains a status report of at least one second-hierarchy managed object from a second-hierarchy network management device S402: The first-hierarchy network management device indicates, based on a performance indicator requirement of the first-hierarchy managed object and the analysis report and/or the status report, the second-hierarchy network management device to manage the second-hierarchy managed object hierarchy managed object or is associated with the at least one second-hierarchy managed object.

20 Claims, 9 Drawing Sheets

(56) References Cited

FOREIGN PATENT DOCUMENTS

| | | |
|---|---|---|
| CN | 110620678 A | 12/2019 |
| WO | 2020025009 A1 | 2/2020 |
| WO | 2020033424 A1 | 2/2020 |

OTHER PUBLICATIONS

3GPP TS 28.533 V16.2.0 (Dec. 2019), 3rd Generation Partnership Project; Technical Specification Group Services and System Aspects; Management and orchestration; Architecture framework (Release 16), 29 pages.
3GPP TS 28.530 V16.1.0 (Dec. 2019), 3rd Generation Partnership Project;Technical Specification Group Services and System Aspects;Management and orchestration;Concepts, use cases and requirements (Release 16), 30 pages.
3GPP TS 28.535 V1.1.0 (Mar. 2020), 3rd Generation Partnership Project;Technical Specification Group Services and System Aspects; Management and orchestration; Management Services for Communication Service Assurance; Requirements(Release 16), 17 pages.
3GPP TS 28.536 V0.2.0 (Nov. 2019), 3rd Generation Partnership Project; Technical Specification Group Services and System Aspects; Management and orchestration; Management Services for Communication Service Assurance; Stage 2 and stage 3(Release 16), 9 pages.
3GPP TR 28.809 V0.3.0 (Mar. 2020), 3rd Generation Partnership Project;Technical Specification Group Services and System Aspects; Management and orchestration; Study on enhancement of Management Data Analytics (MDA) (Release 17), 27 pages.
3GPP TR 28.801 V15.1.0 (Jan. 2018), 3rd Generation Partnership Project;Technical Specification Group Services and System Aspects;Telecommunication management;Study on management and orchestration of network slicing for next generation network (Release 15), 75 pages.
S5-201356, Ericsson, Add text for clause 4.2 Management control loops, 3GPP TSG-SA5 Meeting #129, Hyderabad, India Feb. 24-28, 2020, 4 pages.
S5-201354, Ericsson, Discussion paper around aspects on Closed Loop SLS Assurance architecture, 3GPP TSG-SA5 Meeting #129e, e-meeting, Feb. 24-Mar. 4, 2020, 7 pages.
S5-201357, Ericsson, Add control loop text for stage 2, 3GPP TSG-SA5 Meeting #129e, e-meeting, Feb. 24-Mar. 4, 2020, 7 pages.
S5-202258, Ericsson, Communication service assurance stage 2 solution, 3GPP TSG-SA5 Meeting #130e, e-meeting, Apr. 20-Apr. 29, 2020, 8 pages.
ETSI GS ZSM 002 V1.1.1 (Aug. 2019), Zero-touch network and Service Management (ZSM);Reference Architecture, 80 pages.
SA5, Presentation of Specification/Report to TSG: TS 28. 536, Version 1.0.0, 3GPP TSG SA#88E SP-200479, 3GPP, Jun. 18, 2020, total 22 pages.
SA5, Presentation of Specification/Report to TSG: TS 28. 535, Version 2.0.0, 3GPP TSG SA#88E SP-200478, 3GPP, Jun. 18, 2020, total 19 pages.
Japanese Office Action issued in corresponding Japanese Application No. 2023-519761, dated May 7, 2024, pp. 1-3.

\* cited by examiner

100

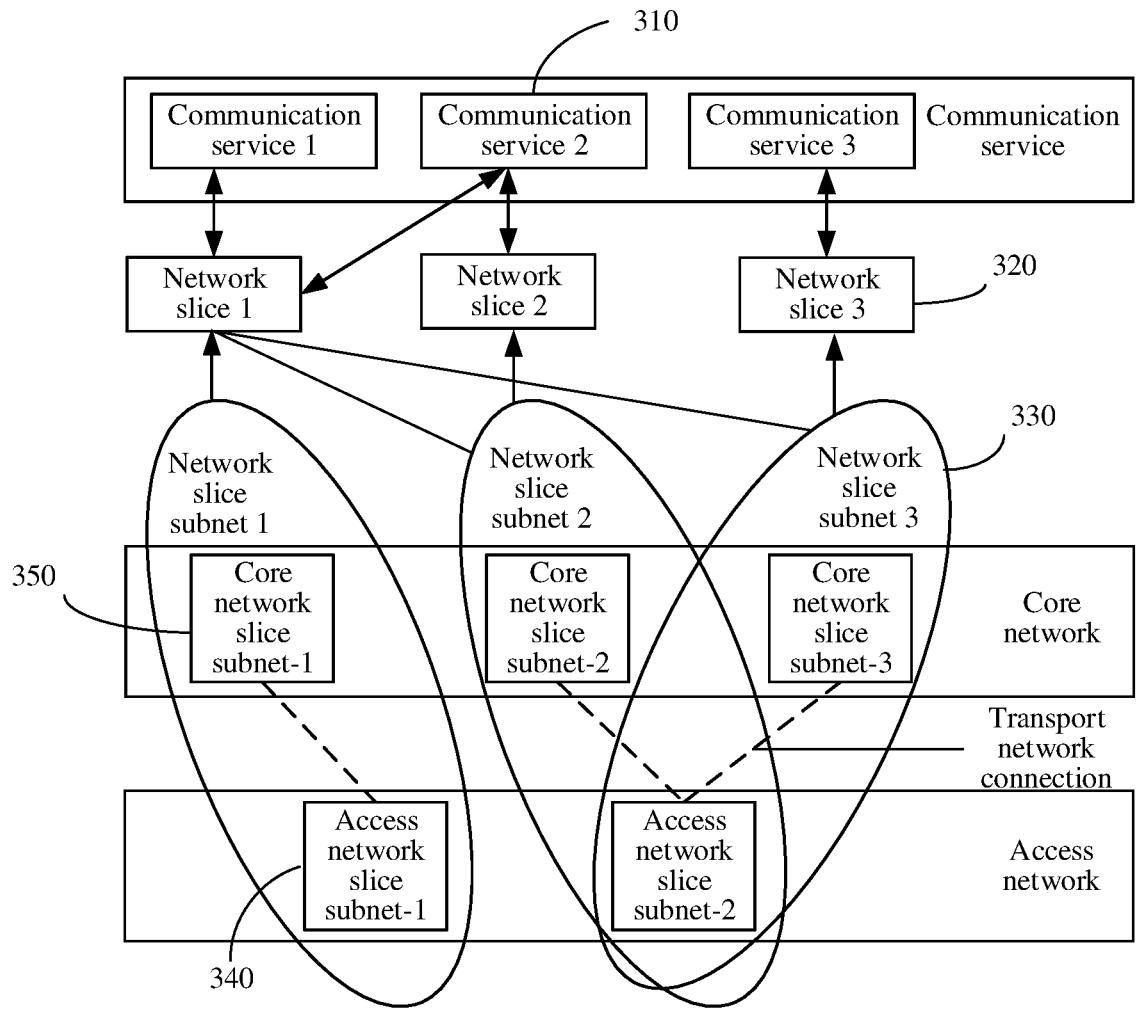

FIG. 3

S401: A first-hierarchy network management device obtains an analysis report of a first-hierarchy managed object from a management data analytics device, and/or obtains a status report of at least one second-hierarchy managed object from a second-hierarchy network management device S402: The first-hierarchy network management device indicates, based on a performance indicator requirement of the first-hierarchy managed object and the analysis report and/or the status report, the second-hierarchy network management device to manage the second-hierarchy managed object

FIG. 4

NETWORK MANAGEMENT METHOD, APPARATUS, AND SYSTEM

CROSS-REFERENCE TO RELATED APPLICATIONS

This application is a continuation of International Application No. PCT/CN2021/098670, filed on Jun. 7, 2021, which claims priority to Chinese Patent Application No. 202011063058.2, filed on Sep. 30, 2020, the disclosures of the aforementioned applications are hereby incorporated by reference in their entireties.

TECHNICAL FIELD

This application relates to the communication field, and in particular, to a network management method, apparatus, and system.

BACKGROUND

In a communication network such as a $5^{th}$ generation ($5^{th}$ generation, 5G) system, a differentiated network service may be provided for a user by using a network slice (network slice, NS). A network slice is a logical network that has a specific network capability and a specific network attribute. One network slice may include a plurality of subnets, such as a radio access network (radio access network, RAN) subnet (subnet), a transport network (transport network, TN) subnet, and a core network (core network, CN) subnet. Specifically, a network management device may configure a managed network based on a service requirement of the user, to establish a network slice instance (network Slice instance, NSI), so as to provide the differentiated network service for the user.

However, because a usage status of the communication network changes rapidly, after the managed network is configured based on a requirement on a performance indicator (for example, a maximum quantity of pieces of user equipment, a maximum quantity of connections, a delay, a delay tolerance, and a throughput), a performance indicator actually achieved by the managed network does not necessarily match the specified performance indicator requirement. Due to a change of a service (for example, a change of a quantity of concurrent users) and a change of a network status (for example, a change of a working status of a device or a network slice), the actual performance indicator of the managed network may exceed the specified performance indicator requirement, and this wastes a network resource of an operator; or may be lower than the specified performance indicator requirement, and this causes service loss and degrades service experience of the user. Therefore, how to eliminate or reduce a difference between the actual performance indicator and the specified performance indicator requirement that are of the managed network, improve consistency between the two, and ensure both a satisfaction degree of a service level agreement (service level agreement, SLA) between the operator and the user and utilization of the network resource of the operator is a technical problem that urgently needs to be resolved.

SUMMARY

One or more embodiments of the present application provide a network management method, apparatus, and system, to eliminate or reduce a difference between an actual performance indicator and a specified performance indicator requirement that are of a managed network, improve consistency between the two, and ensure both a satisfaction degree of an SLA between an operator and a user and network resource utilization of the operator.

To achieve the foregoing objective, one or more embodiments of the present application use the following technical solutions.

According to a first aspect, a network management method is provided. The method is applied to a first-hierarchy network management device. The first-hierarchy network management device is connected to a second-hierarchy network management device, the first-hierarchy network management device and the second-hierarchy network management device separately manage managed objects at different hierarchies, and the managed object is a device, a network, or a service provided by the network. The method includes: obtaining an analysis report of a first-hierarchy managed object from a management data analytics device, and/or obtaining a status report of at least one second-hierarchy managed object from the second-hierarchy network management device; and indicating, based on a performance indicator requirement of the first-hierarchy managed object and the analysis report and/or the status report, the second-hierarchy network management device to manage the second-hierarchy managed object. The first-hierarchy managed object includes the at least one second-hierarchy managed object or is associated with the at least one second-hierarchy managed object. The analysis report includes information related to a performance indicator of the first-hierarchy managed object and/or resource information of the first-hierarchy managed object. The status report includes one or more of the following: analysis data that is information related to a performance indicator of the at least one second-hierarchy managed object and/or resource information of the at least one second-hierarchy managed object; decision data that is a management operation that is decided by the second-hierarchy network management device and that is to be performed on the second-hierarchy managed object; or execution data that is a management operation that is performed by the second-hierarchy network management device on the second-hierarchy managed object based on the decision data, and an execution result thereof.

According to the network management method in the first aspect, the first-hierarchy network management device may determine a network configuration difference based on the performance indicator requirement of the first-hierarchy managed object managed by the first-hierarchy network management device, and the analysis report of the first-hierarchy managed object and/or the status report of the second-hierarchy managed object included in or associated with the first-hierarchy managed object, and then manage the second-hierarchy managed object based on the network configuration difference, to eliminate or reduce the network configuration difference. In this way, a difference between an actual performance indicator and the specified performance indicator requirement that are of the first-hierarchy managed object is eliminated or reduced, consistency between the two is improved, and both a satisfaction degree of the performance indicator requirement of the first-hierarchy managed object and utilization of a network resource allocated to the first-hierarchy managed object are ensured.

In some embodiments, the indicating, based on a performance indicator requirement of the first-hierarchy managed object and the analysis report and/or the status report, the second-hierarchy network management device to manage the second-hierarchy managed object may include: generating management indication information based on the performance indicator requirement of the first-hierarchy managed object and the analysis report and/or the status report; and sending the management indication information to the second-hierarchy network management device. The management indication information includes any one of the following: configuration operation information, including a configuration operation to be performed on the second-hierarchy managed object; configuration requirement information, including a configuration requirement for the second-hierarchy managed object; or performance indicator requirement information, including a performance indicator requirement for the second-hierarchy managed object. In this way, a network slice management service device may dynamically manage a network configuration of a network slice, to meet an SLA requirement of the network slice, and may indicate a network slice subnet management service device to correspondingly manage a network configuration of a network slice subnet, to ensure that a managed network configuration of the network slice subnet matches the network configuration of the network slice, thereby improving reliability and efficiency of a network service at a hierarchy of a network slice and a network slice subnet.

In some embodiments, the management indication information may include the configuration operation information. The configuration operation information includes any one or more of the following: adding a second-hierarchy managed object; deleting a second-hierarchy managed object; or modifying configuration information of a second-hierarchy managed object.

Further, the generating management indication information based on the performance indicator requirement of the first-hierarchy managed object and the analysis report and/or the status report may include: determining a network configuration difference based on the performance indicator requirement of the first-hierarchy managed object and the analysis report and/or the status report, and generating the management indication information based on the network configuration difference. The network configuration difference may be a difference between the at least one second-hierarchy managed object and at least one second-hierarchy managed object that needs to be included in or needs to be associated with the first-hierarchy managed object and that is determined based on the performance indicator requirement and the analysis report and/or the status report.

Alternatively, the generating management indication information based on the performance indicator requirement of the first-hierarchy managed object and the analysis report and/or the status report may include: determining a performance indicator difference based on the performance indicator requirement of the first-hierarchy managed object and the analysis report and/or the status report, and generating the management indication information based on the performance indicator difference. The performance indicator difference is a difference between a measurement result of a performance indicator of the first-hierarchy managed object and the performance indicator requirement of the first-hierarchy managed object.

In some embodiments, the sending the management indication information to the second-hierarchy network management device may include: sending a closed-loop control management message to the second-hierarchy network management device, where the closed-loop control management message includes the management indication information.

In some embodiments, the obtaining an analysis report of a first-hierarchy managed object from a management data analytics device may include: sending an analysis report subscription request message to the management data analytics device, and receiving an analysis report notification message from the management data analytics device, where the analysis report subscription request message may include an identifier of the first-hierarchy managed object, and the analysis report notification message may include the analysis report; or sending an analysis report request message to the management data analytics device, and receiving an analysis report response message from the management data analytics device, where the analysis report request message may include an identifier of the first-hierarchy managed object, and the analysis report response message may include the analysis report.

In some embodiments, the information related to the performance indicator of the first-hierarchy managed object may be statistics information or prediction information of a measured value of the performance indicator of the first-hierarchy managed object, or a difference between the measurement result of the performance indicator of the first-hierarchy managed object and the performance indicator requirement of the first-hierarchy managed object. The resource information of the first-hierarchy managed object may be statistics information or prediction information of a remaining resource amount of the first-hierarchy managed object, or statistics information or prediction information of resource utilization of the first-hierarchy managed object.

Further, the information related to the performance indicator of the first-hierarchy managed object may include any one or more of the following: throughput statistics data of the first-hierarchy managed object, throughput prediction data of the first-hierarchy managed object, throughput distribution data of the first-hierarchy managed object, throughput requirement analysis data of the first-hierarchy managed object, an average delay of the first-hierarchy managed object, a maximum delay of the first-hierarchy managed object, a minimum delay of the first-hierarchy managed object, a delay jitter of the first-hierarchy managed object, a delay tolerance of a service of the first-hierarchy managed object, a packet delay budget of a service of the first-hierarchy managed object, a moving speed supported by the first-hierarchy managed object, a maximum packet loss rate of the first-hierarchy managed object, an average packet loss rate of the first-hierarchy managed object, a minimum packet loss rate of the first-hierarchy managed object, a maximum packet length of the first-hierarchy managed object, positioning precision supported by the first-hierarchy managed object, a synchronization precision level supported by the first-hierarchy managed object, an energy efficiency level supported by the first-hierarchy managed object, a resource allocation priority of the first-hierarchy managed object, or a resource allocation priority of each of the at least one second-hierarchy managed object. The resource information of the first-hierarchy managed object includes any one or more of the following: a resource isolation level of the first-hierarchy managed object, analysis information of a resource of the first-hierarchy managed object, analysis information of a resource of the at least one second-hierarchy managed object, or analysis information of a configuration parameter of the at least one second-hierarchy managed object. That is, the network slice management service device may dynamically manage, based on a throughput-related and/or delay-related analysis report provided by a network analytics device, a throughput-related and/or delay-related network configuration, to meet a throughput-related and/or delay-related SLA requirement.

In some embodiments, the obtaining a status report of at least one second-hierarchy managed object from the second-hierarchy network management device may include: sending an operations and maintenance status request message to the second-hierarchy network management device, and receiving an operations and maintenance status response message from the second-hierarchy network management device, where the operations and maintenance status request message may include an identifier of the at least one second-hierarchy managed object, and the operations and maintenance status response message may include the status report; or sending an operations and maintenance status subscription request message to the second-hierarchy network management device, and receiving an operations and maintenance status notification message from the second-hierarchy network management device, where the operations and maintenance status subscription request message may include an identifier of the at least one second-hierarchy managed object, and the operations and maintenance status notification message may include the status report.

Further, the status report may include analysis data. The analysis data may include one or more of the following: a mapping relationship between throughput distribution and service experience of the at least one second-hierarchy managed object, a difference between an actual throughput and a target throughput of the at least one second-hierarchy managed object and a cause, or information about a service that is carried by the at least one second-hierarchy managed object and whose throughput is unqualified. Alternatively, the status report may include decision data. The decision data may include one or more of the following: a throughput control policy of the at least one second-hierarchy managed object, management behavior for the at least one second-hierarchy managed object, or resource or parameter configuration information. Alternatively, the status report may include execution data. The execution data may include one or more of the following: management behavior executed by the second-hierarchy network management device, a resource or parameter configuration quantity, or an execution result.

In some embodiments, the first-hierarchy network management device may be a network slice management service device, the first-hierarchy managed object may be a network slice, the second-hierarchy network management device may be a network slice subnet management service device, and the second-hierarchy managed object may be a network slice subnet.

In some embodiments, the first-hierarchy network management device may be a network slice subnet management service device, the first-hierarchy managed object may be a network slice subnet, the second-hierarchy network management device may be a management device of a network element in the network slice subnet, and the second-hierarchy managed object may be a device in the network slice subnet.

In some embodiments, the first-hierarchy network management device may be a communication service management service device, the first-hierarchy managed object may be a communication service or a communication service instance, the second-hierarchy network management device may be a network slice management service device, and the second-hierarchy managed object may be a network slice management service.

According to a second aspect, a network management apparatus is provided. The apparatus is used in a first-hierarchy network management device. The first-hierarchy network management device is connected to a second-hierarchy network management device, the first-hierarchy network management device and the second-hierarchy network management device separately manage managed objects at different hierarchies, and the managed object is a device, a network, or a service provided by the network. The apparatus includes: a processing module and a transceiver module. The transceiver module is configured to: obtain an analysis report of a first-hierarchy managed object from a management data analytics device, and/or obtain a status report of at least one second-hierarchy managed object from the second-hierarchy network management device. The processing module is configured to indicate, based on a performance indicator requirement of the first-hierarchy managed object and the analysis report and/or the status report, the second-hierarchy network management device to manage the second-hierarchy managed object. The first-hierarchy managed object includes the at least one second-hierarchy managed object or is associated with the at least one second-hierarchy managed object. The analysis report includes information related to a performance indicator of the first-hierarchy managed object and/or resource information of the first-hierarchy managed object. The status report includes one or more of the following: analysis data that is information related to a performance indicator of the at least one second-hierarchy managed object and/or resource information of the at least one second-hierarchy managed object; decision data that is a management operation that is decided by the second-hierarchy network management device and that is to be performed on the second-hierarchy managed object; or execution data that is a management operation that is performed by the second-hierarchy network management device on the second-hierarchy managed object based on the decision data, and an execution result thereof.

In some embodiments, the processing module is further configured to generate management indication information based on the performance indicator requirement of the first-hierarchy managed object and the analysis report and/or the status report. The transceiver module is further configured to send the management indication information to the second-hierarchy network management device. The management indication information includes any one of the following: configuration operation information, including a configuration operation to be performed on the second-hierarchy managed object; configuration requirement information, including a configuration requirement for the second-hierarchy managed object; or performance indicator requirement information, including a performance indicator requirement for the second-hierarchy managed object.

In some embodiments, the management indication information may include the configuration operation information. The configuration operation information includes any one or more of the following: adding a second-hierarchy managed object; deleting a second-hierarchy managed object; or modifying configuration information of a second-hierarchy managed object.

In some embodiments, the processing module is further configured to: determine a network configuration difference based on the performance indicator requirement of the first-hierarchy managed object and the analysis report and/or the status report, and generate the management indication information based on the network configuration difference. The network configuration difference may be a difference between the at least one second-hierarchy managed object and at least one second-hierarchy managed object that needs to be included in or needs to be associated with the first-hierarchy managed object and that is determined based on the performance indicator requirement and the analysis report and/or the status report.

Alternatively, in some embodiments, the processing module is further configured to: determine a performance indicator difference based on the performance indicator requirement of the first-hierarchy managed object and the analysis report and/or the status report, and generate the management indication information based on the performance indicator difference. The performance indicator difference is a difference between a measurement result of the performance indicator of the first-hierarchy managed object and the performance indicator requirement of the first-hierarchy managed object.

In some embodiments, the transceiver module is further configured to send a closed-loop control management message to the second-hierarchy network management device, where the closed-loop control management message includes the management indication information.

In some embodiments, the transceiver module is further configured to: send an analysis report subscription request message to the management data analytics device, and receive an analysis report notification message from the management data analytics device. The analysis report subscription request message may include an identifier of the first-hierarchy managed object, and the analysis report notification message may include the analysis report.

In some embodiments, the transceiver module is further configured to: send an analysis report request message to the management data analytics device, and receive an analysis report response message from the management data analytics device. The analysis report request message may include an identifier of the first-hierarchy managed object, and the analysis report response message may include the analysis report.

In some embodiments, the information related to the performance indicator of the first-hierarchy managed object may be statistics information or prediction information of a measured value of the performance indicator of the first-hierarchy managed object, or a difference between the measurement result of the performance indicator of the first-hierarchy managed object and the performance indicator requirement of the first-hierarchy managed object. The resource information of the first-hierarchy managed object may be statistics information or prediction information of a remaining resource amount of the first-hierarchy managed object, or statistics information or prediction information of resource utilization of the first-hierarchy managed object.

Further, the information related to the performance indicator of the first-hierarchy managed object may include any one or more of the following: throughput statistics data of the first-hierarchy managed object, throughput prediction data of the first-hierarchy managed object, throughput distribution data of the first-hierarchy managed object, throughput requirement analysis data of the first-hierarchy managed object, an average delay of the first-hierarchy managed object, a maximum delay of the first-hierarchy managed object, a minimum delay of the first-hierarchy managed object, a delay jitter of the first-hierarchy managed object, a delay tolerance of a service of the first-hierarchy managed object, a packet delay budget of a service of the first-hierarchy managed object, a moving speed of a user of the first-hierarchy managed object, a maximum packet loss rate of the first-hierarchy managed object, an average packet loss rate of the first-hierarchy managed object, a minimum packet loss rate of the first-hierarchy managed object, a maximum packet length of the first-hierarchy managed object, positioning precision supported by the first-hierarchy managed object, a synchronization precision level supported by the first-hierarchy managed object, an energy efficiency level supported by the first-hierarchy managed object, a resource allocation priority of the first-hierarchy managed object, or a resource allocation priority of each of the at least one second-hierarchy managed object. The resource information of the first-hierarchy managed object includes any one or more of the following: a resource isolation level of the first-hierarchy managed object, analysis information of a resource of the first-hierarchy managed object, analysis information of a resource of the at least one second-hierarchy managed object, or analysis information of a configuration parameter of the at least one second-hierarchy managed object. That is, the network slice management service device may dynamically manage, based on a throughput-related and/or delay-related analysis report provided by a network analytics device, a throughput-related and/or delay-related network configuration, to meet a throughput-related and/or delay-related SLA requirement.

In some embodiments, the transceiver module is further configured to: send an operations and maintenance status request message to the second-hierarchy network management device, and receive an operations and maintenance status response message from the second-hierarchy network management device. The operations and maintenance status request message may include an identifier of the at least one second-hierarchy managed object, and the operations and maintenance status response message may include the status report.

In some embodiments, the transceiver module is further configured to: send an operations and maintenance status subscription request message to the second-hierarchy network management device, and receive an operations and maintenance status notification message from the second-hierarchy network management device. The operations and maintenance status subscription request message may include an identifier of the at least one second-hierarchy managed object, and the operations and maintenance status notification message may include the status report.

In some embodiments, the status report may include analysis data. The analysis data may include one or more of the following: a mapping relationship between throughput distribution and service experience of the at least one second-hierarchy managed object, a difference between an actual throughput and a target throughput of the at least one second-hierarchy managed object and a cause, or information about a service that is carried by the at least one second-hierarchy managed object and whose throughput is unqualified. Alternatively, the status report may include decision data. The decision data may include one or more of the following: a throughput control policy of the at least one second-hierarchy managed object, management behavior for the at least one second-hierarchy managed object, or resource or parameter configuration information. Alternatively, the status report may include execution data. The execution data may include one or more of the following: management behavior executed by the second-hierarchy network management device, a resource or parameter configuration quantity, or an execution result.

In some embodiments, the first-hierarchy network management device may be a network slice management service device, the first-hierarchy managed object may be a network slice, the second-hierarchy network management device may be a network slice subnet management service device, and the second-hierarchy managed object may be a network slice subnet. In this way, network slice-level closed-loop control can be implemented.

In some embodiments, the first-hierarchy network management device may be a network slice subnet management service device, the first-hierarchy managed object may be a network slice subnet, the second-hierarchy network management device may be a management device of a network element in the network slice subnet, and the second-hierarchy managed object may be a device in the network slice subnet. In this way, network slice subnet-level closed-loop control can be implemented.

In some embodiments, the first-hierarchy network management device may be a communication service management service device, the first-hierarchy managed object may be a communication service or a communication service instance, the second-hierarchy network management device may be a network slice management service device, and the second-hierarchy managed object may be a network slice management service. In this way, communication service-level closed-loop control can be implemented.

In some embodiments, the transceiver module may include a receiving module and a sending module. The receiving module is configured to receive information sent by a managed object or another network management device, and the sending module is configured to send information to the managed object or the another network management device.

In some embodiments, the network management apparatus in the second aspect may further include a storage module, and the storage module stores a program or instructions. When the processing module executes the program or the instructions, the network management apparatus in the second aspect is enabled to perform the network management method in the first aspect.

It should be noted that the network management apparatus according to the second aspect may be a network management device, for example, an operations, administration, and maintenance (operations, administration, and maintenance, OAM) device, a business support system (business support system, BSS) device, or an operations support system (operations support system, OSS) device, or may be a chip (system) or another component or assembly that may be disposed in the network management device, or may be an apparatus including the network management device. This is not limited in this application.

In addition, for a technical effect of the network management apparatus provided in the second aspect, refer to the technical effect of the network management method provided in the first aspect. Details are not described herein again.

According to a third aspect, a network management apparatus is provided. The network management apparatus is configured to perform the network management method according to any one of the possible implementations of the first aspect.

It should be noted that the network management apparatus in the third aspect may be a network management device, such as an OAM device, a BSS device, or an OSS device, or may be a chip (system) or another component or assembly that may be disposed in the network management device, or may be an apparatus including the network management device. This is not limited in this application.

In addition, for a technical effect of the network management apparatus provided in the third aspect, refer to the technical effect of the network management method provided in the first aspect. Details are not described herein again.

According to a fourth aspect, a network management apparatus is provided. The network management apparatus includes a processor, and the processor is configured to perform the network management method according to any possible implementation of the first aspect.

It should be noted that the network management apparatus in the fourth aspect may be a network management device, such as an OAM device, a BSS device, or an OSS device, or may be a chip (system) or another component or assembly that may be disposed in the network management device, or may be an apparatus including the network management device. This is not limited in this application.

In addition, for a technical effect of the network management apparatus provided in the fourth aspect, refer to the technical effect of the network management method provided in the first aspect. Details are not described herein again.

According to a fifth aspect, a network management apparatus is provided and includes a processor. The processor is coupled to a memory. The processor is configured to execute a computer program stored in the memory, to enable the network management apparatus according to the fifth aspect to perform the network management method according to any one of the possible implementations of the first aspect.

It should be noted that the network management apparatus in the fifth aspect may be a network management device, such as an OAM device, a BSS device, or an OSS device, or may be a chip (system) or another component or assembly that may be disposed in the network management device, or may be an apparatus including the network management device. This is not limited in this application.

In addition, for a technical effect of the network management apparatus provided in the fifth aspect, refer to the technical effect of the network management method provided in the first aspect. Details are not described herein again.

According to a sixth aspect, a network management apparatus is provided, and includes a processor and an interface circuit. The interface circuit is configured to receive code instructions and transmit the code instructions to the processor. The processor is configured to run the code instructions to perform the network management method according to any possible implementation of the first aspect.

It should be noted that the network management apparatus in the sixth aspect may be a network management device, such as an OAM device, a BSS device, or an OSS device, or may be a chip (system) or another component or assembly that may be disposed in the network management device, or may be an apparatus including the network management device. This is not limited in this application.

In addition, for a technical effect of the network management apparatus provided in the sixth aspect, refer to the technical effect of the network management method provided in the first aspect. Details are not described herein again.

According to a seventh aspect, a network management apparatus is provided. The network management apparatus includes a processor and a transceiver. The transceiver is configured to exchange information between the network management apparatus and another network management apparatus, and the processor executes program instructions to perform the network management method according to any possible implementation of the first aspect.

It should be noted that the network management apparatus in the seventh aspect may be a network management device, such as an OAM device, a BSS device, or an OSS device, or may be a chip (system) or another component or assembly that may be disposed in the network management device, or may be an apparatus including the network management device. This is not limited in this application.

In addition, for a technical effect of the network management apparatus provided in the seventh aspect, refer to the technical effect of the network management method provided in the first aspect. Details are not described herein again.

According to an eighth aspect, a processor is provided. The processor is configured to perform the network management method according to any possible implementation of the first aspect.

According to a ninth aspect, a network management system is provided. The network management system includes a first-hierarchy network management device and a second-hierarchy network management device. The first-hierarchy network management device is configured to obtain an analysis report and/or a status report associated with a managed object, and indicate, based on the analysis report and/or the status report, the second-hierarchy network management device to manage configuration information associated with the managed object. The managed object is a physical network and/or a logical network managed by the first-hierarchy network management device, the analysis report includes characteristic information of an operations and maintenance status of the managed object, and the status report includes information about an operations and maintenance status and/or an operations and maintenance operation associated with the managed object. The second-hierarchy network management device is configured to manage, based on the indication of the first-hierarchy network management device, the configuration information associated with the managed object.

According to a tenth aspect, a computer-readable storage medium is provided. The computer-readable storage medium includes a computer program or instructions. When the computer program or the instructions are run on a computer, the computer is enabled to perform the network management method according to any possible implementation of the first aspect.

According to an eleventh aspect, a computer program product is provided. The computer program product includes a computer program or instructions. When the computer program or the instructions are run on a computer, the computer is enabled to perform the network management method according to any possible implementation of the first aspect.

BRIEF DESCRIPTION OF DRAWINGS

FIG. 3 is a schematic diagram of a relationship between managed objects at different hierarchies according to an embodiment of this application;

FIG. 4 is a schematic flowchart 1 of a network management method according to an embodiment of this application;

DETAILED DESCRIPTION

Figure 1:
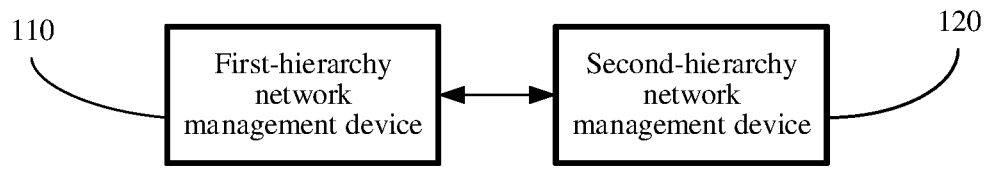
FIG. 1 is a schematic architectural diagram 1 of a network management system according to an embodiment of this application.

The following describes technical solutions of this application with reference to accompanying drawings. In the descriptions of this application, unless otherwise specified, "a plurality of" means two or more than two. In addition, to clearly describe the technical solutions in embodiments of this application, terms such as first and second are used in embodiments of this application to distinguish between same items or similar items that provide basically same functions or purposes. A person skilled in the art may understand that words such as "first", "second", or the like does not limit a quantity and a performing sequence, and words such as "first", "second", or the like are not limited to be necessarily different.

The technical solutions in embodiments of this application may be applied to various network management systems, for example, a wireless fidelity (wireless fidelity, Wi-Fi) system, a vehicle to everything (vehicle to everything, V2X) network management system, a device-to-device (device-to-device, D2D) network management system, an Internet of Vehicles network management system, a fifth generation ($5^{th}$ generation, 5G) mobile network management system, such as a new radio (new radio, NR) system, and a future network management system, such as a sixth generation ($6^{th}$ generation, 6G) mobile network management system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

In embodiments of this application, "of (of)", "corresponding (corresponding, relevant)", "associate (associate) ", and "corresponding (corresponding)" may be interchangeably used sometimes. It should be noted that meanings expressed by the terms are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to a similar technical problem.

Figure 2:
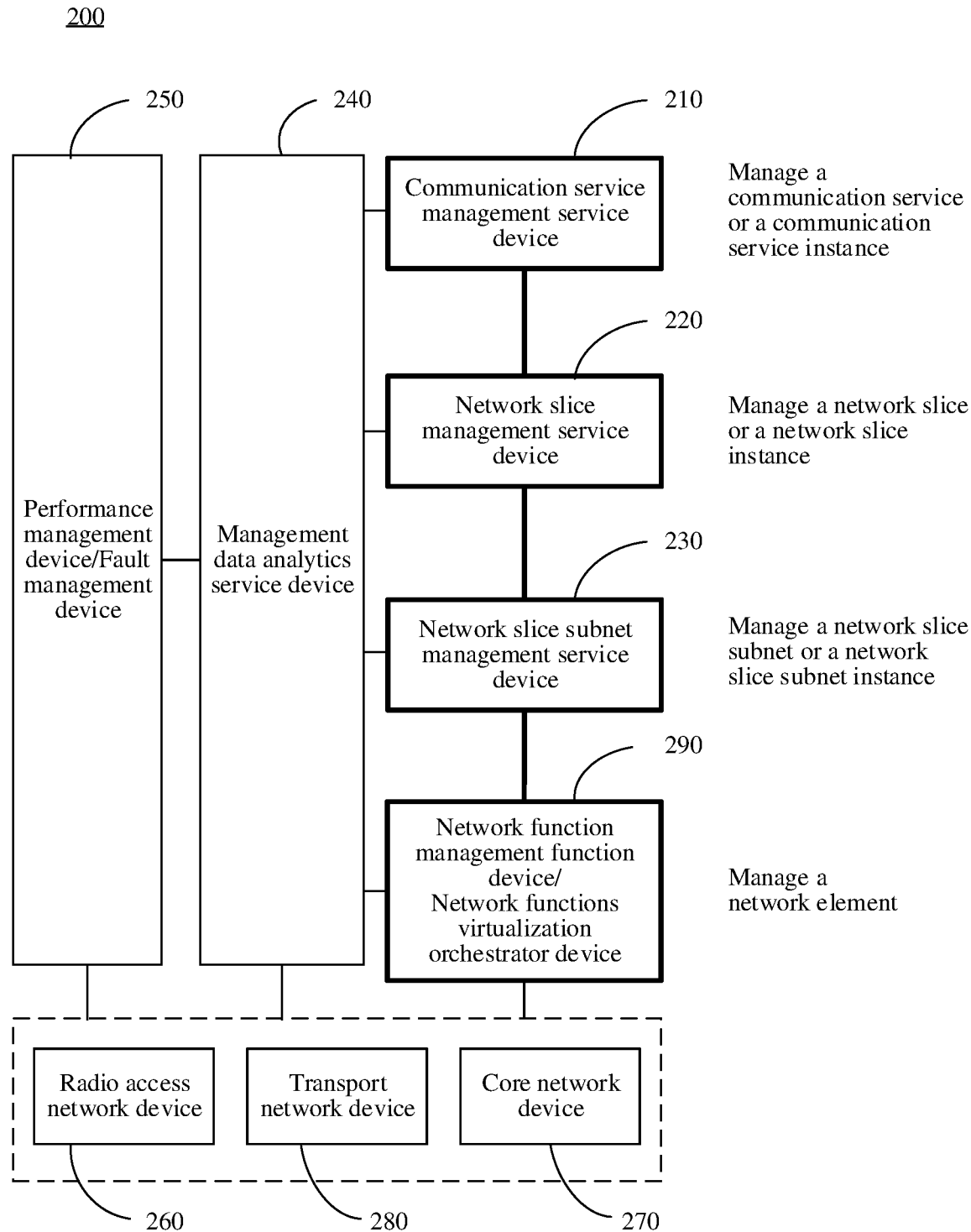
FIG. 2 is a schematic architectural diagram 2 of a network management system according to an embodiment of this application.

For ease of understanding embodiments of this application, network management systems shown in FIG. 1 and FIG. 2 are used as examples to describe in detail a network management system to which an embodiment of this application is applicable.

FIG. 1 is a schematic architectural diagram of a network management system to which a network management method is applicable according to an embodiment of this application. As shown in FIG. 1, the network management system 100 includes a first-hierarchy network management device 110 and a second-hierarchy network management device 120. The first-hierarchy network management device 110 is connected to the second-hierarchy network management device 120, and the first-hierarchy network management device 110 and the second-hierarchy network management device 120 separately manage managed objects at different hierarchies. The managed object may be a device (or network element), a network, or a service provided by the network. The network may be a physical network, or may be a logical network, for example, a network slice.

The first-hierarchy network management device 110 and the second-hierarchy network management device 120 are connected to each other, and manage network configurations through information exchange, so as to improve consistency between an actual performance indicator and a performance indicator requirement that are of a managed network. Functions of the first-hierarchy network management device 110 and functions of the second-hierarchy network management device 120 may be deployed on a same physical device (where in this case, the first-hierarchy network management device 110 and the second-hierarchy network management device 120 are functional modules in the physical device), or may be deployed on different physical devices. This is not specifically limited in this embodiment of this application.

When the first-hierarchy network management device 110 is a communication service management service (communication service management service, CSMS) device, the second-hierarchy network management device 120 may be a network slice management service (network slice management service, NSMS) device.

When the first-hierarchy network management device 110 is a network slice management service device, the second-hierarchy network management device 120 may be a network slice subnet management service (network slice subnet management service, NSSMS) device.

When the first-hierarchy network management device 110 is a network slice subnet management service device, the second-hierarchy network management device 120 may be a management device of a network element in a network slice subnet. The management device of the network element may be a network function management function (network function management function, NFMF) device/ network functions virtualization orchestration (network functions virtualization orchestration, NFVO) device 290.

FIG. 2 is a schematic architectural diagram 2 of a network management system to which a network management method is applicable according to an embodiment of this application. As shown in FIG. 2, the network management system 200 may include one or more of the following: a communication service management service device 210, a network slice management service device 220, a network slice subnet management service device 230, a management data analytics device 240, a performance management (performance management, PM) device/fault management (fault management, FM) device 250, a radio access network (radio access network, RAN) device 260, a core network (core network, CN) device 270, or a transport network (transport network, TN) device 280.

The communication service management service device 210 may also be referred to as a communication service management service producer (CSMS producer), a communication service management service provider (CSMS provider), a communication service management function (communication service management function, CSMF) device, or a communication service management device, to perform communication service closed-loop control (communication service closed-loop control) or communication service instance closed-loop control (communication service instance closed-loop control).

The network slice management service device 220 may also be referred to as a network slice management service producer (NSMS producer), a network slice management service provider (NSMS provider), a network slice management function (network slice management function, NSMF) device, or a network slice management device, and is configured to perform network slice closed-loop control (network slice closed-loop control) or network slice instance closed-loop control (network slice instance closed-loop control).

The network slice subnet management service device 230 may also be referred to as a network slice subnet management service producer (NSSMS producer), a network slice subnet management service provider (NSSMS provider), a network slice subnet management function (network slice subnet management function, NSSMF) device, or a network slice subnet management device, and is configured to perform network slice subnet closed-loop control (network slice subnet closed-loop control) or network slice subnet instance closed-loop control (network slice subnet instance closed-loop control).

The communication service closed-loop control and the network slice closed-loop control are end-to-end (end-to-end, E2E) closed-loop control, and the network slice subnet closed-loop control is domain-level closed-loop control (domain-level closed-loop control), namely, subnet-level closed-loop control (subnet-level closed-loop control).

It should be noted that a communication service may also be referred to as a communication service instance, a network slice may also be referred to as a network slice instance, and a network slice subnet may also be referred to as a network slice subnet instance.

The management data analytics device 240 may also be referred to as a management data analytics service (management data analytics service, MDAS) device, a management data analytics service producer (MDAS producer), a management data analytics service provider (MDAS provider), or a management data analytics function (management data analytics function, MDAF) device, and is configured to collect performance/alarm data of a network slice subnet in each of network domains via a performance management device/fault management device, and aggregate the performance/alarm data at different hierarchies such as a communication service, a network slice, and a network slice subnet, to obtain aggregated performance information and alarm information, and provides the information for a network management device at a corresponding hierarchy. It should be understood that a function of the management data analytics device may be independently deployed in a physical device, or may be deployed in combination with another functional device. For example, the management data analytics device may be deployed in combination with a network management device at any hierarchy in embodiments of this application (where in this case, the management data analytics device is an internal functional module of the network management device at the hierarchy).

One network slice may include one or more network slice subnets, for example, an access network slice subnet (RAN NSSI), a core network slice subnet (CN NSSI), and a transport network slice subnet (TN NSSI). In other words, one network slice is an end-to-end logical network slice including network slice subnets of a plurality of domains. A resource part of a communication service is mapped to a network slice, and is a communication service/communication service instance provided by a network slice instance for one or more tenants. All of the foregoing entities or instances may be managed objects.

It should be noted that the foregoing various "producers" may also be "consumers", and use services provided by other "producers".

A managed object refers to one of the following items managed by a network management device: a physical network, a service provided by a physical network, a logical network, a service provided by a logical network, a component (such as a device or a network element) of a physical network and a logical network, or a service provided by a component of a physical network and a logical network. For ease of description, a managed object managed by the first-hierarchy network management device 110 is referred to as a first-hierarchy managed object, and a managed object managed by the second-hierarchy network management device 120 is referred to as a second-hierarchy managed object. Specifically, the managed object may be one of the following items: a communication service instance, a subnet (subnet), a network slice, a network slice subnet, a communication service, a device, and a network element. In some embodiments, relative to the network management device, the managed object may also be referred to as a managed network, a managed network entity (managed entity), a managed logical network (managed logical network), a managed network device, or the like. Similarly, compared with the managed object, the network management device may also be referred to as a management entity or a management node (management Node). This is not specifically limited in embodiments of this application. The following Table 1 lists the network management device and the corresponding managed object.

TABLE 1

| Hierarchy | Network management device | Managed object |
| --- | --- | --- |
| Communication service-level | Communication service management service device | Communication service instance or communication service (for a ToB or ToC user) |
| Network slice-level | Network slice management service device | Network slice or network slice instance |
| Network slice subnet-level | Network slice subnet management service device | Network slice subnet (including that in a radio access network domain, a core network domain, and a transport network domain) or network slice subnet instance |
| Network element-level or network function-level | Network element or network function management device | Network element or network function or device |

TABLE 2

| Hierarchy of closed-loop control | First-hierarchy network management device | First-hierarchy managed object | Second-hierarchy network management device | Second-hierarchy managed object |
| --- | --- | --- | --- | --- |
| Communication service closed-loop control/Communication service instance closed-loop control | CSMS device | Communication service or communication service instance | NSMS device | Network slice |
| Network slice closed-loop control/Network slice instance closed-loop control | NSMS device | Network slice | NSSMS device | Network slice subnet |
| Network slice subnet closed-loop control/Network slice subnet instance closed-loop control | NSSMS device | Network slice subnet | NFMF device or NFVO device | Network element or network function or device |

As shown in Table 1, the communication service or the communication service instance is a managed object of the communication service management service device, the network slice or the network slice instance is a managed object of the network slice management service device, and the network slice subnet or the network slice subnet instance is a managed object of the network slice subnet management service device. The network slice subnet includes a network slice subnet of the radio access network domain, a network slice subnet of the core network domain, and a network slice subnet of the transport network domain.

For example, in this embodiment of this application, specific content of the first-hierarchy network management device, the first-hierarchy managed object, the second-hierarchy network management device, and the second-hierarchy managed object under different hierarchies of closed-loop control may be shown in Table 2.

For ease of description, in embodiments of this application, the communication service management service device, the CSMS device, the CSMF device, the communication service management service producer, the communication service management service provider, and the communication service management device are collectively referred to as a communication service management service device; the network slice management service device, the NSMS device, the NSMF device, the network slice management service producer, and the network slice management service provider are collectively referred to as a network slice management service device; the network slice subnet management service device, the NSSMS device, the NSSMF device, the network slice subnet management service producer, and the network slice subnet management service provider are collectively referred to as a network slice subnet management service device; and the management data analytics service device, the MDAS device, the management data analytics function device, the MDAF device, the management data analytics service producer, and the management data analytics service provider are collectively referred to as a management data analytics device.

The device in the foregoing access network slice subnet is referred to as an access network device, may be a device with a wireless transceiver function, or a chip or a chip system that may be disposed in the device, and includes: an access point (access point, AP), for example, a home gateway, a router, a server, a switch, or a network bridge, in a wireless fidelity (wireless fidelity, Wi-Fi) system, an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), a baseband unit (baseband unit, BBU), a wireless relay node, a wireless backhaul node, a transmission point (transmission reception point, TRP or transmission point, TP), or the like; may be a gNB or a transmission point (TRP or TP) in a 5G system, for example, a new radio (new radio, NR) system, or one antenna panel or a group of antenna panels (including a plurality of antenna panels) of a base station in a 5G system; or may be a network node, for example, a baseband unit (BBU) or a distributed unit (distributed unit, DU), included in a gNB or a transmission point, a road side unit (road side unit, RSU) having a base station function, or the like.

The device in the foregoing core network slice subnet is referred to as a core network device, for example, an access and mobility management function (access and mobility management function, AMF) device, a session management function (session management function, SMF) device, a user plane function (user plane function, UPF) device, a policy control (policy control function, PCF) device, a unified data management (unified data management, UDM) device, or an application function (application function, AF) device. The AMF device is mainly responsible for mobility management such as user location update, registration of a user with a network, and a cell handover in a wireless network. The SMF device is mainly responsible for session management such as session establishment, modification, and release in a wireless network. Specific functions may include: assigning an internet protocol (internet protocol, IP) address to a user, selecting a UPF device that provides a packet forwarding function, and the like. The PCF device is mainly responsible for providing various policies such as a network slice selection policy and a quality of service (quality of service, QoS) policy for the AMF device and the SMF device. The UPF device is mainly responsible for processing a user packet, such as forwarding and charging for the user packet. The UDM device is mainly configured to store user data such as subscription information and authentication/authorization information. The AF is mainly responsible for providing a service for a $3^{rd}$ generation partnership project ($3^{rd}$ generation partnership project, 3GPP) network, for example, affecting service routing and interacting with the PCF device to perform policy control.

A device in the foregoing transport network slice subnet is referred to as a transport network device, includes a network device located on a transport network side of the foregoing network management system, and provides a long-distance data transmission service. The device may be classified into a fiber transport network device, a satellite transport network device, or another type of transport network device by type.

Specifically, communication and interaction may be performed between the communication service management service device and the network slice management service device, between the network slice management service device and the network slice subnet management service device, between the network slice subnet management service device and a management device of a network element in a network slice subnet, between the communication service management service device and the management data analytics device, between the network slice management service device and the management data analytics device, and between the network slice subnet management service device and the management data analytics device. One communication service management service device may interact with one or more network slice management service devices, one network slice management service device may interact with one or more network slice subnet management service devices, and one network slice subnet management service device may interact with a management device (for example, an NFMF device) of a network element in one or more network slice subnets.

FIG. 3 is a schematic diagram of a relationship between managed objects at different hierarchies according to an embodiment of this application. In the figure, one communication service 310 (or communication service instance) may be associated with or use one or more network slices 320, and a plurality of communication services 310 may be associated with or use a same network slice 320. Similarly, one network slice 320 may include a plurality of network slice subnets 330, and the plurality of network slices 320 may include a same network slice subnet 330. The network slice subnet 330 may include a network slice subnet 340 of an access network, a network slice subnet (not shown in FIG. 3) of a transport network, and a network slice subnet 350 of a core network. In some embodiments, the network slice subnet 330 may further include another network slice subnet 330 in a nesting manner. For example, a communication service 1 and a communication service 2 may be jointly associated with or use a network slice 1, the communication service 2 is further associated with or uses a network slice 2, and a communication service 3 is associated with or uses a network slice 3. The network slice 1 includes a network slice subnet 1, a network slice subnet 2, and a network slice subnet 3, the network slice 2 includes the network slice subnet 2, and the network slice 3 includes the network slice subnet 3. The network slice subnet 1 includes an access network slice subnet-1 and a core network slice subnet-1 in a nesting manner. The network slice 2 includes the network slice subnet 2, and the network slice subnet 2 includes an access network slice subnet-2 and a core network slice subnet-2 in a nesting manner. The network slice 3 includes a network slice subnet 3, and the network slice subnet 3 includes an access network slice subnet-3 and a core network slice subnet-3 in a nesting manner. It can be learned that the access network slice subnet-2 is shared by the network slice subnet 2 and the network slice subnet 3.

It should be noted that the network management method provided in this embodiment of this application is applicable to the network management system shown in FIG. 1 or FIG. 2. For specific implementation, refer to the following method embodiments.

It should be noted that the solutions in embodiments of this application may be further applied to another network management system, and a corresponding device or apparatus name may also be replaced with a device or apparatus name of a corresponding function in the another network management system. In addition, various devices described in embodiments of this application may also be referred to as network elements, such as an access network network element and a core network network element. This is not specifically limited in embodiments of this application.

It should be understood that FIG. 1 and FIG. 2 are merely simplified schematic diagrams of examples for ease of understanding. The network management system provided in this embodiment of this application may further include another network device and/or another terminal device that are not drawn in FIG. 1 and FIG. 2.

The following describes in detail the network management method provided in embodiments of this application with reference to FIG. 4 to FIG. 8.

FIG. 4 is a schematic flowchart 1 of a network management method according to an embodiment of this application. The network management method is applicable to the network management system shown in FIG. 1 or FIG. 2, and includes the following steps.

S401: A first-hierarchy network management device obtains an analysis report of a first-hierarchy managed object from a management data analytics device, and/or obtains a status report of at least one second-hierarchy managed object from a second-hierarchy network management device.

Specifically, the first-hierarchy managed object includes the at least one second-hierarchy managed object or is associated with the at least one second-hierarchy managed object. For example, to provide a communication service instance (or a communication service) for a customer, at least one network slice instance is required to support the communication service. In this case, the communication service instance is the first-hierarchy managed object, and each of the at least one network slice instance is the second-hierarchy managed object.

Specifically, the analysis report may include information related to a performance indicator of the first-hierarchy managed object and/or resource information of the first-hierarchy managed object.

The information related to the performance indicator of the first-hierarchy managed object is statistics information or prediction information of a measurement result of the performance indicator of the first-hierarchy managed object, or a difference between the measurement result of the performance indicator of the first-hierarchy managed object and a performance indicator requirement of the first-hierarchy managed object. The information related to the performance indicator of the first-hierarchy managed object may include any one or more of the following:

throughput statistics data of the first-hierarchy managed object, where throughput statistics data of a managed object is an average throughput value of all users of the managed object (for example, a network slice) within a specific time range;

throughput prediction data of the first-hierarchy managed object, where throughput prediction data of a managed object is a predicted average throughput value of all users of the managed object (for example, a network slice) in a specific future time range;

throughput distribution data of the first-hierarchy managed object, where throughput distribution data of a managed object is a distribution status of statistics information or prediction information of throughput statistics data of the managed object (for example, a network slice) in different time ranges and/or different coverage;

throughput requirement analysis data of the first-hierarchy managed object, where throughput requirement analysis data of a managed object is a throughput capability requirement that needs to be supported by the managed object (for example, a network slice) and that is calculated or analyzed based on information such as a quantity of online users, a service type, and a service amount;

an average delay of the first-hierarchy managed object, where an average delay of a managed object is an average value of an end-to-end delay of a service supported by the managed object (for example, a network slice), for example, an average value of a delay from a terminal device to an anchor UPF device;

a maximum delay that is of the first-hierarchy managed object and whose statistics are collected on a per-service basis or a per-user basis, where a maximum delay that is of a managed object and whose statistics are collected on a per-service basis or a per-user basis is a maximum value of an end-to-end delay of a service or a user supported by the managed object (for example, a network slice), for example, a maximum value of a delay from a terminal device to an anchor UPF device;

a minimum delay that is of a first-hierarchy managed object and whose statistics are collected on a per-service basis or a per-user basis, where a minimum delay that is of a managed object and whose statistics are collected on a per-service basis or a per-user basis is a minimum value of an end-to-end delay of a service or a user supported by the managed object (for example, a network slice), for example, a minimum value of a delay from a terminal device to a UPF device;

a delay jitter (jitter) of the first-hierarchy managed object, where a delay jitter of a managed object is a variation amount of an end-to-end service delay, an end-to-end network delay, or a delay of a communication path in a network, and causes a change in a rate at which a data packet in the managed object (for example, a network slice) reaches a target node;

a delay tolerance (delay tolerance) of the first-hierarchy managed object, where a delay tolerance of a managed object is a difference between a delay requirement of a service supported by the managed object (for example, a network slice) and a maximum acceptable delay;

a packet delay budget (packet delay budget, PDB) of the first-hierarchy managed object, where a packet delay budget of a managed object is an upper limit of a delay of packet transmission between two transmission nodes on a data transmission path of the managed object (for example, a network slice) or an upper limit of a processing delay of a packet in a network node, for example, an upper limit of a delay of packet transmission between a terminal device and a UPF device in a 5G network;

a moving speed supported by the first-hierarchy managed object, where a moving speed supported by a managed object is a maximum moving speed of user equipment that can be supported by the managed object (for example, a network slice), an average moving speed of all online users within a specific time range, or a predicted average moving speed that can be supported within a specific future time range;

a maximum packet loss rate of the first-hierarchy managed object, where a maximum packet loss rate of a managed object is a maximum value of a packet loss rate of a service supported by the managed object (for example, a network slice) or all services of an online user;

an average packet loss rate of the first-hierarchy managed object, where an average packet loss rate of a managed object is an average value of a packet loss rate of a service supported by the managed object (for example, a network slice) or all services of an online user;

a minimum packet loss rate of the first-hierarchy managed object, where a minimum packet loss rate of a managed object is a minimum value of a packet loss rate of a service supported by the managed object (for example, a network slice) or all services of an online user;

a maximum packet length of the first-hierarchy managed object, where a maximum packet length of a managed object is a maximum packet length of a service supported by the managed object (for example, a network slice) or all services of an online user;

positioning precision supported by the first-hierarchy managed object, where positioning precision supported by a managed object is precision that can be achieved by a result of positioning a user terminal by using a positioning technology supported by the managed object (for example, a network slice), for example, a horizontal error of the positioning result less than 5 meters, and a vertical error of the positioning result less than 3 meters;

clock synchronization precision supported by the first-hierarchy managed object, where clock synchronization precision supported by a managed object is a degree of synchronization between a device or a network element in the managed object (for example, a network slice) and a standard clock, where for example, the device or the network element may use the IEEE 1588 precision time protocol to synchronize an internal clock of the device or the network element to the standard clock, and a synchronization difference ranges from only 10 nanoseconds (nanoseconds, ns) to 1 microsecond (microsecond, μs);

energy consumption efficiency supported by the first-hierarchy managed object, where energy consumption efficiency supported by a managed object refers to a ratio of performance to energy consumption of the managed object (for example, a network element), for example, a ratio of throughput to power consumption per unit time;

a resource allocation priority of the first-hierarchy managed object, where a resource allocation priority of a managed object is a priority of allocating a network resource to the managed object (for example, a network slice), and a network resource is preferentially allocated to a managed object with a higher priority; or a resource allocation priority of each of the at least one second-hierarchy managed object.

Specifically, the resource information of the first-hierarchy managed object is statistics information or prediction information of a remaining resource amount of the first-hierarchy managed object, or statistics information or prediction information of resource utilization of the first-hierarchy managed object. The resource information of the first-hierarchy managed object may include any one or more of the following:

a resource isolation level of the first-hierarchy managed object, where a resource isolation level of a managed object is a sharing level of a network resource of the managed object (for example, a network slice), where for example, the resource is completely independent, a part of the resource is shared, or all of the resource is shared, and the sharing level is also referred to as a resource sharing level;

analysis information of a resource of the first-hierarchy managed object;

analysis information (including a recommended resource configuration) of a resource of the at least one second-hierarchy managed object; or analysis information (including a recommended configuration parameter) of a configuration parameter of the at least one second-hierarchy managed object.

Specifically, the first-hierarchy network management device may receive the analysis report of the first-hierarchy managed object from the MDAS device through a subscription-notification mechanism. For details, refer to another embodiment of this application, for example, an embodiment corresponding to FIG. 5A and FIG. 5B. The first-hierarchy network management device may further receive the analysis report of the first-hierarchy managed object from the MDAS device through a request-response mechanism. For details, refer to another embodiment of this application, for example, the embodiment corresponding to FIG. 5A and FIG. 5B.

Specifically, the status report of the second-hierarchy managed object includes any one or more of the following:

(1) analysis data that is information related to a performance indicator of the at least one second-hierarchy managed object and/or resource information of the at least one second-hierarchy managed object, where items included in the information related to the performance indicator of the second-hierarchy managed object are similar to those included in the information related to the performance indicator of the first-hierarchy managed object, for example, throughput statistics data of the second-hierarchy managed object and a resource allocation priority of the second-hierarchy managed object; and items included in the resource information of the second-hierarchy managed object are similar to items included in the resource information of the first-hierarchy managed object, for example, a resource isolation level of the second-hierarchy managed object and a configuration parameter of the second-hierarchy managed object;

(2) decision data that is a management operation to be performed by the second-hierarchy network management device on the second-hierarchy managed object based on the analysis data; and (3) execution data that is a management operation performed by the second-hierarchy network management device on the second-hierarchy managed object based on the decision data and an execution result thereof.

Attributes of the analysis data may include an identifier (identifier, ID), a type (type), and content (content). The identifier represents an identifier corresponding to analysis data. For example, an ID of delay analysis data may be 1, and an ID of throughput analysis data may be 2. The type represents a type of the analysis data, and the type may include but is not limited to: delay analysis and throughput analysis. The content refers to specific content of the analysis data. For example, the content may include an average delay, a maximum delay, and a minimum delay. The content can be implemented by using data structures such as an array, a structure, and a class, and can include one or more <key (key), value (value)> groups. The key may include, but is not limited to, key performance indicator (key performance indicator, KPI) statistics (statistics) information, performance measurement indicator (performance measurement indicator) statistics information, a root cause (root cause), and analysis of a difference with a control objective (gap with closed-loop control objectives). The value may include one or more of the following: a mapping relationship between service parameter distribution and service experience QoE, a difference between an actual service parameter and a target service parameter and a root cause, or information about a service whose service parameter is unqualified. The service parameter may include but is not limited to: a throughput parameter, a mobility management parameter, or QoE. The service information whose service parameter is unqualified may include one or more of the following: a list of cells/gNBs whose average throughput is unqualified, statistics information of a quantity of terminal devices/a quantity of connections/signal strength distribution/service type distribution in coverage whose average throughput is unqualified, and analysis information of a quality of service (quality of service, QoS) measured value of a service whose average throughput is unqualified.

A downlink (downlink, DL) throughput and/or an uplink (uplink, UL) throughput (Throughput) are/is used as examples of performance indicators below to describe analysis data of a managed object at each hierarchy.

(1) Mapping Relationship Between Average DL and/or UL Throughput Level Statistics and Network Slice QoE For example, based on coverage and a service type, the mapping relationship may include one or more of the following: downlink throughput distribution of the managed object at each hierarchy, uplink throughput distribution of the managed object at each hierarchy, downlink throughput QoE mapping of the managed object at each hierarchy, and uplink throughput QoE mapping of the managed object at each hierarchy.

(2) Difference Between the Average DL and/or UL Throughput Level and a Throughput Target of the Managed Object at Each Hierarchy and a Root Cause For example, the difference with the throughput target and the root cause may include one or more of the following: a downlink throughput difference of the managed object at each hierarchy and uplink throughput distribution of the managed object at each hierarchy.

(3) List of Cells/gNBs with Degraded Average DL (or UL) Throughput Performance (where Degraded Performance Indicates that a Related Indicator is Lower than a Preset Threshold)

For example, one or more of the following may be included: a downlink throughput difference of the managed object at each hierarchy and uplink throughput distribution of the managed object at each hierarchy.

(4) Statistics Information of a Quantity of Terminal Devices/a Quantity of Connections/Signal Strength Distribution/Service Type Distribution in Coverage with Degraded DL (or UL) Average Throughput Performance For example, one or more of the following may be included: a quantity of terminal devices with degraded downlink throughput performance of the managed object at each hierarchy, a quantity of terminal devices with degraded uplink throughput performance of the managed object at each hierarchy, a proportion of coverage with degraded downlink throughput performance of the managed object at each hierarchy, and a proportion of coverage with degraded uplink throughput performance of the managed object at each hierarchy.

(5) QoS Measurement and Analysis (QCI and QoS Flow Measurement Information Statistics) of a Service with Degraded Average DL (or UL) Throughput Performance For example, one or more of the following may be included: QoS measurement and analysis information of a service with degraded downlink throughput performance of the managed object at each hierarchy and QoS measurement and analysis information of a service with degraded uplink throughput performance of the managed object at each hierarchy.

The DL and/or UL throughput are/is used as examples of performance indicators below to describe a status report of the managed object at each hierarchy.

The analysis data of the managed object at each hierarchy may include the following types:

(1) the mapping relationship between the average throughput level statistics and the QoE, where the mapping relationship may include, based on the throughput coverage and the service type, but is not limited to: the DL throughput distribution of the managed object at each hierarchy, the UL throughput distribution of the managed object at each hierarchy, the DL throughput QoE mapping, and the UL throughput QoE mapping;

(2) the difference between the actual service parameter and the target service parameter and the root cause, where the difference and the root cause may include: the DL throughput difference of the managed object at each hierarchy, and the UL throughput distribution of the managed object at each hierarchy;

(3) the list of cells/gNBs with degraded average throughput performance, where the list may include the DL throughput difference of the managed object at each hierarchy and the UL throughput distribution of the managed object at each hierarchy;

(4) the statistics information about the quantity of terminal devices/quantity of connections/signal strength distribution/service type distribution in the coverage with degraded average throughput performance, where the statistics information may include: the quantity of terminal devices with degraded DL throughput performance of the managed object at each hierarchy, the quantity of terminal devices with degraded UL throughput performance of the managed object at each hierarchy, the proportion of coverage with degraded DL throughput performance of the managed object at each hierarchy, and the proportion of coverage with degraded UL throughput performance of the managed object at each hierarchy; and (5) the QoS measurement and analysis of the service with degraded average throughput performance, where the analysis may include: the QoS measurement and analysis information of the service with degraded DL throughput performance of the managed object at each hierarchy and the QoS measurement and analysis information of the service with degraded UL throughput performance of the managed object at each hierarchy.

Attributes of the decision data include an indicator, a type, and content. The indicator indicates a corresponding service parameter. The content is an array type and can include one or more key values. The key value may include but is not limited to adding a resource, reducing a resource, adding a parameter configuration, reducing a parameter configuration, and the like. The decision data may include the following types:

(1) using a control policy based on an average throughput, where for example, the control policy may be based on a mapping table between a throughput level and a radio resource configuration;

(2) adding or reducing a network slice resource, where the network slice resource includes but is not limited to a RAN resource and a CN resource;

(3) adding or reducing a communication service resource, where the communication service resource includes but is not limited to a RAN resource and a CN resource;

(4) a maximum value and/or a guaranteed value of a network slice resource configuration, where the maximum value is an upper limit of the resource configuration, and the guaranteed value is a lower limit of the resource configuration; and (5) a configuration management quantity of a maximum value/a guaranteed value of a communication service resource configuration.

TABLE 3

| | Analysis data | Decision data | Execution data |
|---|---|---|---|
| Status report of a network slice | Network slice average throughput statistics/prediction analysis, a resource management request/management quantity, and a cause:<br>1. Network slice indicator: a throughput<br>2. Mapping relationship between an average throughput level and QoE<br>3. Difference between an actual service parameter and a target service parameter and a root cause<br>4. List of cells/gNBs with degraded average throughput performance (Note: Degraded performance of a performance indicator indicates that a measured value of the performance indicator is "more degraded than" a preset value, and "more degraded" may mean that the measured value is less than the preset value or greater than the preset value in different scenarios)<br>5. Statistics information of a quantity of terminal devices/a quantity of connections/signal strength distribution/service type distribution in coverage with degraded average throughput performance<br>6. QoS measurement and analysis of a service with degraded average throughput performance | Resource allocation operation/configuration management operation (including a management quantity and a managed object) to be performed on the network slice:<br>1. Used control policy based on an average throughput, for example, based on a mapping relationship between an average throughput level and a network resource configuration, so as to determine to select a proper resource configuration based on an average throughput requirement<br>2. Decision on adding or reducing a network resource of a network slice<br>3. Adding or reducing of a quantity of managed objects of the network slice<br>4. Configuration management quantity of a maximum value/guaranteed value of a communication service/network slice resource configuration corresponding to the network slice | Execution of network slice resource allocation/a configuration management quantity:<br>1. Execution of an operation of adding/reducing a network slice resource, a quantity of added or reduced resources, a quantity of resources that can be added or reduced in each operation, and a quantity of operations of adding or reducing a resource |
| Status report of a network slice subnet | Network slice average throughput statistics/prediction analysis, a resource management request/a quantity of added/reduced resources, and cause analysis:<br>1. Network slice subnet indicator: a throughput<br>2. Mapping relationship between an average throughput level and QoE<br>3. Difference between an actual service parameter and a target service parameter and a root cause<br>4. List of cells/gNBs with degraded average throughput performance | Resource allocation operation/configuration operation (including a management quantity and a management object) to be performed on the network slice subnet:<br>1. Used control policy based on an average throughput of the network slice subnet, for example, based on a mapping relationship between an average throughput level and a network resource | Execution of network slice subnet resource allocation/a configuration management quantity:<br>1. Execution of an operation of adding/reducing a network slice subnet resource, a quantity of added or reduced |

TABLE 3-continued

| Analysis data | Decision data | Execution data |
|---|---|---|
| 5. Statistics information of a quantity of terminal devices/a quantity of connections/signal strength distribution/service type distribution in coverage with degraded average throughput performance<br>6. QoS measurement and analysis of a service with degraded average throughput performance | configuration, so as to determine to select a proper resource configuration based on an average throughput requirement<br>2. Decision on adding or reducing a network resource of the network slice subnet<br>3. Adding or reducing of managed objects of the network slice subnet<br>4. Configuration management quantity of a maximum value/guaranteed value of a network slice subnet/network slice resource configuration | resources, and a quantity of operations of adding or reducing a resource |

Attributes of the execution data include an indicator, an action, a management quantity, and an execution result. The indicator is used to represent a corresponding service parameter, and the action is an operation performed on a specific managed object. For example, the action may include an operation such as adding or reducing a resource, or adding or reducing a parameter configuration. The management quantity includes a management value corresponding to one or more managed objects. The management value may include a resource management quantity, a resource management step, and a quantity of resource management times.

It should be noted that an operations and maintenance status and/or an operations and maintenance operation related to the managed object include/includes but are/is not limited to all or a part of an analysis report related to the operations and maintenance status, for example, analysis data, information obtained by further processing the analysis data, or information about management performed based on the analysis data, for example, network configuration management decision information, execution action information, and execution result information.

A throughput is used as an example of a performance indicator. Example content included in the status report of the managed object at each hierarchy is shown in Table 3. It should be understood that the performance indicator in the content of the status report in Table 3 may also be another performance indicator. The another performance indicator may include a delay, load, reliability, and the like.

TABLE 4

| | Analysis data | Decision data | Execution data |
|---|---|---|---|
| Status report of a communication service | Analysis scenario indicator, SLA indicator statistics/forecast analysis, degraded SLA indicator performance statistics and a root cause, an SLA indicator improvement target suggestion, and analysis information of another affected communication service | Decision on SLA requirement management, decision on communication service resource requirement management, decision on a communication service resource management quantity/range, and decision on communication service steady state time restriction | Action of modifying a communication service configuration indicator, an action of adding/reducing a communication service resource, and a quantity of added/reduced communication service resources |
| Status report of a network slice | Analysis scenario indicator, KPI statistics/prediction analysis, degraded KPI performance/alarm statistics and a root cause, a KPI improvement target suggestion, network slice steady state time and resource requirement prediction analysis, analysis information of an affected network slice subnet, and analysis information, such as a network slice ID/coverage, of another affected network slice | Used network slice control policy, adding/reducing of a network slice resource and a resource quantity, and adding/reducing of a communication service resource and a resource quantity<br>Decision on a suggestion or request for communication service control, decision on a suggestion or request for control of another network slice, and a cause | Operation of modifying a network slice configuration indicator, an action of adding/reducing a network slice resource, and a quantity of added/reduced network slice resources |

TABLE 4-continued

| | Analysis data | Decision data | Execution data |
|---|---|---|---|
| | Example: network slice QoS statistics analysis, network slice load statistics analysis, network slice handover failure statistics analysis, and network slice resource requirement analysis based on mobility prediction | | |
| Status report of a network slice subnet | Analysis scenario indicator, KPI statistics/prediction analysis, degraded KPI performance/alarm statistics and a root cause, a KPI improvement target suggestion, network slice subnet steady state time and resource requirement prediction analysis, analysis information of an affected network slice, and analysis information, such as a network slice subnet ID/coverage, of another affected network slice subnet Example: network slice subnet QoS/load/mobility-related analysis | Used network slice subnet control policy, decision on adding/reducing a network slice subnet resource/decision on modifying a parameter and a target value Decision on a suggestion or request for closed-loop control of the network slice, decision on a suggestion or request for control of another network slice subnet, and a cause | Modifying a network slice subnet configuration indicator, an operation of adding/reducing a network slice subnet resource, and a quantity of added/reduced network slice subnet resources |

Example content included in a status report of another performance indicator is shown in Table 4. The degraded SLA indicator performance statistics may include but are not limited to: an SLA indicator value, a level, a target completion degree or gap analysis, and time/location distribution. The KPI statistics/prediction analysis may include but may not be limited to: a level, distribution, a mapping relationship with QoE, and impact analysis. The degraded KPI performance/alarm (alarm) statistics may include but may not be limited to: a KPI indicator value, a level, a target completion degree or gap analysis, time/location distribution, and an impact degree. In Table 4, the communication service steady state time restriction indicates that a measurement result of an SLA indicator of a communication service remains within a preset value range within a specific time range.

In addition to the throughput, the service parameter mentioned in the foregoing analysis information and analysis data may further include network slice service experience (quality of experience, QoE) and mobility management. Example content included in a status report formed by using network slice service experience as an indicator is shown in the following Table 5.

TABLE 5

| | Analysis data | Decision data | Execution data |
|---|---|---|---|
| Status report of a communication service | Service quality of experience distribution information, a service quality of experience satisfaction degree report, degraded service quality of experience performance statistics and a root cause, and an improvement suggestion on an attainable service quality of experience target | Decision (such as modification) on SLA requirement (serviceProfile) management, decision on communication service resource requirement management, adding/reducing of a communication service resource and a resource quantity, and decision on steady state time restriction of a closed loop in a communication service | Operation of modifying a service indicator, an operation of adding/reducing a communication service resource, and a quantity of added/reduced communication service resources |
| Status report of a network slice | Analysis scenario identifier, KPI statistics/prediction information, degraded | Decision on service indicator request modification, decision on a network slice delay | Operation of modifying a service indicator, an action of adding/reducing a |

TABLE 5-continued

| | Analysis data | Decision data | Execution data |
| --- | --- | --- | --- |
| | KPI performance/alarm statistics and a root cause, a KPI improvement target suggestion, and analysis information of an affected network slice subnet | alarm, a used network slice closed-loop control policy, a quantity of added/reduced network slice resources, and adding/reducing of a communication service resource and a resource quantity Decision on a suggestion or request on requesting a cross-domain management function to add/reduce a related another network slice resource | network slice resource, and a quantity of added/reduced network slice resources |
| Status report of a network slice subnet | Analysis scenario ID, KPI statistics/prediction analysis, degraded KPI performance/alarm statistics and a root cause, a KPI improvement target suggestion, and analysis information, such as a network slice subnet ID/coverage, of another affected network slice subnet | Decision on a network slice subnet configuration update request, decision on single-domain delay alarm generation, a used network slice subnet closed-loop control policy, and adding/reducing of a network slice subnet resource and a resource quantity | Operation of modifying a service indicator, an operation of adding/reducing a network slice subnet resource, and a quantity of added/reduced network slice subnet resources |

In the column of analysis data in Table 5, degraded service quality of experience (service QoE) performance statistics may include but are not limited to: a network slice service description model (serviceProfile) satisfaction degree report, and a quantity of users/a service volume/coverage/a proportion of time periods whose service QoE level is lower than a target value and a gap value. The root cause of the degraded service QoE performance may include but is not limited to a wireless coverage problem/congestion problem. The improvement suggestion on the service QoE target may include but is not limited to, for example, a suggestion on a target/distribution/related KPI target of a network slice. The KPI prediction information may include but is not limited to a delay, an uplink throughput, a downlink throughput, a delay/cross-domain service description model trend prediction, and network slice load analysis/prediction. The degraded KPI performance/alarm statistics may include but may not be limited to: a cross-domain service description model satisfaction degree report, an E2E delay, and difference analysis of an uplink throughput/a downlink throughput lower than a target value. The root cause of the degraded KPI performance may include but is not limited to a KPI threshold/an alarm threshold such as congestion, a heavy load, or weak coverage. The KPI improvement target suggestion may include but is not limited to: an E2E delay, an E2E uplink/downlink throughput target suggestion, and analysis information of an affected network slice subnet. For example, RAN NSSI-ID=1 indicates that an access network slice subnet whose identifier is 1 is affected, and service experience may be improved by managing a resource of the access network slice subnet whose identifier is 1.

In the column of decision data in Table 5, a serviceProfile update request may include but is not limited to: for example, when a delay cannot be ensured, determining to request a closed loop in an upper hierarchy to modify a delay/rate guarantee threshold of a network slice in the serviceProfile. The used network slice closed-loop control policy may include but is not limited to a network slice resource management policy that is based on a delay and a load threshold. The network configuration update request may include but is not limited to: when a single-domain delay cannot be ensured, determining to request an upper hierarchy to modify a delay assurance threshold for a single-domain network slice subnet in a network slice description model (sliceProfile). The used network slice subnet closed-loop control policy may include but is not limited to a radio resource management policy based on a delay/coverage condition and a load threshold. For a suggestion or request on requesting a cross-domain management function to reduce another related network slice resource, an example is as follows. To obtain a part of resources occupied by a network slice-2, a network slice management service device managing a network slice-1 may request a network slice management service device managing the network slice-2 to manage network resources of the network slice-2, so as to add resources of the network slice-1. The network slice-1 represents a network slice whose identifier is 1, and the network slice-2 represents a network slice whose identifier is 2.

In the column of execution data in Table 5, the action of adding/reducing a communication service resource may include but is not limited to a management quantity determined through decision (decision). The action of adding/reducing a network slice resource may include but is not limited to a management quantity determined through decision (decision).

Example content included in a status report formed by using a mobility management requirement as an indicator is shown in the following Table 6.

TABLE 6

| | Analysis data | Decision data | Execution data |
|---|---|---|---|
| Status report of a communication service | Service experience mobility-related statistics/prediction, and degraded service experience mobility performance statistics and a root cause | Decision (such as modification) on handover performance requirement management in an SLA requirement (serviceProfile) | Operation (such as modification) related to handover performance requirement management in the SLA requirement (serviceProfile) |
| Status report of a network slice | Analysis scenario ID, mobility-related KPI statistics/prediction information, mobility-related degraded KPI performance/alarm statistics and a root cause, handover parameter analysis, and handover policy analysis | RAN/CN selection/determining, decision on an E2E network slice handover policy, decision on determining a handover target, decision on determining a handover parameter, and decision on a handover performance target update request | Operation of selecting an E2E network slice handover policy, an operation of determining a handover target, an operation of determining a handover parameter, and an operation of a handover performance target update request |
| Status report of a network slice subnet | For details, refer to a network slice status notification, and this section focuses on performance analysis related to air interface handover of an46cess network slice subnet | Decision on selecting/determining a handover policy of an access network slice subnet or a core network slice subnet, decision on determining a handover target, decision on determining a handover parameter, decision on a handover performance target update request, decision on determining to generate single-domain handover performance alarm information, decision on modification of a handover parameter, and decision on requesting a closed loop in an upper-hierarchy network slice to further coordinate and modify a QoS parameter configuration of a core network slice subnet | Operation of selecting a handover policy of a RAN/CN network slice subnet, an operation of determining a handover target, an operation of determining a handover parameter, and an operation of a handover performance target update request |

In the column of analysis data in Table 6, service experience mobility-related statistics/prediction may include but are/is not limited to service QoE statistics corresponding to services/terminal devices of different moving speed levels. The degraded mobility service experience performance statistics may include, but are not limited to, a quantity of users/a traffic volume/coverage/a proportion of time periods whose service QoE mobility-related statistics are lower than a target value/threshold, and a gap value. The root cause of the degraded service experience mobility performance may include but is not limited to a wireless coverage problem/congestion problem. The analysis scenario ID may include but is not limited to: dual connection (EN-DC) scenario switching and standalone (SA) scenario switching. The mobility-related KPI statistics/forecast information may include but is not limited to: handover success rate distribution, handover service interruption time, an uplink/downlink service throughput during handover, and handover-related service type/traffic volume/load analysis/forecast. The mobility-related degraded KPI performance/alarm statistics may include but may not be limited to the following: difference analysis of a handover success rate lower than a target value, and an uplink/a downlink service delay/throughput lower than a target value during handover. The root cause of the mobility-related degraded KPI performance may include but is not limited to a KPI threshold/an alarm threshold such as congestion, a heavy load, or weak coverage. The handover parameter analysis may include but is not limited to: a measurement report periodicity of the terminal device, a trigger threshold, and a handover condition parameter.

In the column of decision data in Table 6, for the status report of the network slice, the handover performance target update request may include but is not limited to: when a handover interruption delay/throughput cannot be ensured, determining to request a closed loop in an upper hierarchy to modify a delay/rate guarantee threshold during handover and reduce a mobility rate support level. For the status report of the network slice subnet, the handover performance target update request may include but is not limited to: for example, when a delay/throughput of an access network single-domain network slice subnet cannot be ensured during air interface handover, determining to request a closed loop in an upper-hierarchy network slice to modify an air interface delay/throughput guarantee threshold of the access network slice subnet in a sliceProfile. The modification of the handover parameter may include but is not limited to: modifying an air interface handover parameter, for example, a handover wireless condition.

In the column of execution data in Table 6, for the status report of the network slice, the handover performance target update request may include but is not limited to: when a handover interruption delay/throughput cannot be ensured, determining to request a closed loop in an upper hierarchy to modify a delay/rate guarantee threshold during handover and reduce a mobility rate support level. For the status report of the network slice subnet, the handover performance target update request may include but is not limited to: when a handover interruption delay/throughput cannot be ensured, determining to request a closed loop in an upper hierarchy to modify a delay/rate guarantee threshold during handover and reduce a mobility rate support level.

It should be noted that the foregoing Table 3 to Table 6 are merely several examples of the foregoing status reports. In an actual application, other parameters may also be used, and are not listed one by one herein.

Specifically, the first-hierarchy network management device may receive the status report of the at least one second-hierarchy managed object from the second-hierarchy network management device through a subscription-notification mechanism. For details, refer to another embodiment of this application, for example, the embodiment corresponding to FIG. 5A and FIG. 5B. The first-hierarchy network management device may further receive the status report of the at least one second-hierarchy managed object from the second-hierarchy network management device through a request-response mechanism. For details, refer to another embodiment of this application, for example, the embodiment corresponding to FIG. 5A and FIG. 5B.

S402: The first-hierarchy network management device indicates, based on the performance indicator requirement of the first-hierarchy managed object and the analysis report and/or the status report, the second-hierarchy network management device to manage the second-hierarchy managed object.

Specifically, the first-hierarchy network management device generates management indication information based on the performance indicator requirement of the first-hierarchy managed object and the analysis report and/or the status report, and then sends the management indication information to the second-hierarchy network management device, where the management indication information includes any one of the following:
configuration operation information, including a configuration operation to be performed on the second-hierarchy managed object;
configuration requirement information, including a configuration requirement for the second-hierarchy managed object; or
performance indicator requirement information, including a performance indicator requirement for the second-hierarchy managed object.

Specifically, the configuration operation information includes any one or more of the following:
adding one or more second-hierarchy managed objects;
deleting one or more second-hierarchy managed objects; or
modifying configuration information of one or more second-hierarchy managed objects.

Specifically, the configuration requirement information may be a requirement for the second-hierarchy managed object on a quantity and a configuration. For example, a total of three second-hierarchy managed objects are required, and each second-hierarchy managed object supports a 10 megabits per second (megabits per second, Mbps) bandwidth. The second-hierarchy network management device may perform a management operation based on second-hierarchy managed objects that have been included in or associated with the first-hierarchy managed object. For example, if two second-hierarchy managed objects have been included or associated, one second-hierarchy managed object that supports the 10 Mbps bandwidth is added. For another example, if three second-hierarchy managed objects have been included, but each second-hierarchy managed object supports an 8 Mbps bandwidth, resources that can support a 2 Mbps bandwidth are respectively added to the three second-hierarchy managed objects.

For example, the performance indicator requirement of the second-hierarchy managed object may be a delay requirement. For example, two second-hierarchy managed objects are required to support a maximum delay of 10 milliseconds (milliseconds, ms). The second-hierarchy network management device may perform a management operation based on second-hierarchy managed objects that have been included in or associated with the first-hierarchy managed object. For example, it is assumed that a maximum delay supported by two second-hierarchy managed objects that have been included or associated is 15 ms. The second-hierarchy network management device modifies locations of the two second-hierarchy managed objects or adds resources to improve scheduling, so that the maximum delay supported by the two second-hierarchy managed objects is reduced to 10 ms.

Specifically, the first-hierarchy network management device may generate the management indication information in at least the following two manners.

Generation manner 1: The first-hierarchy network management device determines a network configuration difference based on the performance indicator requirement of the first-hierarchy managed object and the analysis report and/or the status report, and then generates the management indication information based on the network configuration difference. The management indication information is used to enable the second-hierarchy network management device to reduce or eliminate the network configuration difference.

Specifically, the network configuration difference refers to a difference between at least one second-hierarchy managed object MOList1 currently included in or associated with the first-hierarchy managed object and at least one second-hierarchy managed object MOList2 that needs to be included in or associated with the first-hierarchy managed object and that is determined based on the performance indicator requirement and the analysis report and/or the status report, and includes a difference in a quantity of second-hierarchy managed objects and/or a difference in network configurations of the second-hierarchy managed object.

Specifically, a manner of generating the management indication information based on the network configuration difference is described as follows by using examples.

Example 1: The network configuration difference is the difference in the quantity of second-hierarchy managed objects. It is assumed that the current first-hierarchy managed object includes or is associated with M second-hierarchy managed objects (where M may be, for example, determined based on the performance indicator requirement of the first-hierarchy managed object and initially estimated performance indicator achievement efficiency, and the initially estimated performance indicator achievement efficiency is, for example, a 100 Mbps throughput of each second-hierarchy managed object). In this case, two second-hierarchy managed objects are connected in parallel to form the first-hierarchy managed object to implement a 200 Mbps throughput, and two second-hierarchy managed objects are connected in series to form the first-hierarchy managed object to implement a 100 Mbps throughput. It is determined, based on the performance indicator requirement of the first-hierarchy managed object and the analysis report and/or the status report, that the first-hierarchy managed object needs to include or be associated with N second-hierarchy managed objects (For example, latest performance indicator achievement efficiency is first determined based on the analysis report or the status report, and then N is determined based on the performance indicator requirement and the new performance indicator achievement efficiency. In an example, the second-hierarchy managed objects are connected in parallel to form the first-hierarchy managed object, and the new performance indicator achievement efficiency is that each second-hierarchy managed object implements a 50 Mbps throughput. To achieve the same throughput of 200 Mbps, it is determined that four second-hierarchy managed objects are required). In this case, a network configuration difference D is N-M second-hierarchy managed objects. It is assumed that network resource configurations in the N+M second-hierarchy managed objects are the same. If D is greater than 0, it indicates that a network resource configuration, namely, a quantity of second-hierarchy managed objects, used to implement the first-hierarchy managed object does not meet the performance indicator requirement for the first-hierarchy managed object. This causes loss to a user service running based on the first-hierarchy managed object, and affects user experience. In this way, the generated management indication information indicates the second-hierarchy network management device to add N–M second-hierarchy managed objects (certainly, also indicates a specific configuration parameter of each second-hierarchy managed object). If D is less than 0, it indicates that a network resource configuration exceeds the performance indicator requirement. This wastes network resources of an operator, and reduces an input/output ratio of the operator. In this way, the generated management indication information indicates the second-hierarchy network management device to delete M–N second-hierarchy managed objects. If D is equal to 0, in other words, N=M, it indicates that a network resource configuration exactly meets the performance indicator requirement and is a result expected by an operator. Therefore, the first-hierarchy network management device may not generate the management indication information, or may generate management indication information such as "maintaining the configuration".

Example 2: The network configuration difference is the difference in the network configurations of the second-hierarchy managed object. It is assumed that the current first-hierarchy managed object includes or is associated with one second-hierarchy managed object, and a resource configuration of the second-hierarchy managed object is A (for example, "a" network resources that each can support a 2 Mbps bandwidth) (For example, "a" is initially determined based on the performance indicator requirement of the first-hierarchy managed object and initially estimated performance indicator achievement efficiency. In an example, the initially estimated performance indicator achievement efficiency is 100%, in other words, a network resource supporting a 100 Mbps bandwidth can implement a 100 Mbps throughput. In this case, to implement a 200 Mbps throughput, it is determined that 100 network resources supporting the 2 Mbps bandwidth are required). Based on a performance indicator requirement of a user or an operator for the first-hierarchy managed object and an analysis report and/or a status report, it is determined that the first-hierarchy managed object also needs to include or be associated with one second-hierarchy managed object, and a resource configuration of the second-hierarchy managed object is B (for example, b resources that each can support the 2 Mbps bandwidth) (For example, latest performance indicator achievement efficiency is determined based on the analysis report or the status report, and then B is determined based on the performance indicator requirement and the new performance indicator achievement efficiency. For example, the new performance indicator achievement efficiency is 50%, in other words, a network resource supporting a 100 Mbps bandwidth can implement a throughput of only a 50 Mbps bandwidth. To implement the same 200 Mbps throughput, it is determined that 200 network resources supporting the 2 Mbps bandwidth are required). In this case, the network configuration difference D is B–A (for example, b–a resources supporting the 2 Mbps bandwidth). If D is greater than 0, it indicates that a network resource configuration, namely, a quantity of links with the 2 Mbps bandwidth, used to implement the first-hierarchy managed object does not meet the performance indicator requirement for the first-hierarchy managed object. This causes loss to a user service running based on the first-hierarchy managed object, and affects user experience. In this way, the generated management indication information indicates the second-hierarchy network management device to add configurations (for example, add b–a resources supporting the 2 Mbps bandwidth) to the existing second-hierarchy managed object. If D is less than 0, it indicates that a network resource configuration exceeds the performance indicator requirement. This wastes network resources of the operator and reduces an input/output ratio of the operator. In this way, the generated management indication information indicates the second-hierarchy managed object to delete configurations (for example, delete a–b resources supporting the 2 Mbps bandwidth) from the existing second-hierarchy managed object. If D is equal to 0, in other words, B=A (for example, b=a), it indicates that a network resource configuration exactly meets the performance indicator requirement. Therefore, the first-hierarchy network management device may not generate the management indication information, or may generate management indication information such as "maintaining the configuration". It should be understood that the network configuration difference may include both the quantity difference and the configuration difference.

Generation manner 2: The first-hierarchy network management device determines a performance indicator difference based on the performance indicator requirement of the first-hierarchy managed object and the analysis report and/or the status report, and then generates the management indication information based on the performance indicator difference. The performance indicator difference is a difference between an actual measurement result of the performance indicator of the first-hierarchy managed object and the performance indicator requirement of the first-hierarchy managed object. The management indication information is used to enable the second-hierarchy network management device to reduce or eliminate the performance indicator difference.

Specifically, a manner of generating the management indication information based on the performance indicator difference is described as follows by using an example.

It is assumed that the performance indicator requirement of the first-hierarchy managed object is a throughput of 100 Mbit/s, and it may be learned, based on the foregoing analysis report and/or status report, that an actual throughput of the first-hierarchy managed object is 80 Mbit/s. In this case, to compensate for a 20 Mbit/s throughput, the management indication information generated by the first-hierarchy network management device indicates the second-hierarchy network management device to add 10 resources that each support a 2 Mbps bandwidth to the first-hierarchy managed object, and the second-hierarchy network management device may add, based on the management indication information, the 10 resources that each support the 2 Mbps bandwidth to the existing second-hierarchy managed object, or may add one second-hierarchy managed object that includes the 10 resources that each support the 2 Mbps bandwidth.

Specifically, the foregoing performance indicator achievement efficiency is data for measuring an input/output ratio, and may be a ratio of a quantized value of an actually implemented performance indicator to a quantized value of an input network resource (a quantity and a configuration of second-hierarchy managed objects). For example, it is assumed that the performance indicator actually implemented by the first-hierarchy managed object (for example, a network slice) is an 80 Mbps throughput, and a quantized value of the throughput is 80. The first-hierarchy managed object includes four second-hierarchy managed objects in parallel. In this case, a quantized value of the four second-hierarchy managed objects is 4. In this way, the performance indicator achievement efficiency is 80/4=20. To meet the performance indicator requirement of 100 Mbps, only one second-hierarchy managed object needs to be added.

Specifically, that the first-hierarchy network management device sends the management indication information to the second-hierarchy network management device may be: sending a closed-loop control management message to the second-hierarchy network management device, where the closed-loop control management message includes the management indication information. For details, further refer to another embodiment of this application, for example, the embodiment corresponding to FIG. 5A and FIG. 5B. The second-hierarchy network management device receives the closed-loop control management message, and manages the second-hierarchy managed object based on the management indication information in the message. In some embodiments, the second-hierarchy network management device sends, to the first-hierarchy network management device, a result of performing management based on the management indication information.

In the method flowchart corresponding to FIG. 4, the first-hierarchy network management device may determine the network configuration difference based on the performance indicator requirement of the first-hierarchy managed object managed by the first-hierarchy network management device, and the analysis report of the first-hierarchy managed object and/or the status report of the second-hierarchy managed object included in or associated with the first-hierarchy managed object, and then manage the second-hierarchy managed object based on the network configuration difference, to eliminate or reduce the network configuration difference. In this way, the difference between the actual performance indicator and the specified performance indicator requirement that are of the first-hierarchy managed object is eliminated or reduced, consistency between the two is improved, and both a satisfaction degree of the performance indicator requirement of the first-hierarchy managed object and utilization of a network resource allocated to the first-hierarchy managed object are ensured.

It should be understood that, to continuously maintain the consistency between the actual performance indicator and the specified performance indicator requirement that are of the first-hierarchy managed object, the foregoing processes of S401 and S402 may be periodically and cyclically performed. From this perspective, analysis data, decision data, and execution data in a status report that is of a second-hierarchy managed object and that is obtained by the first-hierarchy network management device in S401 in a current periodicity are respectively content in an analysis report that is of the second-hierarchy managed object and that is obtained by the second-hierarchy network management device in S401 in a previous periodicity, decision (for example, management indication information) made based on the analysis report, and an execution result of the management indication information.

Figure 5A:
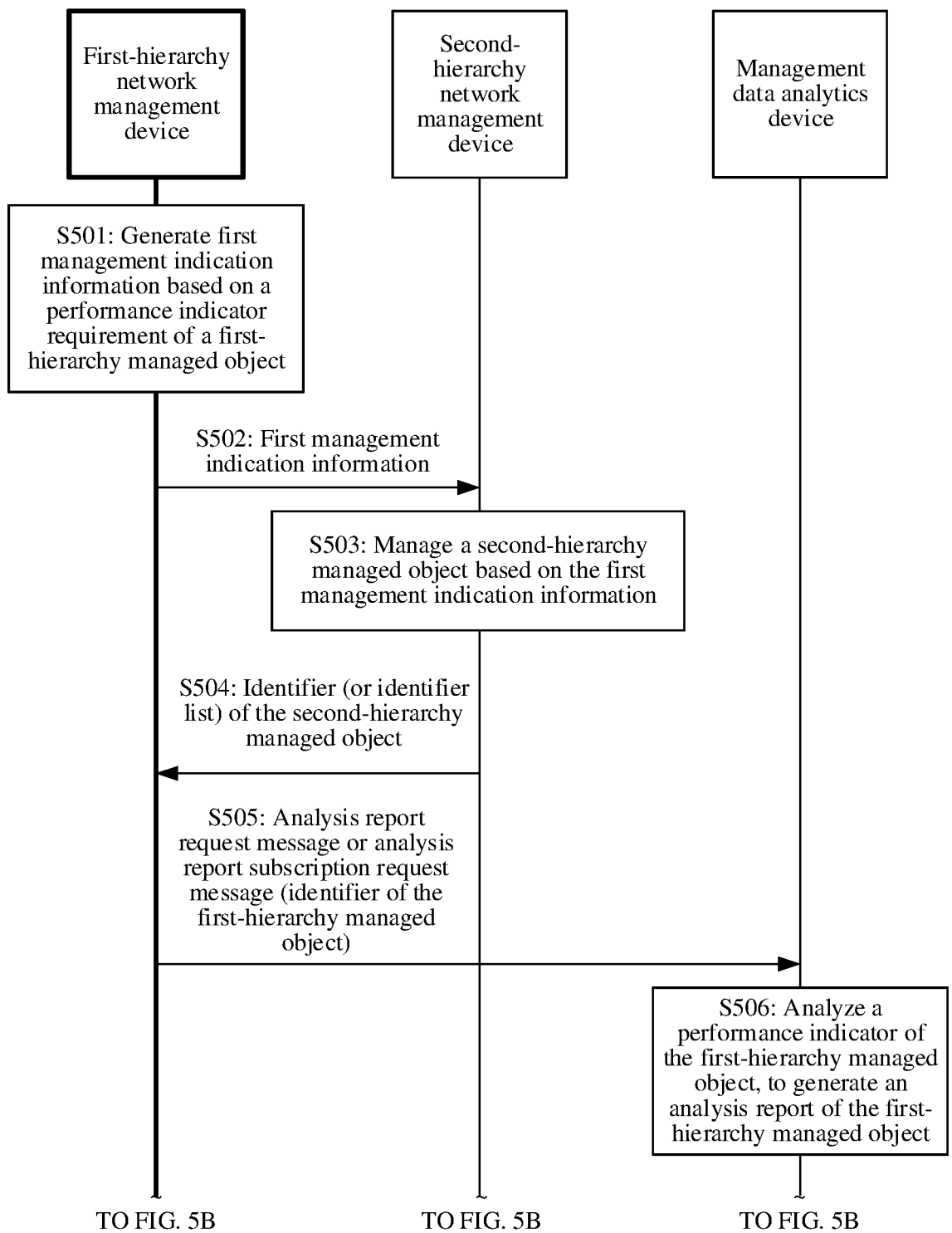
FIG. 5A and FIG. 5B are a schematic flowchart 2 of a network management method according to an embodiment of this application.
Figure 5B:
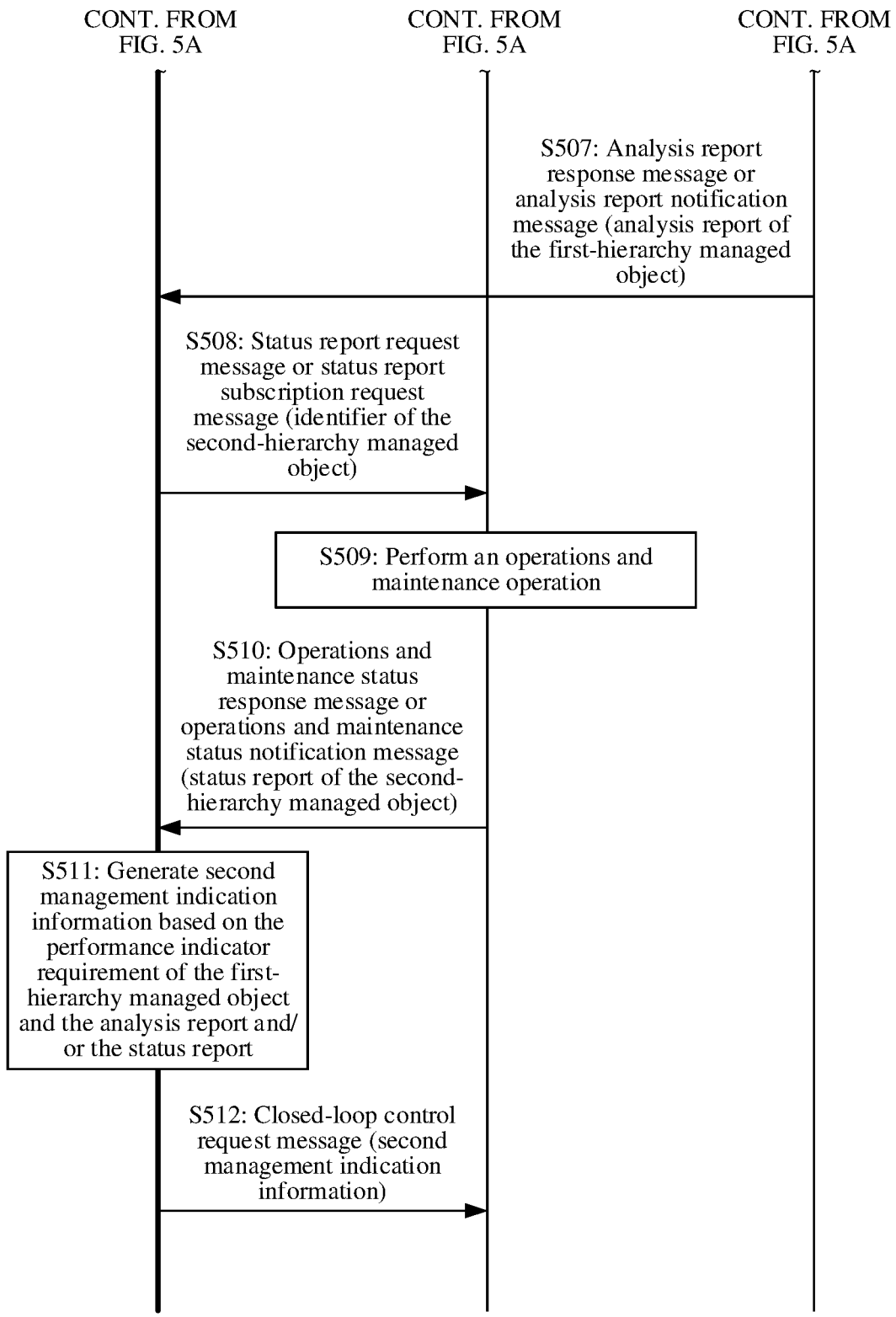

FIG. 5A and FIG. 5B are a schematic flowchart 2 of a network management method according to an embodiment of this application. The network management method is applicable to the network management system shown in FIG. 1 or FIG. 2, and includes the following steps.

S501: A first-hierarchy network management device generates first management indication information based on a performance indicator requirement of a first-hierarchy managed object.

Specifically, the first-hierarchy network management device obtains the performance indicator requirement of the first-hierarchy managed object locally or from another network management device, and generates the first management indication information based on the performance indicator requirement. The first management indication information indicates a second-hierarchy network management device to manage a second-hierarchy managed object, to meet the performance indicator requirement of the first-hierarchy managed object.

S502: The first-hierarchy network management device sends the first management indication information to the second-hierarchy network management device.

Specifically, the first-hierarchy network management device constructs a request message and sends the request message to the second-hierarchy network management device, where the request message includes the first management indication information. It should be understood that a name and a format of the request message are not limited in this embodiment of this application.

S503: The second-hierarchy network management device manages the second-hierarchy managed object based on the first management indication information.

Specifically, the second-hierarchy network management device receives and parses the request message, obtains the first management indication information from the request message, manages the second-hierarchy managed object based on the first management indication information, and records an identifier of the managed second-hierarchy managed object. For example, if the first management indication information indicates to add a second-hierarchy managed object, the second-hierarchy network management device adds the second-hierarchy managed object based on the indication, and records an identifier of the newly added second-hierarchy managed object. Similarly, if a second-hierarchy managed object is deleted, the second-hierarchy network management device may also record an identifier of the deleted second-hierarchy managed object.

S504: The second-hierarchy network management device returns the identifier (or an identifier list) of the managed second-hierarchy managed object to the first-hierarchy network management device.

Specifically, the second-hierarchy network management device returns a response message to the first-hierarchy network management device, where the response message includes the identifier of the managed second-hierarchy managed object that is in S503. If there are a plurality of managed second-hierarchy managed objects, the response message includes identifiers, namely, the identifier list, of the plurality of second-hierarchy managed objects.

S505: The first-hierarchy network management device sends an analysis report request message or an analysis report subscription request message to a management data analytics device, where the analysis report request message or the analysis report subscription request message includes an identifier of the first-hierarchy managed object.

Specifically, the first-hierarchy network management device may obtain an analysis report of the first-hierarchy managed object from the management data analytics device through a request-response mechanism. For example, the first-hierarchy network management device sends an analysis report request message to the management data analytics device, where the message includes the identifier of the first-hierarchy managed object. In this way, the management data analytics device may subsequently return the analysis report of the first-hierarchy managed object to the first-hierarchy network management device.

Specifically, the first-hierarchy network management device may obtain the analysis report of the first-hierarchy managed object from the management data analytics device through a subscription-notification mechanism. For example, the first-hierarchy network management device sends the analysis report subscription request message to the management data analytics device, where the message includes the identifier of the first-hierarchy managed object and may be sent only once. Every time an analysis report is generated, the management data analytics device may actively notify or push the generated analysis report to the first-hierarchy network management device. It should be understood that the "analysis report request message" is an example, and is not a limitation. The first-hierarchy network management device may request the analysis report from the management data analytics device through another message. The "analysis report subscription request message" is also an example, and is not a limitation. The first-hierarchy network management device may subscribe to the analysis report of the first-hierarchy managed object from the management data analytics device through another message.

S506: The management data analytics device analyzes a performance indicator of the first-hierarchy managed object, to generate the analysis report of the first-hierarchy managed object.

S507: The management data analytics device sends an analysis report response message or an analysis report notification message (the analysis report of the first-hierarchy managed object) to the first-hierarchy network management device, where the analysis report response message or the analysis report notification message includes the generated analysis report of the first-hierarchy managed object.

It should be understood that the "analysis report response message" is an example, and is not a limitation. The management data analytics device may return the analysis report to the first-hierarchy network management device through another message. The "analysis report notification message" is also an example, and is not a limitation. The management data analytics device may notify or push the analysis report to the first-hierarchy network management device through another message.

S508: The first-hierarchy network management device sends a status report request message or a status report subscription request message to the second-hierarchy network management device, where the status report request message or the status report subscription request message includes the identifier or the identifier list that is of the second-hierarchy managed object and that is received in S504.

S509: The second-hierarchy network management device performs an operations and maintenance operation.

Specifically, the second-hierarchy network management device obtains, from the management data analytics device, analysis data of the second-hierarchy managed objects included in or associated with the first-hierarchy managed objects, generates decision data based on the analysis data, and then forms execution data. The decision data is a management operation that is decided based on the analysis data and that is to be performed on the second-hierarchy managed object, and the execution data is a result of the management operation performed on the second-hierarchy managed objects based on the decision data. For a specific process, refer to descriptions in another embodiment of this application, for example, an embodiment corresponding to S401, FIG. 6, or FIG. 7.

S510: The second-hierarchy network management device sends an operations and maintenance status response message or an operations and maintenance status notification message to the first-hierarchy network management device, where the operations and maintenance status response message or the operations and maintenance status notification message includes a status report of the second-hierarchy managed object.

Specifically, the status report includes any one or more of the following: the analysis data in S509, the decision data in S509, and the execution data in S509.

It should be understood that a sequence between the foregoing processes of S506 and S507 and the foregoing processes of S508 to S510 is not fixed. For example, in a possible solution, the processes of S508 to S510 may be completed between S506 and S507, or may be completed before S505.

It should be understood that the status report of the second-hierarchy managed object may be generated in different steps such as monitoring, analyzing, making management decision, and executing the management decision on the second-hierarchy managed object by the second-hierarchy network management device.

S511: The first-hierarchy network management device generates second management indication information based on the performance indicator requirement of the first-hierarchy managed object and the analysis report and/or the status report.

Figure 6:
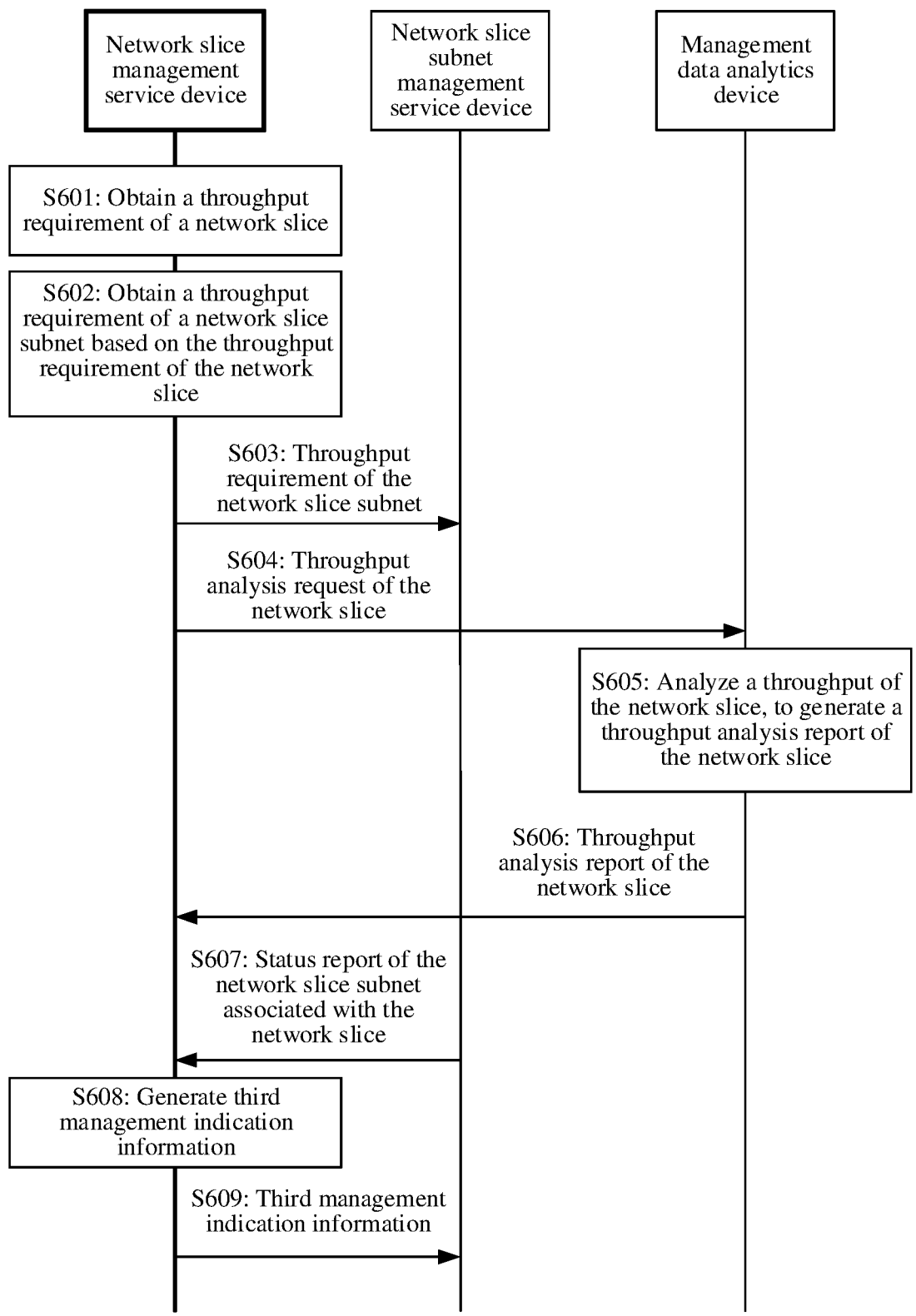
FIG. 6 is a schematic flowchart 3 of a network management method according to an embodiment of this application.
Figure 7:
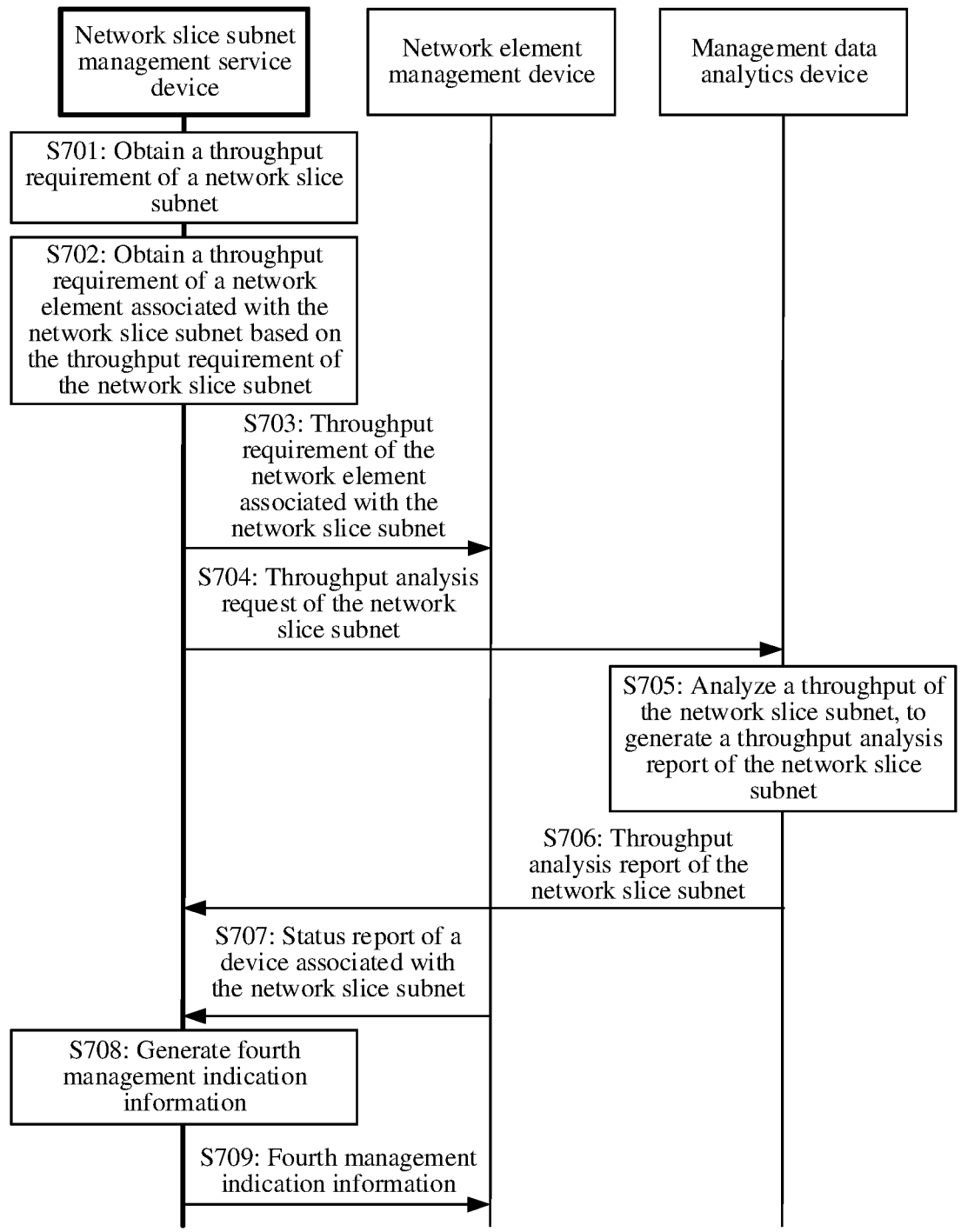
FIG. 7 is a schematic flowchart 4 of a network management method according to an embodiment of this application.
Figure 8:
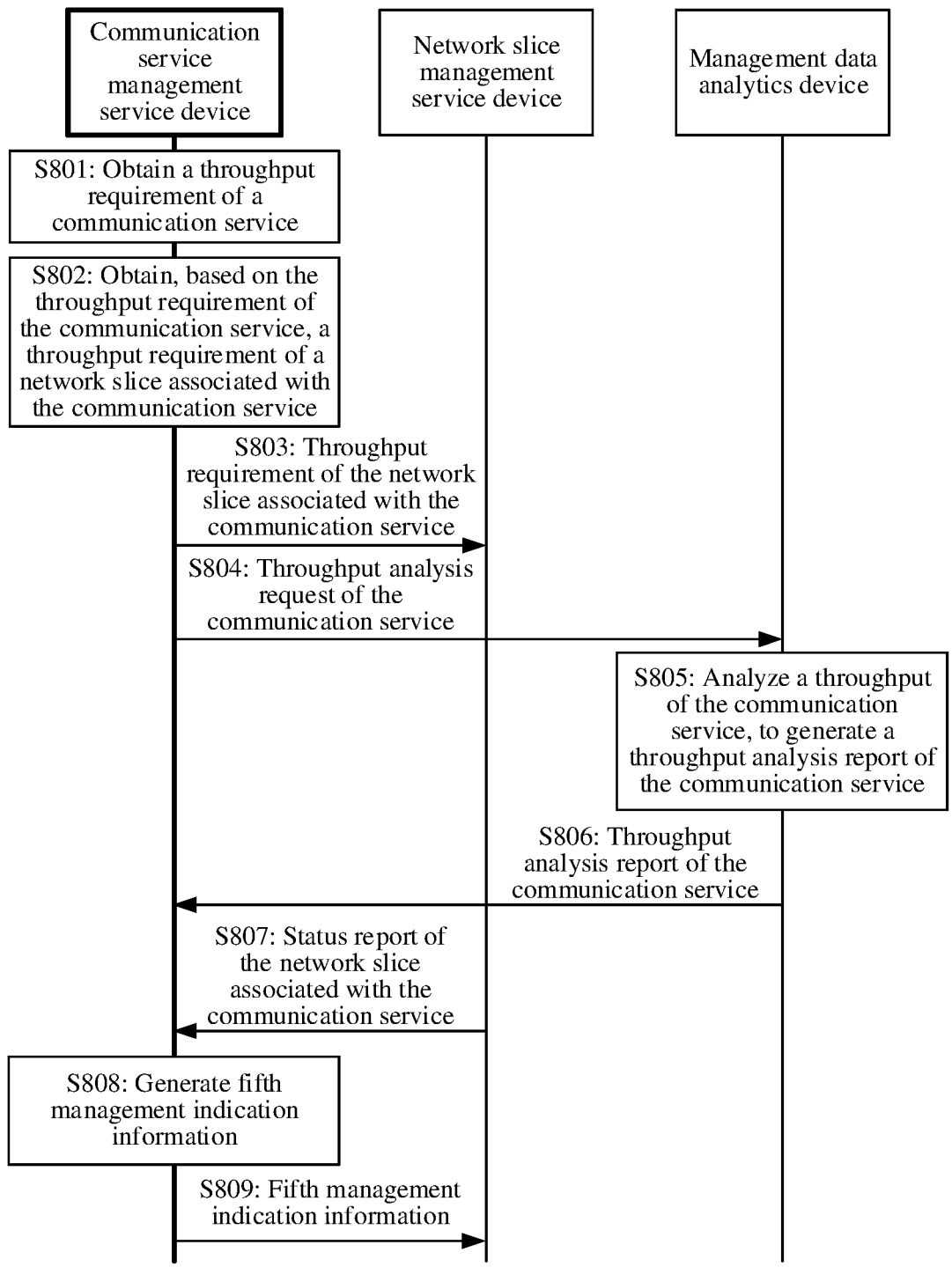
FIG. 8 is a schematic flowchart 5 of a network management method according to an embodiment of this application.

For this process, refer to descriptions in another embodiment of this application, for example, an embodiment corresponding to S402, FIG. 6, FIG. 7, or FIG. 8.

It should be understood that the analysis report and the status report are not necessarily required for the first-hierarchy network management device to generate the second management indication information, to be specific, the first-hierarchy network management device may generate the second management indication information based on any one of the following:

the performance indicator requirement of the first-hierarchy managed object and the analysis report;

the performance indicator requirement of the first-hierarchy managed object and the status report of the second-hierarchy managed object; and the performance indicator requirement of the first-hierarchy managed object, the analysis report, and the status report of the second-hierarchy managed object.

In this way, when the analysis report is not required, the process of S505 to S507 may be omitted; and when the status report is not required, the process of S508 to S510 may be omitted.

S512: The first-hierarchy network management device sends a closed-loop control message to the second-hierarchy network management device, where the closed-loop control message includes the second management indication information.

Specifically, the first-hierarchy network management device sends the closed-loop control message to the second-hierarchy network management device, where the closed-loop control message includes the second management indication information. The second-hierarchy network management device receives the closed-loop control message, obtains the second management indication information in the closed-loop control message, and manages the second-hierarchy managed object based on the second management indication information. In some embodiments, the second-hierarchy network management device sends a result of managing the second-hierarchy managed object to the first-hierarchy network management device.

It should be understood that the "closed-loop control message" is an example, and is not a limitation. The first-hierarchy network management device may send the second management indication information to the second-hierarchy network management device through another message.

It should be understood that a process of S505 to S512 may be periodically performed, to continuously maintain consistency between an actual performance indicator and the performance indicator requirement that are of the first-hierarchy managed object.

According to the method procedure corresponding to FIG. 5A and FIG. 5B, the first-hierarchy network management device may obtain a network configuration difference based on feedback results of the management data analytics device and the second-hierarchy network management device, and manage the second-hierarchy managed object based on the network configuration difference. A data analysis capability is provided by the management data analytics device, and this reduces complexity and a performance burden of the first-hierarchy network management device.

FIG. 6 is a schematic flowchart 3 of a network management method according to an embodiment of this application. The network management method is applicable to the network management system shown in FIG. 1 or FIG. 2, and is configured to implement network slice closed-loop control/network slice instance closed-loop control in Table 2. A network slice management service device corresponds to the foregoing first-hierarchy network management device, a network slice corresponds to the foregoing first-hierarchy managed object, a network slice subnet management service device corresponds to the foregoing second-hierarchy network management device, and one of one or more network slice subnets for implementing a network slice corresponds to the foregoing second-hierarchy managed object. The network management method includes the following steps.

S601: The network slice management service device obtains a throughput requirement of the network slice.

For example, the throughput requirement of the network slice may be 80% of an average DL and/or UL throughput of network slice users, for example, may be 100 Mbps.

For example, the network slice management service device may obtain an identifier of the network slice and the throughput requirement of the network slice from a communication service management service device. For a specific implementation, refer to technology of some approaches. Details are not described in this embodiment of this application.

S602: The network slice management service device obtains a throughput requirement of a network slice subnet based on the throughput requirement of the network slice.

Specifically, the network slice management service device may obtain a DL and/or UL throughput requirement of one or more network slice subnets based on the throughput requirement of the network slice. For example, the average DL and/or UL throughputs of an access network subnet and a core network subnet may be 200 Mbps and 100 Mbps respectively.

S603: The network slice management service device sends the throughput requirement of the network slice subnet to the network slice subnet management service device, and the network slice subnet management service device receives the throughput requirement of the network slice subnet.

Specifically, the network slice management service device sends the throughput requirement of the one or more network slice subnets to the network slice subnet management service device. The network slice subnet management service device receives the throughput requirement of the one or more network slice subnets, and creates or updates the one or more network slice subnets based on the throughput requirement. To be specific, if the one or more network slice subnets have not been created, the one or more network slice subnets are created based on the received throughput requirement; or if the one or more network slice subnets have been created, the one or more network slice subnets are updated based on the received throughput requirement.

S604: The network slice management service device sends a throughput analysis request for the network slice to a management data analytics device, and the management data analytics device receives the throughput analysis request for the network slice.

Specifically, the network slice management service device may send, to the management data analytics device through a standard interface, a request message used to request an analysis report of the network slice. The request message may include one or more of the following: a network slice identifier or a single network slice selection assistance identifier (single network slice selection assistance information, S-NSSAI), or an analysis item identifier. The network slice identifier is used to identify a network slice or a network slice instance, to request analysis data of the network slice or the network slice instance corresponding to the network slice identifier. The analysis item identifier is used to identify a to-be-analyzed data item, to request analysis data corresponding to the data item identifier. The analysis item identifier may include a data type (such as a performance type, an alarm type, and a configuration type) and a data name/key (key). For example, "performance/delay" indicates to request analysis data of a delay in performance data. For details, refer to S505. Details are not described again.

S605: The management data analytics device analyzes a throughput of the network slice, to generate a throughput analysis report of the network slice.

Specifically, after receiving the throughput analysis request of the network slice, the management data analytics device requests a performance management device/fault management device to report a throughput performance measurement/alarm report of the network slice. The performance management device/fault management device sends the throughput performance measurement/alarm report of the network slice to the management data analytics device. The management data analytics device receives the throughput performance measurement/alarm report of the network slice, and analyzes the throughput of the network slice, to generate the throughput analysis report of the network slice.

S606: The management data analytics device sends the throughput analysis report of the network slice to the network slice management service device, and the network slice management service device receives the throughput analysis report of the network slice.

For an item included in the analysis report of the network slice, refer to the descriptions of the analysis report of the first-hierarchy managed object in S401. For example, the analysis report of the network slice may include throughput statistics data, throughput prediction data, throughput distribution data, and throughput requirement analysis data of the network slice.

S607: The network slice subnet management service device sends, to the network slice management service device, a status report of the network slice subnet associated with the network slice, and the network slice management service device receives the status report of the network slice subnet associated with the network slice.

Specifically, for a process in which the network slice management service device obtains, from the network slice subnet management service device, the status report of the network slice subnet associated with the network slice, refer to the process in S508 to S510. Details are not described herein again.

For an item included in the status report of the network slice subnet associated with the network slice, refer to the descriptions of the status report of the second-hierarchy managed object in S401. For ease of differentiation, analysis data, decision data, and execution data that may be included in the status report of the network slice subnet associated with the network slice are respectively referred to as first analysis data, first decision data, and first execution data.

It is assumed that the first analysis data includes one or more of the following: a mapping relationship between throughput distribution and QoE of the corresponding network slice subnet (namely, the network slice subnet associated with the network slice, which is the same below), a difference between an actual throughput and a target throughput of the corresponding network slice subnet and a root cause, or service information of the corresponding network slice subnet whose throughput is unqualified.

It is assumed that the first decision data includes one or more of the following: a throughput control policy of the corresponding network slice subnet, a network configuration quantity of the corresponding network slice subnet, or a configuration management quantity of a network configuration maximum value or guaranteed value of the corresponding network slice subnet. The network configuration quantity or the configuration management quantity of the network configuration maximum value or guaranteed value is decision made for analysis information or a suggestion related to operations and maintenance in the first analysis data, for example, management decision information such as adding, modifying, or deleting a resource of the related network slice subnet and a corresponding resource quantity, or management decision information such as adding, modifying, or deleting a resource of the related network slice subnet, newly adding a network slice subnet, deleting the related network slice subnet, or adding, modifying, or deleting a configuration parameter of the related network slice subnet.

It is assumed that the first execution data includes one or more of the following: a network configuration action, a configuration quantity, or an execution result that is performed for the corresponding network slice subnet, and is a management behavior and a management result of the network slice subnet management service device for the first decision data.

It should be noted that S606 and S607 may be completely or partially performed. When the steps are completely performed, S607 may be performed before S606, or may be performed after S606. This is not specifically limited in this embodiment of this application. When the steps are partially performed, only one of S606 and S607 may be performed. In this case, the other step may be considered as an optional step.

S608: The network slice management service device generates third management indication information.

Specifically, the network slice management service device generates the third management indication information based on a performance indicator of the network slice and the analysis report in S606 and/or the status report in S607.

The third management indication information indicates the network slice subnet management service device to manage the network slice subnet associated with the network slice, and may specifically include one or more of the following: a management operation performed on the network slice subnet associated with the network slice, a configuration requirement for the network slice subnet associated with the network slice, or a performance requirement for the network slice subnet associated with the network slice.

The management operation performed on the network slice subnet associated with the network slice may include one or more of the following: adding a network resource of one or more network slice subnets associated with the network slice, deleting a network resource of one or more network slice subnets associated with the network slice, activating or deactivating a network slice subnet associated with the network slice, or modifying a parameter of one or more network slice subnets associated with the network slice.

The following items (1), (2), and (3) separately describe, by using examples, how the network slice management service device generates the third management indication information.

(1) In some embodiments, the network slice management service device may generate the third management indication information based on a performance indicator requirement of the network slice and the analysis report of the network slice. An example is as follows.

It is assumed that the analysis report includes measurement analysis information related to the performance indicator of the network slice. When the network slice management service device determines, based on the measurement analysis information, that a measured value of the performance indicator of the network slice is lower than the performance indicator requirement of the network slice (that is, determines that there is a performance indicator difference), the generated third management indication information indicates (the network slice subnet management service device) to add a resource of one or more network slice subnets associated with the network slice, newly add a network slice subnet, or activate a network slice subnet in a deactivated state, to improve a measurement result of the performance indicator and improve an SLA satisfaction degree by adding a network resource. In this case (in which the measured value is less than the requirement), In some embodiments, the analysis report of the network slice may also include a suggestion on a resource of the newly added network slice subnet or a suggestion on the newly added network slice subnet, so that the third management indication information may also be generated based on the suggestion. When the network slice management service device determines, based on the measurement analysis information, that a measured value of the performance indicator of the network slice is greater than the performance indicator requirement of the network slice (that is, determines that there is a performance indicator difference), the generated third management indication information indicates (the network slice subnet management service device) to reduce a resource of one or more network slice subnets associated with the network slice, delete a network slice subnet related to the network slice, or deactivate a network slice subnet associated with the network slice, to reduce a resource vacancy rate and improve network resource utilization by reducing a network resource. Similarly, in this case (in which the measured value is greater than the requirement), In some embodiments, the analysis report of the network slice may also include a suggestion on reducing the resource of the network slice subnet or deleting or deactivating the network slice subnet, so that the third management indication information may also be generated based on the suggestion.

In some embodiments, the network slice management service device may alternatively generate the third management indication information based on performance analysis information that is of the network slice subnet (such as a radio access network slice subnet, a core network slice subnet, or a transport network slice subnet) associated with the network slice and that is included in the analysis report of the network slice.

(2) In some embodiments, the network slice management service device may alternatively generate the third management indication information based on a performance indicator requirement of the network slice and the status report of the network slice subnet associated with the network slice.

(2.1) In some embodiments, the network slice management service device may generate the third management indication information based on analysis data (namely, the first analysis data in S607) included in the status report of the network slice subnet associated with the network slice, for example, measurement analysis information of a performance indicator of the network slice subnet (such as a radio access network slice subnet, a core network slice subnet, or a transport network slice subnet). An example is as follows.

It is assumed that the status report includes the measurement analysis information of the performance indicator of the network slice subnet associated with the network slice. When the network slice management service device determines, based on the measurement analysis information, that a measured value of the performance indicator of the network slice subnet associated with the network slice is lower than the performance indicator requirement of the network slice subnet (where the performance indicator requirement is obtained based on the performance indicator requirement of the network slice), the generated third management indication information indicates (the network slice subnet management service device) to add a resource of the network slice subnet associated with the network slice, newly add a network slice subnet, or activate a network slice subnet in a deactivated state, that is, add a network resource to improve the measurement result of the performance indicator. When the network slice management service device determines, based on the measurement analysis information, that a measured value of the performance indicator of the network slice subnet associated with the network slice is greater than the performance indicator requirement of the network slice subnet, the generated third management indication information indicates to reduce a resource of the network slice subnet associated with the network slice, delete the network slice subnet, or deactivate the network slice subnet, to improve resource utilization efficiency.

In addition to the foregoing measurement analysis information of the performance indicator, the first analysis data may further include other information, and may also be used to determine the third management indication information. This is further described in the following by using examples.

For example, the first analysis data includes a mapping relationship between network slice QoE and an average throughput (UL or DL throughput, which is the same below) level of the network slice subnet. The network slice management service device may determine, based on the mapping relationship, an area whose throughput is unqualified, and may collect statistics on a proportion, in coverage of the network slice, of areas whose throughput is unqualified. For example, coverage information corresponding to a location of the terminal device is recorded when statistics on throughput information are collected. The coverage information may include information such as a geographic grid ID, longitude and latitude information, cell information, and a beam ID. The area whose throughput is unqualified or an area whose throughput is qualified may be determined based on the coverage information corresponding to the location of the terminal device, so as to calculate a QoE satisfaction degree of the coverage. The network slice management service device may obtain information about a throughput of the network slice subnet associated with the network slice. The information about the throughput of the network slice subnet associated with the network slice may include one or more of the following: throughput distribution location information, time information, a correspondence between a throughput and service experience QoE, service experience or QoS coverage information, and radio signal quality information at a coverage location. For example, a QoE value of a geographic grid 1 is 4, a throughput level is 4, and a signal strength level is 4; and a QoE value of a geographic grid 2 is 3, a throughput level is 4, and a signal strength level is 3. For example, the levels are 1, 2, 3, 4, and 5. The geographic grid may be a regular hexagon or square area with a side of 5 meters.

When determining that the proportion of areas whose throughput is unqualified is greater than a preset threshold, the network slice management service device determines that the throughput of the network slice subnet associated with the network slice is unqualified. In addition, the network slice management service device may make a network configuration management policy based on the specific proportion of areas whose throughput is unqualified. For example, a corresponding resource configuration is added or a DL and/or UL throughput requirement is reduced, so as to improve a throughput requirement satisfaction degree. The network slice management service device may obtain status reports of a plurality of network slice subnets associated with the network slice, and make a management policy, for example, request to configure more network resources for a network slice subnet, for network configurations of the plurality of network slice subnets based on information that is about the proportion of areas whose throughput is unqualified and that is in the plurality of status reports, the analysis report of the network slice, priority information of the network slice subnets, resource availability information, and the like. Because the network slice management service device may obtain end-to-end network information, performance of the plurality of network slice subnets associated with the network slice may be improved based on the new third management indication information, to improve performance of the network slice. For example, when a proportion, in a coverage range of a network slice subnet, of a quantity of geographical grids corresponding to the network slice subnet that is associated with the network slice and whose throughput level is 3 or lower exceeds 30%, it is determined that a throughput in coverage of the network slice subnet is unqualified. In this way, the network slice management service device needs to request the network slice subnet management device to configure additional corresponding radio resources for scheduling a service of a terminal device in coverage of a network slice subnet whose throughput is unqualified, to improve the throughput. For example, N additional radio resource blocks may be allocated to each terminal device with degraded performance (namely, a terminal device with degraded quality of service), where N is a positive integer, and a specific value of N is related to a radio resource management algorithm. When all throughputs of the plurality of network slice subnets associated with the network slice are unqualified, the network slice management service device requests, based on a priority of the network slice subnet and a resource availability status, the network slice subnet management service device to configure different radio resource blocks for the corresponding network slice subnet. For example, a network slice subnet management service device 1 is requested to allocate N−10 additional radio resource blocks to each terminal device with degraded performance, and a network slice subnet management service device 2 is requested to allocate N+10 additional radio resource blocks to each terminal device with degraded performance.

For another example, the first analysis data may include a difference between an average throughput level of the network slice subnet and a throughput target of the network slice subnet and a root cause, and the network slice management service device may determine, based on the information, that a low throughput is caused by a high load of the network slice, so as to improve a throughput requirement satisfaction degree by adding a resource configuration.

For example, the network slice management service device determines a load of the coverage based on one or more of the following: a quantity of users in the coverage of the network slice, a user traffic volume, or a radio resource proportion. For example, when there are more than two users in each geographic grid, the user traffic volume exceeds 10 megabits per second (megabits per second, Mbps), and the radio resource proportion exceeds 70%, it can be determined that the load of the coverage is high. In this way, the network slice management service device may improve a throughput of an online user through one or more of the following: reducing a service rate of the terminal device, restricting access of a new terminal device, restricting creation of a new service, and adding a radio resource configuration.

For another example, the first analysis data may include a list of cells/base stations with degraded average throughput performance of the network slice subnet, and the network slice management service device may obtain, from the data, a list of cells or base stations whose throughput is unqualified, so as to request the network slice subnet management service device to perform a corresponding management behavior for the cells or base stations. The network slice subnet management service device may further request a network element management service device to perform the corresponding management behavior. For example, if the proportion, in a range of a cell, of the quantity of geographic grids corresponding to a throughput level 3 or lower exceeds 30%, it may be considered that a throughput of the cell is unqualified. Further, an identifier of the unqualified cell and an identifier of a base station corresponding to the unqualified cell may be added to the list of base stations or cells whose throughput is unqualified. In this way, the network slice management service device may add a radio access network resource in the cell whose throughput is unqualified, to improve an uplink throughput of the cell.

For still another example, the first analysis data may include statistics data about a quantity of terminal devices/a quantity of connections/signal strength distribution/service type distribution in coverage with degraded average throughput performance of the network slice subnet. The network slice management service device may obtain, from the statistics data, a quantity of users, a quantity of links, radio signal quality information, and service type information in an area whose throughput is unqualified, so as to perform a corresponding management behavior for a base station or a cell. For example, the network slice management service device adds a radio access network resource or manages a load balancing policy in the cell, so as to improve an uplink throughput of the cell.

In an example, the network slice management service device hands over some services or terminal devices to another cell or another frequency band, so that the services or terminal devices are evenly distributed in coverage overlapping areas of neighboring cells or different frequencies. For example, a quantity of users in each cell or frequency band is maintained in a range of 30 to 50, and an average traffic volume in each geographic grid is maintained as about 10 Mbps.

For yet another example, the first analysis data may include QoS measurement analysis of a service with a degraded average throughput performance of the network slice subnet, and the network slice management service device may obtain, through analysis from the data, measurement information of a QoS flow corresponding to a service whose throughput is unqualified. The measurement information of the QoS flow may include but is not limited to a delay, a rate, and a packet loss rate. Further, the network slice management service device may obtain a correspondence between a throughput, a QoS flow configuration, and QoS indicator measurement. In this way, the network slice management service device may change a DL and/or UL throughput by managing a QoS flow priority configuration.

For example, the network slice management service device compares priority configuration information of the QoS flow with actual measurement information of the QoS flow. The priority configuration information of the QoS flow may include a QoS flow type. The QoS flow type may include values such as 3, 5, 7, and 9, and each value represents indicator information such as a priority, a delay, a rate, and a packet loss rate of the QoS flow. If an indicator in the actual measurement information is lower than a preset proportion of the corresponding indicator in the priority configuration information, the network slice management service device may increase the priority of the QoS flow by n levels, where n is a positive integer. For example, if a rate in the actual measurement information is lower than 80% of a rate in the priority configuration information, the network slice management service device may increase the priority of the QoS flow by one level. The network slice management service device increases the priority of the QoS flow, so that the corresponding terminal device or service can obtain more resources during scheduling, to improve the DL throughput and/or the UL throughput.

(2.2) In some embodiments, the network slice management service device may further generate the third management indication information based on the decision data (namely, the first decision data in S607) and/or the execution data (namely, the first execution data in S607) in the status report of the network slice subnet associated with the network slice.

When the decision information includes information such as adding a network slice subnet resource, newly adding a network slice subnet, reducing a resource, or deleting a network slice subnet, the network slice management service device determines, based on a current network resource availability status, network slice subnet analysis information, execution result information, and a status report of another network slice subnet, whether decision of the network slice subnet management service device is valid, and determines whether to maintain the decision of the network slice subnet management service device or modify the decision of the network slice subnet management service device. Alternatively, the status report of the network slice subnet associated with the network slice may include the decision information of the network slice subnet but does not include execution result information, and may indicate whether the decision information has been executed. If the decision information is not executed, it indicates that the network slice subnet management service device requests the network slice management service device to determine feasibility of the decision information. In this case, the network slice management service device may adjust or improve the decision information based on a network resource managed by the network slice management service device, to generate the third management indication information. For example, the network slice management service device determines whether resources of the quantity that is in the decision information can be allocated, and performs adjustment based on a determining result, to form the third management indication information.

(3) In some embodiments, the network slice management service device may further generate the third management indication information based on a performance indicator requirement of the network slice, the analysis report of the network slice, and the status report of the network slice subnet associated with the network slice. An example is as follows.

When the network slice management service device determines that information indicated by the analysis report of the network slice is consistent with information indicated by the status report of the network slice subnet associated with the network slice, for example, determines, based on the analysis report of the network slice, that a measured value of the performance indicator of the network slice is lower than (or higher than) the performance indicator requirement of the network slice, and determines, based on the status report of the network slice subnet associated with the network slice, that a measured value of a performance indicator corresponding to the network slice subnet is lower than (or higher than) a performance indicator requirement (obtained based on the performance indicator requirement of the network slice) of the network slice subnet, and when resource utilization of the network slice subnet is lower than (or higher than) a preset threshold, the network slice management service device determines that a resource configuration of one or more network slice subnets needs to be added (or reduced), and the generated third management indication information indicates (the network slice subnet management service device) to add (or reduce) a resource configuration of a network slice subnet. When the network slice management service device determines that information indicated by the analysis report of the network slice is inconsistent with information indicated by the status report of the network slice subnet associated with the network slice, the network slice management service device determines, based on status reports and historical statuses of a plurality of network slice subnets, to add, maintain, or reduce a resource configuration of a network slice subnet, and the generated third management indication information indicates to add, maintain, or reduce the resource configuration of the network slice subnet.

It should be noted that for specific content of the analysis report of the network slice and the status report of the network slice subnet associated with the network slice, refer to the descriptions in S401. Details are not described herein again.

In some embodiments, the network slice management service device may first determine a first management operation set based on the performance indicator requirement of the network slice, the analysis report of the network slice, and/or the status report of the network slice subnet associated with the network slice, and then generate the third management indication information based on the first management operation set. The first management operation set is a set of management operations to be performed on the network slice subnet associated with the network slice, and includes any one or more of the following: adding a network slice subnet, deleting a network slice subnet, modifying a network configuration of a network slice subnet, and modifying a running parameter of a network slice subnet.

It should be understood that the third management indication information is also referred to as configuration requirement information.

S609: The network slice management service device sends the third management indication information to the network slice subnet management service device, and the network slice subnet management service device receives the third management indication information.

Specifically, for a manner in which the network slice management service device sends the third management indication information to the network slice subnet management service device, refer to the descriptions in S512. Details are not described herein again. The network slice subnet management service device receives the third management indication information, and manages the network slice subnet based on the third management indication information, for example, adds a network slice subnet, deletes a network slice subnet, or modifies a network configuration of a network slice subnet. In some embodiments, the network slice subnet management service device sends, to the network slice management service device, a result of managing the network slice subnet, for example, an identifier of the added network slice subnet and indication information indicating that the network slice subnet is successfully deleted.

In the method procedure corresponding to FIG. 6, the network slice management service device may determine a network configuration difference based on the performance indicator requirement of the network slice managed by the network slice management service device and the analysis report of the network slice and/or the status report of the network slice subnet included in or associated with the network slice, and then manage the network slice subnet based on the network configuration difference, to eliminate or reduce the network configuration difference, and further eliminate or reduce a difference between the actual performance indicator and the specified performance indicator requirement that are of the network slice, so that consistency between the two is improved, and both a satisfaction degree of the performance indicator requirement of the network slice and utilization of a network resource allocated to the network slice are ensured.

FIG. 7 is a schematic flowchart 4 of a network management method according to an embodiment of this application. The network management method is applicable to the network management system shown in FIG. 1 or FIG. 2, and is configured to implement network slice subnet closed-loop control/network slice subnet instance closed-loop control in Table 2. A network slice subnet management service device corresponds to the foregoing first-hierarchy network management device, a network slice subnet corresponds to the foregoing first-hierarchy managed object, a network element management device corresponds to the foregoing second-hierarchy network management device, for example, a network function management function device or a network function virtualization orchestrator device, and one or more network devices or network elements configured to implement the network slice subnet correspond to the foregoing second-hierarchy managed object. The network management method includes the following steps.

S701: The network slice subnet management service device obtains a throughput requirement of the network slice subnet.

For example, the throughput requirement of the network slice subnet may be 80% of an average DL and/or UL throughput of network slice users, for example, may be 100 Mbps.

For example, the network slice subnet management service device may obtain an identifier of the network slice subnet and the throughput requirement of the network slice subnet from a network slice management service device. For a specific implementation, refer to technology of some approaches. Details are not described in this embodiment of this application.

S702: The network slice subnet management service device obtains, based on the throughput requirement of the network slice subnet, a throughput requirement of a network element associated with the network slice subnet.

Specifically, the network slice subnet management service device may obtain a DL and/or UL throughput requirement of one or more network elements based on the throughput requirement of the network slice subnet. For example, an average DL and/or UL throughput of an access network network element 1 and a core network network element 1 may be 20 Mbps and 10 Mbps respectively.

S703: The network slice subnet management service device sends, to the network element management device, the throughput requirement of the network element associated with the network slice subnet, and the network element management device receives the throughput requirement of the network element.

Specifically, the network slice subnet management service device sends the throughput requirement of the one or more network elements to the network element management device. The network element management device receives the throughput requirement of the one or more network elements, and newly adds, creates, or updates the one or more network elements based on the throughput requirement. To be specific, if the one or more network elements have not been newly added or created, the one or more network elements are newly added or created based on the received throughput requirement; or if the one or more network elements have been newly added or created, the one or more network elements are updated based on the received throughput requirement.

S704: The network slice subnet management service device sends a throughput analysis request for the network slice subnet to a management data analytics device, and the management data analytics device receives the throughput analysis request for the network slice subnet.

Specifically, the network slice subnet management service device may send, to the management data analytics device through a standard interface, a request message used to request an analysis report of the network slice subnet. The request message may include one or more of the following: a network slice subnet identifier or a network element identifier, or an analysis item identifier. The network slice subnet identifier is used to request to analyze a specific network slice subnet or network slice subnet instance. For the analysis item identifier, refer to related descriptions in S604. For details, refer to S505. Details are not described again.

S705: The management data analytics device analyzes a throughput of the network slice subnet, to generate a throughput analysis report of the network slice subnet.

Specifically, after receiving the throughput analysis request of the network slice subnet, the management data analytics device requests a performance management device/fault management device to report a throughput performance measurement/alarm report of the network slice subnet. The performance management device/fault management device sends the throughput performance measurement/alarm report of the network slice subnet to the management data analytics device. The management data analytics device receives the throughput performance measurement/alarm report of the network slice subnet, and analyzes the throughput of the network slice subnet, to generate the throughput analysis report of the network slice subnet.

S706: The management data analytics device sends the throughput analysis report of the network slice subnet to the network slice subnet management service device, and the network slice subnet management service device receives the throughput analysis report of the network slice subnet.

For an item included in the analysis report of the network slice subnet, refer to the descriptions of the analysis report of the first-hierarchy managed object in S401. For example, the analysis report may include throughput statistics data of the network slice subnet, an average packet loss rate that is of the network slice subnet and whose statistics are collected on a per-service basis or a per-user basis, a minimum packet loss rate that is of the network slice subnet and whose statistics are collected on a per-service basis or a per-user basis, and a maximum packet length that is of the network slice subnet and whose statistics are collected on a per-service basis or a per-user basis.

Management of a resource of the network slice subnet includes operations such as adding, modifying, and deleting the resource of the network slice subnet. Management of a resource of a device associated with the network slice subnet includes one or more of the following: adding, modifying, or deleting the resource of the device associated with the network slice subnet, newly adding an associated device to the network slice subnet, or deleting an associated device from the network slice subnet. Management of a configuration parameter of the network slice subnet or the device associated with the network slice subnet includes one or more of the following: adding, modifying, or deleting the configuration parameter of the network slice subnet or the device associated with the network slice subnet. For specific content of the analysis report, refer to the analysis data in the foregoing Table 3 to Table 6. Details are not described herein again.

It should be noted that the network slice subnet management service device may send the request message to the management data analytics device through a standard interface, where the request message is used to request the management data analytics device to feed back the analysis report of the network slice subnet. The request message may include one or more of the following: a network slice subnet identifier or S-NSSAI, or an analysis item identifier.

It should be understood that the network slice subnet management service device may also manage a network configuration of the network slice subnet based on content of the analysis report of the network slice subnet, to further improve accuracy of managing a related configuration of a performance indicator such as a throughput and/or a delay. For a specific implementation, refer to S402. Details are not described herein again.

S707: The network element management device sends, to the network slice subnet management service device, a status report of the device associated with the network slice subnet, and the network slice subnet management service device receives the status report of the device associated with the network slice subnet.

Specifically, for a process in which the network slice subnet management service device obtains, from the network element management device, the status report of the device associated with the network slice subnet, refer to the process in S508 to S510. Details are not described herein again.

For an item included in the status report of the device associated with the network slice subnet, refer to the descriptions of the status report of the second-hierarchy managed object in S401. For ease of differentiation, analysis data, decision data, and execution data that may be included in the status report of the device associated with the network slice subnet are respectively referred to as second analysis data, second decision data, and second execution data.

It is assumed that the second analysis data includes one or more of the following: a mapping relationship between throughput distribution and QoE of the corresponding device (namely, the device or the network element associated with the network slice subnet, which is the same below), a difference between an actual throughput and a target throughput of the corresponding device and a root cause, or service information of the corresponding device whose throughput is unqualified.

It is assumed that the second decision data includes one or more of the following: a throughput control policy of the corresponding device, a network configuration quantity of the corresponding device, or a configuration management quantity of a network configuration maximum value or guaranteed value of the corresponding device. The network configuration quantity or the configuration management quantity of the network configuration maximum value or guaranteed value is decision made for analysis information or a suggestion related to operations and maintenance in the second analysis data, for example, management decision information such as adding, modifying, or deleting a resource of the related device and a corresponding resource quantity, or management decision information such as adding, modifying, or deleting a resource of the related device, newly adding a device, deleting the related device, or adding, modifying, or deleting a configuration parameter of the related device.

It is assumed that the second execution data includes one or more of the following: a network configuration action, a configuration quantity, or an execution result that is performed for the corresponding device, and is a management behavior and a management result of the network element management device for the second decision data.

It should be noted that S706 and S707 may be completely or partially performed. When the steps are completely performed, S707 may be performed before S706, or may be performed after S706. This is not specifically limited in this embodiment of this application. When the steps are partially performed, only one of S706 and S707 may be performed. In this case, the other step may be considered as an optional step.

S708: The network slice subnet management service device generates fourth management indication information.

Specifically, the network slice subnet management service device generates the fourth management indication information based on the performance indicator of the network slice subnet and the analysis report in S706 and/or the status report in S707.

The fourth management indication information indicates the network element management device in the network slice subnet to manage configuration information of the device associated with the network slice subnet, and includes one or more of the following: a management operation to be performed on the device associated with the network slice subnet, a configuration requirement of the device associated with the network slice subnet, or a performance requirement of the device associated with the network slice subnet.

The management operation performed on the device associated with the network slice subnet may include one or more of the following: adding one or more devices associated with the network slice subnet, deleting one or more devices associated with the network slice subnet, activating a device that is associated with the network slice subnet and that is in a deactivated state, deactivating a device associated with the network slice subnet, or modifying a parameter of one or more devices associated with the network slice subnet.

The following items (1), (2), and (3) separately describe, by using examples, how the network slice subnet management service device generates the fourth management indication information.

(1) In some embodiments, the network slice subnet management service device may generate the fourth management indication information based on a performance indicator requirement of the network slice subnet and the analysis report of the network slice subnet. An example is as follows.

It is assumed that the analysis report includes measurement analysis information related to the performance indicator corresponding to the network slice subnet. When the measurement analysis information indicates that a measured value is lower than the performance requirement of the indicator, the network slice subnet management service device determines to add a resource of one or more devices associated with the network slice subnet, newly add a device associated with the network slice subnet, or activate a device that is associated with the network slice subnet and that is in a deactivated state, that is, configure more resources to improve a measurement result. In this case (in which the measured value is lower than the requirement), In some embodiments, the analysis report may also include a suggestion on newly adding a device resource or a device. When the measurement analysis information indicates that the measured value is greater than the performance requirement of the indicator, the network slice subnet management service device reduces a resource of one or more devices associated with the network slice subnet, deletes a device associated with the network slice subnet, or deactivates a device associated with the network slice subnet, to improve resource utilization. In this case (in which the measured value is greater than the requirement), In some embodiments, the analysis report may also include a suggestion on reducing a device resource, or deleting or deactivating a device associated with the network slice subnet. The network slice subnet management service device determines, based on performance analysis information that is of a radio access network device, a core network device, and a transport network device and that is included in the analysis report of the network slice subnet, that a resource configuration of one or more devices needs to be added, reduced, or maintained, or a device needs to be added, reduced, or maintained and quantity information of required configurations.

In some embodiments, the network slice subnet management service device also generates the fourth management indication information based on the performance analysis information that is of the device (such as the radio access network device, the core network device, and the transport network device) associated with the network slice subnet and that is included in the analysis report of the network slice subnet.

(2) In some embodiments, the network slice subnet management service device may alternatively generate fourth management indication information based on a performance indicator requirement of the network slice subnet and the status report of the device associated with the network slice subnet.

(2.1) In some embodiments, the network slice subnet management service device may generate the fourth management indication information based on the analysis data (namely, the second analysis data in S607) included in the status report of the device associated with the network slice subnet, for example, measurement analysis information of a performance indicator of the corresponding device (such as a radio access network device, a core network device, or a transport network device). An example is as follows.

It is assumed that the status report includes the measurement analysis information of the performance indicator of the device associated with the network slice subnet. When the network slice subnet management service device determines, based on the measurement analysis information, that a measured value of the performance indicator of the device associated with the network slice subnet is lower than a performance indicator requirement of the device (where the performance indicator requirement is obtained based on the performance indicator requirement of the network slice subnet), the generated fourth management indication information indicates (the network element management device) to add a resource of the device associated with the network slice subnet or activate a device in a deactivated state, that is, add a network resource to improve a measurement result of the performance indicator. When the network slice subnet management service device determines, based on the measurement analysis information, that the measured value of the performance indicator of the device associated with the network slice subnet is greater than the performance indicator requirement of the device, the generated fourth management indication information indicates to reduce a resource of the device associated with the network slice subnet, delete the device associated with the network slice subnet, or deactivate the device associated with the network slice subnet, to improve resource utilization efficiency.

In addition to the foregoing measurement analysis information of the performance indicator, the second analysis data may further include other information, and may also be used to determine the fourth management indication information. This is further described in the following by using examples.

For example, the second analysis data includes a mapping relationship between network slice subnet QoE and statistics on an average throughput (uplink or downlink throughput, which is the same below) level of the network element associated with the network slice subnet. The network slice subnet management service device may determine, based on the mapping relationship, an area whose throughput is unqualified, and collect statistics on a proportion, in coverage of the network slice subnet, of areas whose throughput is unqualified. For example, coverage information corresponding to a location of the terminal device is recorded when statistics on throughput information are collected. The coverage information may include information such as a geographic grid ID, longitude and latitude information, cell information, and a beam ID. The area whose throughput is unqualified or an area whose throughput is qualified may be determined based on the coverage information corresponding to the location of the terminal device, so as to calculate a QoE satisfaction degree of the coverage. The network slice subnet management service device may obtain information about a throughput of the device associated with the network slice subnet. The information about the throughput of the device associated with the network slice subnet may include one or more of the following: throughput distribution location information, time information, a correspondence between a throughput and service experience QoE, service experience or QoS coverage information, and radio signal quality information at a coverage location. For example, a QoE value of a geographic grid 1 is 4, a throughput level is 4, and a signal strength level is 4; and a QoE value of a geographic grid 2 is 3, a throughput level is 4, and a signal strength level is 3. For example, the levels are 1, 2, 3, 4, and 5. The geographic grid may be a hexagon or square area with a side of 5 meters.

When determining that the proportion of areas whose throughput is unqualified is greater than a preset threshold, the network slice subnet management service device determines that the throughput of the device associated with the network slice subnet is unqualified. In addition, the network slice subnet management service device may make a network configuration management policy based on the specific proportion of areas whose throughput is unqualified. For example, a corresponding resource configuration is added or a DL and/or UL throughput requirement is reduced, so as to improve a throughput requirement satisfaction degree. The network slice subnet management service device may obtain status reports of a plurality of devices associated with the network slice subnet, and make a management policy, for example, request to configure more network resources for a device, for network configurations of the plurality of devices based on information that is about the proportion of areas whose throughput is unqualified and that is in the plurality of status reports, analysis reports of the devices associated with the network slice subnet, priority information of the devices associated with the network slice subnet, resource availability information, and the like. Because the network slice subnet management service device may obtain end-to-end network information, performance of the plurality of devices associated with the network slice subnet may be improved based on the new fourth management indication information, to improve performance of the network slice subnet. For example, when a proportion, in a coverage range of a device, of a quantity of geographical grids corresponding to the device that is associated with the network slice subnet and whose throughput level is 3 or lower exceeds 30%, it is determined that a throughput in coverage of the device is unqualified. In this way, the network slice subnet management service device needs to request the network element management device to configure additional corresponding radio resources for scheduling a service of a terminal device in coverage of a device whose throughput is unqualified, to improve the throughput. For example, N additional radio resource blocks may be allocated to each terminal device with degraded performance (namely, a terminal device with degraded quality of service), where N is a positive integer, and a specific value of N is related to a radio resource management algorithm. When all throughputs of the plurality of devices associated with the network slice subnet are unqualified, the network slice subnet management service device requests, based on a priority of the device and a resource availability status, the network element management device to configure different radio resource blocks for the corresponding device. For example, a network element management device 1 is requested to allocate N−10 additional radio resource blocks to each terminal device with degraded performance, and a network element management device 2 is requested to allocate N+10 additional radio resource blocks to each terminal device with degraded performance.

For another example, the second analysis data may include a difference between an average throughput level of the network element of the network slice subnet and a throughput target of the network element of the network slice subnet and a root cause, and the network slice subnet management service device may determine, based on the information, that a low throughput is caused by a high load of the network element of the network slice subnet, so as to improve a throughput requirement satisfaction degree by adding a resource configuration.

For example, the network slice subnet management service device determines a load of coverage based on one or more of the following: a quantity of users in the coverage of the network slice subnet, a user traffic volume, or a radio resource proportion. For example, when there are more than two users in each geographic grid, the user traffic volume exceeds 10 megabits per second (megabits per second, Mbps), and the radio resource proportion exceeds 70%, it can be determined that the load of the coverage is high. In this way, the network slice subnet management service device may improve a throughput of an online user through one or more of the following: reducing a service rate of the terminal device, restricting access of a new terminal device, restricting creation of a new service, and adding a radio resource configuration.

For another example, the second analysis data may include a list of cells/base stations with degraded average throughput performance of the network slice subnet, and the network slice subnet management service device may obtain, from the data, a list of cells or base stations whose throughput is unqualified, so as to request the network element management device to perform a corresponding management behavior for the cells or base stations. For example, if the proportion, in a range of a cell, of a quantity of geographic grids corresponding to a throughput level 3 or lower exceeds 30%, it may be considered that a throughput of the cell is unqualified. Further, an identifier of the unqualified cell and an identifier of a base station corresponding to the unqualified cell may be added to the list of base stations or cells whose throughput is unqualified. In this way, the network slice subnet management service device may add a radio access network resource in the cell whose throughput is unqualified, to improve an uplink throughput of the cell.

For another example, the second analysis data may include statistics data about a quantity of terminal devices/a quantity of connections/signal strength distribution/service type distribution in coverage with degraded average throughput performance of the network slice subnet. The network slice subnet management service device may obtain, from the statistics data, a quantity of users, a quantity of links, radio signal quality information, and service type information in an area whose throughput is unqualified, so as to perform a corresponding management behavior for a base station or a cell. For example, the network slice subnet management service device adds a radio access network resource or manages a load balancing policy in the cell, so as to improve an uplink throughput of the cell.

In an example, the network slice subnet management service device hands over some services or terminal devices to another cell or another frequency band, so that the services or terminal devices are evenly distributed in coverage overlapping areas of neighboring cells or different frequencies. For example, a quantity of users in each cell or frequency band is maintained in a range of 30 to 50, and an average traffic volume in each geographic grid is maintained as about 10 Mbps.

For another example, the second analysis data may include QoS measurement analysis of a service with degraded average throughput performance of the network element of the network slice subnet, and is measurement information of a QoS indicator of the network element, for example, a processing delay of the network element or a throughput of the network element. The network slice subnet management service device may obtain, from the data through analysis, measurement information of a QoS flow corresponding to a service that is of the network element and whose throughput is unqualified. The measurement information of the QoS flow may include but is not limited to a delay, a rate, and a packet loss rate. Further, the network slice subnet management service device may obtain a correspondence between a throughput, a QoS flow attribute configuration, and QoS indicator measurement. In this way, the network slice subnet management service device may change a DL and/or UL throughput by managing a QoS priority configuration.

For example, the network slice subnet management service device compares priority configuration information of the QoS flow with actual measurement information of the QoS flow. The priority configuration information of the QoS flow may include a QoS flow type. The QoS flow type may include values such as 3, 5, 7, and 9, and each value represents indicator information such as a priority, a delay, a rate, and a packet loss rate of the QoS flow. If an indicator in the actual measurement information is lower than a preset proportion of the corresponding indicator in the priority configuration information, the network slice subnet management service device may increase the priority of the QoS flow by n levels, where n is a positive integer. For example, if a rate in the actual measurement information is lower than 80% of a rate in the priority configuration information, the network slice subnet management service device may increase the priority of the QoS flow by one level. The network slice subnet management service device increases the priority of the QoS flow, so that the corresponding terminal device or service can obtain more resources during scheduling, to improve the DL throughput and/or the UL throughput.

(2.2) In some embodiments, the network slice subnet management service device may further generate the fourth management indication information based on the decision data (namely, the second decision data in S707) and/or the execution data (namely, the second execution data in S707) in the status report of the device associated with the network slice subnet.

When the decision information includes information such as adding a device resource, newly adding a device, reducing a resource, or deleting a device, the network slice subnet management service device determines, based on a resource availability status, analysis information, and execution result information of the network slice subnet and a status report of another network slice subnet, whether decision of the network slice subnet management service device is valid, and determines whether to maintain the decision of the network slice subnet management service device or modify the decision of the network slice subnet management service device. Alternatively, the status report of the device associated with the network slice subnet may include the decision information of the network slice subnet but does not include execution result information, and may indicate whether the decision information has been executed. If the decision information is not executed, it indicates that the network element management device requests the network slice subnet management service device to determine feasibility of the decision information. In this case, the network slice subnet management service device may adjust or improve the decision information based on a network resource managed by the network slice subnet management service device, to generate the fourth management indication information. For example, the network slice subnet management service device determines whether resources of the quantity that is in the decision information can be allocated, and performs adjustment based on a determining result, to form the fourth management indication information.

(3) In some embodiments, the network slice subnet management service device may further generate the fourth management indication information based on a performance indicator requirement of the network slice subnet, the analysis report of the network slice subnet, and the status report of the device associated with the network slice subnet. An example is as follows.

When the network slice subnet management service device determines that information indicated by the analysis report of the network slice subnet is consistent with information indicated by the status report of the device associated with the network slice subnet, for example, determines, based on the analysis report of the network slice subnet, that a measured value of the performance indicator of the network slice subnet is lower than (or higher than) the performance indicator requirement of the network slice subnet, and determines, based on the status report of the device associated with the network slice subnet, that a measured value of a performance indicator corresponding to the device is lower than (or higher than) a performance indicator requirement (obtained based on the performance indicator requirement of the network slice subnet) of the device, and when resource utilization of the device is lower than (or higher than) a preset threshold, the network slice subnet management service device determines that a resource configuration of one or more devices needs to be added (or reduced), and the generated fourth management indication information indicates (the network element management device) to add (or reduce) a resource configuration of a device. When the network slice subnet management service device determines that information indicated by the analysis report of the network slice subnet is inconsistent with information indicated by the status report of the device associated with the network slice subnet, the network slice subnet management service device determines, based on status reports and historical statuses of a plurality of devices, to add, maintain, or reduce a resource configuration of a device, and the generated fourth management indication information indicates to add, maintain, or reduce the resource configuration of the device.

It should be noted that for specific content of the analysis report of the network slice subnet and the status report of the device associated with the network slice subnet, refer to the descriptions in S401. Details are not described herein again.

In some embodiments, the network slice subnet management service device may first determine a second management operation set based on the performance indicator requirement of the network slice subnet and the analysis report of the network slice subnet and/or the status report of the device associated with the network slice subnet, and then generate the fourth management indication information based on the second management operation set. The second management operation set is a set of management operations to be performed on the device associated with the network slice subnet, and includes any one or more of the following: adding a device, deleting a device, modifying network configuration of a device, and modifying a running parameter of a device.

It should be understood that the fourth management indication information is also referred to as configuration requirement information.

S709: The network slice subnet management service device sends the fourth management indication information to the network element management device, and the network element management device receives the fourth management indication information.

Specifically, for a manner in which the network slice subnet management service device sends the fourth management indication information to the network element management device, refer to the descriptions in S512. Details are not described herein again. The network element management device receives the fourth management indication information, and manages the network element in the network slice subnet based on the fourth management indication information, for example, adding a network element, deleting a network element, or modifying a configuration of the network element.

In some embodiments, the network element management device sends, to the network slice subnet management service device, a result of managing the network element in the network slice subnet, for example, an identifier of the added network element and indication information indicating that the configuration of the network element is successfully modified.

In the method procedure corresponding to FIG. 7, the network slice subnet management service device may determine a network configuration difference based on the performance indicator requirement of the network slice subnet managed by the network slice subnet management service device and the analysis report of the network slice subnet and/or the status report of the network element included in or associated with the network slice subnet, and then manage the network element based on the network configuration difference, to eliminate or reduce the network configuration difference, and further reduce a difference between the actual performance indicator and the specified performance indicator requirement that are of the network slice subnet, so that consistency between the two is improved, and both a satisfaction degree of the performance indicator requirement of the network slice subnet and utilization of a network resource allocated to the network slice subnet are ensured.

FIG. 8 is a schematic flowchart 5 of a network management method according to an embodiment of this application. The network management method is applicable to the network management system shown in FIG. 1 or FIG. 2, and is configured to implement communication service closed-loop control/communication service instance closed-loop control in Table 2. A communication service management service device corresponds to the foregoing first-hierarchy network management device, a communication service corresponds to the foregoing first-hierarchy managed object, a network slice management service device corresponds to the foregoing second-hierarchy network management device, and one of one or more network slices for implementing a communication service corresponds to the foregoing second-hierarchy managed object. The network management method includes the following steps.

S801: The communication service management service device obtains a throughput requirement of the communication service.

For example, the throughput requirement of the communication service may be 80% of an average DL and/or UL throughput of communication service users, for example, may be 100 Mbps.

For example, the communication service management service device may obtain the throughput requirement of the communication service from an SLA of the users. For a specific implementation, refer to technology of some approaches. Details are not described in this embodiment of this application.

S802: The communication service management service device obtains, based on the throughput requirement of the communication service, a throughput requirement of a network slice associated with the communication service.

Specifically, the communication service management service device may obtain a DL and/or UL throughput requirement of one or more network slices based on the throughput requirement of the communication service. For example, the average DL and/or UL throughput of the network slice may be 200 Mbps and 100 Mbps respectively.

S803: The communication service management service device sends, to the network slice management service device, the throughput requirement of the network slice associated with the communication service, and the network slice management service device receives the throughput requirement of the network slice.

Specifically, the communication service management service device sends the throughput requirement of the one or more network slices to the network slice management service device. The network slice management service device receives the throughput requirement of the one or more network slices, and creates or updates the one or more network slices based on the throughput requirement. To be specific, if the one or more network slices have not been created, the one or more network slices are created based on the received throughput requirement; or if the one or more network slices have been created, the one or more network slices are updated based on the received throughput requirement.

S804: The communication service management service device sends a throughput analysis request for the communication service to a management data analytics device, and the management data analytics device receives the throughput analysis request for the communication service.

Specifically, the communication service management service device may send, to the management data analytics device through a standard interface, a request message used to request an analysis report of the communication service, where the request message may include one or more of the following: a communication service identifier, a performance indicator identifier, or an analysis item identifier, where the communication service identifier is used to identify a communication service or a communication service instance, so as to request analysis data of the communication service or the communication service instance corresponding to the communication service identifier. For the analysis item identifier, refer to S604. For details, refer to S505. Details are not described again.

S805: The management data analytics device analyzes a throughput of the communication service, to generate a throughput analysis report of the communication service.

Specifically, after receiving the throughput analysis request of the communication service, the management data analytics device requests a performance management device/fault management device to report a throughput performance measurement/alarm report of the communication service. The performance management device/fault management device sends the throughput performance measurement/alarm report of the communication service to the management data analytics device. The management data analytics device receives the throughput performance measurement/alarm report of the communication service, and analyzes the throughput of the communication service, to generate the throughput analysis report of the communication service.

S806: The management data analytics device sends the throughput analysis report of the communication service to the communication service management service device, and the communication service management service device receives the throughput analysis report of the communication service.

For an item included in the analysis report of the communication service, refer to the descriptions of the analysis report of the first-hierarchy managed object in S401. For example, the analysis report of the communication service may include throughput statistics data, throughput prediction data, throughput distribution data, and throughput requirement analysis data of the communication service.

Management of a resource of the communication service includes operations such as adding, modifying, and deleting the resource of the communication service. Management of a resource of the network slice associated with the communication service includes one or more of the following: adding, modifying, or deleting the resource of the network slice associated with the communication service, newly adding an associated network slice for the communication service, or deleting an unnecessary network slice from the network slice associated with the communication service. Management of a configuration parameter of the communication service or the network slice associated with the communication service includes one or more of the following: adding, modifying, or deleting the configuration parameter of the communication service or the network slice associated with the communication service. For specific content of the analysis report, refer to the analysis data in the foregoing Table 3 to Table 6. Details are not described herein again.

It should be noted that the communication service management service device may send the request message to the management data analytics device through a standard interface, where the request message is used to request the management data analytics device to feed back the analysis report of the communication service. The request message may include one or more of the following: the communication service identifier or the analysis item identifier.

It should be understood that the communication service management service device may also manage a network configuration of a network slice based on content of the foregoing analysis report of the network slice, to further improve accuracy of managing a related configuration of a performance indicator such as a throughput and/or a delay. For a specific implementation, refer to S402. Details are not described herein again.

S807: The network slice management service device sends, to the communication service management service device, a status report of the network slice associated with the communication service, and the communication service management service device receives the status report of the network slice associated with the communication service.

Specifically, for a process in which the communication service management service device obtains, from the network slice management service device, the status report of the network slice associated with the communication service, refer to the process in S508 to S510. Details are not described herein again.

For an item included in the status report of the network slice associated with the communication service, refer to the descriptions of the status report of the second-hierarchy managed object in S401. For ease of differentiation, analysis data, decision data, and execution data that may be included in the status report of the network slice associated with the communication service are respectively referred to as third analysis data, third decision data, and third execution data.

It is assumed that the third analysis data includes one or more of the following: a mapping relationship between throughput distribution and QoE of the corresponding network slice (namely, the network slice associated with the communication service, which is the same below), a difference between an actual throughput and a target throughput of the corresponding network slice and a root cause, or service information of the corresponding network slice whose throughput is unqualified.

It is assumed that the third decision data includes one or more of the following: a throughput control policy of the corresponding network slice, a network configuration quantity of the corresponding network slice, or a configuration management quantity of a network configuration maximum value or guaranteed value of the corresponding network slice. The network configuration quantity or the configuration management quantity of the network configuration maximum value or guaranteed value is decision made for analysis information or a suggestion related to operations and maintenance in the third analysis data, for example, management decision information such as adding, modifying, or deleting a resource of the related network slice and a corresponding resource quantity, or management decision information such as adding, modifying, or deleting a resource of the related network slice, newly adding a network slice, deleting the related network slice, or adding, modifying, or deleting a configuration parameter of the related network slice.

It is assumed that the third execution data includes one or more of the following: a network configuration action, a configuration quantity, or an execution result that is performed for the corresponding network slice, and is a management behavior and a management result of the network slice management service device for the third decision data.

It should be noted that S806 and S807 may be completely or partially performed. When the steps are completely performed, S807 may be performed before S806, or may be performed after S806. This is not specifically limited in this embodiment of this application. When the steps are partially performed, only one of S806 and S807 may be performed. In this case, the other step may be considered as an optional step.

S808: The communication service management service device generates fifth management indication information.

Specifically, the communication service management service device generates the fifth management indication information based on a performance indicator of the communication service and the analysis report in S806 and/or the status report in S807.

The fifth management indication information indicates the network slice management service device to manage the network slice associated with the communication service, and may specifically include one or more of the following: a management operation performed on the network slice associated with the communication service, a configuration requirement for the network slice associated with the communication service, or a performance requirement for the network slice associated with the communication service.

The management operation performed on the network slice associated with the communication service may include one or more of the following: adding a network resource of one or more network slices associated with the communication service, deleting a network resource of one or more network slices associated with the communication service, activating a network slice associated with the communication service, deactivating a network slice associated with the communication service, or modifying a parameter of one or more network slices associated with the communication service.

The following items (1), (2), and (3) separately describe, by using examples, how the communication service management service device generates the fifth management indication information.

(1) In some embodiments, the communication service management service device may generate the fifth management indication information based on a performance indicator requirement of the communication service and the analysis report of the communication service. An example is as follows.

It is assumed that the analysis report includes measurement analysis information related to the performance indicator of the communication service. When the communication service management service device determines, based on the measurement analysis information, that a measured value of the performance indicator of the communication service is lower than the performance indicator requirement of the communication service (that is, determines that there is a performance indicator difference), the generated fifth management indication information indicates (the network slice management service device) to add a resource of one or more network slices associated with the communication service, newly add a network slice associated with the communication service, or activate a network slice that is associated with the communication service and that is in a deactivated state, to improve a measurement result of the performance indicator and an SLA satisfaction degree by adding a network resource. In this case (in which the measured value is lower than the requirement), In some embodiments, the analysis report of the communication service may also include a suggestion on newly adding a resource of the network slice associated with the communication service or newly adding a network slice associated with the communication service. Therefore, the fifth management indication information may also be generated based on the suggestion. When the communication service management service device determines, based on the measurement analysis information, that a measured value of the performance indicator of the communication service is greater than the performance indicator requirement of the communication service (that is, determines that there is a performance indicator difference), the generated fifth management indication information indicates (the network slice management service device) to reduce a resource of one or more network slices associated with the communication service, delete a network slice associated with the communication service, or deactivate a network slice associated with the communication service, to reduce a resource vacancy rate and improve network resource utilization by reducing a network resource. Similarly, the analysis report of the communication service may also include a suggestion on reducing a resource of the network slice associated with the communication service or deleting or deactivating a network slice associated with the communication service. Therefore, the fifth management indication information may also be generated based on the suggestion.

In some embodiments, the communication service management service device also generates the fifth management indication information based on performance analysis information that is of the network slice associated with the communication service and that is included in the analysis report of the communication service.

(2) In some embodiments, the communication service management service device may also generate the fifth management indication information based on a performance indicator requirement of the communication service and the status report of the network slice associated with the communication service.

(2.1) In some embodiments, the communication service management service device may generate the fifth management indication information based on the analysis data (namely, the third analysis data in S807) included in the status report of the network slice associated with the communication service, for example, measurement analysis information of a performance indicator of the network slice. An example is as follows.

It is assumed that the status report includes the measurement analysis information of the performance indicator of the network slice associated with the communication service. When the communication service management service device determines, based on the measurement analysis information, that the measured value of the performance indicator of the network slice associated with the communication service is lower than the performance indicator requirement of the communication service (where the performance indicator requirement is obtained based on the performance indicator requirement of the communication service), the generated fifth management indication information indicates (the network slice management service device) to add a resource of the network slice associated with the communication service, newly add a network slice, or activate a network slice in a deactivated state, that is, add a network resource to improve a measurement result of the performance indicator. When the communication service management service device determines, based on the measurement analysis information, that the measured value of the performance indicator of the network slice associated with the communication service is greater than the performance indicator requirement of the network slice, the generated fifth management indication information indicates to reduce a resource of the network slice associated with the communication service, delete the network slice associated with the communication service, or deactivate the network slice associated with the communication service, to improve resource utilization efficiency.

In addition to the foregoing measurement analysis information of the performance indicator, the third analysis data may further include other information, and may also be used to determine the fifth management indication information. This is further described in the following by using examples.

For example, the third analysis data includes a mapping relationship between statistics on an average throughput (uplink or downlink throughput, which is the same below) level of the network slice associated with the communication service and communication service QoE. The communication service management service device may determine, based on the mapping relationship, an area whose throughput is unqualified, and may collect statistics on a proportion, in coverage of the communication service, of areas whose throughput is unqualified. For example, coverage information corresponding to a location of the terminal device is recorded when statistics on throughput information are collected. The coverage information may include information such as a geographic grid ID, longitude and latitude information, cell information, and a beam ID. The area whose throughput is unqualified or an area whose throughput is qualified may be determined based on the coverage information corresponding to the location of the terminal device, so as to calculate a QoE satisfaction degree of the coverage. The communication service management service device may obtain information about the throughput of the network slice associated with the communication service. The information about the throughput of the network slice associated with the communication service may include one or more of the following: throughput distribution location information, time information, a correspondence between a throughput and service experience QoE, service experience or QoS coverage information, and radio signal quality information at a coverage location. For example, a QoE value of a geographic grid 1 is 4, a throughput level is 4, and a signal strength level is 4; and a QoE value of a geographic grid 2 is 3, a throughput level is 4, and a signal strength level is 3. For example, the levels are 1, 2, 3, 4, and 5. The geographic grid may be a regular hexagon or square area with a side of 5 meters.

When determining that the proportion of areas whose throughput is unqualified is greater than a preset threshold, the communication service management service device determines that the throughput of the network slice associated with the communication service is unqualified. In addition, the communication service management service device may make a network configuration management policy based on the specific proportion of areas whose throughput is unqualified. For example, a corresponding resource configuration is added or a DL and/or UL throughput requirement is reduced, so as to improve a throughput requirement satisfaction degree. The communication service management service device may obtain status reports of a plurality of network slices associated with the communication service, and make a management policy, for example, request to configure more network resources for a network slice, for network configurations of the plurality of network slices based on information that is about the proportion of areas whose throughput is unqualified and that is in the plurality of status reports, the analysis report of the communication service, priority information of the network slices, resource availability information, and the like. Because the communication service management service device may obtain end-to-end network information, performance of the plurality of network slices associated with the communication service may be improved based on the new fifth management indication information, to improve performance of the communication service. For example, when a proportion, in a coverage range of a network slice, of a quantity of geographical grids corresponding to the network slice that is associated with the communication service and whose throughput level is 3 or lower exceeds 30%, it is determined that a throughput in coverage of the network slice is unqualified. In this way, the communication service management service device needs to request the network slice management service device to configure additional corresponding radio resources for scheduling a service of a terminal device in coverage of a network slice whose throughput is unqualified, to improve the throughput. For example, N additional radio resource blocks may be allocated to each terminal device with degraded performance (namely, a terminal device with degraded quality of service), where N is a positive integer, and a specific value of N is related to a radio resource management algorithm. When all throughputs of the plurality of network slices associated with the communication service are unqualified, the communication service management service device requests, based on a priority of the network slice and a resource availability status, the network slice management service device to configure different radio resource blocks for the corresponding network slice. For example, a network slice management service device 1 is requested to allocate N−10 additional radio resource blocks to each terminal device with degraded performance, and a network slice management service device 2 is requested to allocate N+10 additional radio resource blocks to each terminal device with degraded performance.

For another example, the third analysis data may include a difference between an average throughput level of the network slice associated with the communication service and a throughput target of the communication service and a root cause, and the communication service management service device may determine, based on the information, that a low throughput is caused by a high load of the communication service, so as to improve a throughput requirement satisfaction degree by adding a resource configuration.

For example, the communication service management service device determines a load of the coverage based on one or more of the following: a quantity of users in the coverage of the communication service, a user traffic volume, or a radio resource proportion. For example, when there are more than two users in each geographic grid, the user traffic volume exceeds 10 megabits per second (megabits per second, Mbps), and the radio resource proportion exceeds 70%, it can be determined that the load of the coverage is high. In this way, the communication service management service device may improve a throughput of an online user through one or more of the following: reducing a service rate of the terminal device, restricting access of a new terminal device, restricting creation of a new service, and adding a radio resource configuration.

For another example, the third analysis data may include a list of cells/base stations with degraded average throughput performance of the network slice associated with the communication service, and the communication service management service device may obtain, from the data, a list of cells or base stations whose throughput is unqualified, so as to request the network slice management service device to perform a corresponding management behavior for the cells or base stations. The communication service management service device may further request the network slice management service device to perform the corresponding management behavior. For example, if the proportion, in a range of a cell, of a quantity of geographic grids corresponding to a throughput level 3 or lower exceeds 30%, it may be considered that a throughput of the cell is unqualified. Further, an identifier of the unqualified cell and an identifier of a base station corresponding to the unqualified cell may be added to the list of base stations or cells whose throughput is unqualified. In this way, the network slice management service device may add a radio access network resource in the cell whose throughput is unqualified, to improve an uplink throughput of the cell.

For another example, the third analysis data may include statistics data about a quantity of terminal devices/a quantity of connections/signal strength distribution/service type distribution in coverage with degraded average throughput performance of the network slice associated with the communication service. The communication service management service device may obtain, from the statistics data, a quantity of users, a quantity of links, radio signal quality information, and service type information in an area whose throughput is unqualified, so as to perform a corresponding management behavior for a base station or a cell. For example, the communication service management service device adds a radio access network resource or manages a load balancing policy in the cell, so as to improve an uplink throughput of the cell.

In an example, the communication service management service device hands over some services or terminal devices to another cell or another frequency band, so that the services or terminal devices are evenly distributed in coverage overlapping areas of neighboring cells or different frequencies. For example, a quantity of users in each cell or frequency band is maintained in a range of 30 to 50, and an average traffic volume in each geographic grid is maintained as about 10 Mbps.

For another example, the third analysis data may include QoS measurement analysis of a service with a degraded average throughput performance of the network slice associated with the communication service, and the communication service management service device may obtain, through analysis from the data, measurement information of a QoS flow corresponding to a service whose throughput is unqualified. The measurement information of the QoS flow may include but is not limited to a delay, a rate, and a packet loss rate. Further, the communication service management service device may obtain a correspondence between a throughput, a QoS flow configuration, and QoS indicator measurement. In this way, the communication service management service device may change a DL and/or UL throughput by managing a QoS priority configuration.

For example, the communication service management service device compares priority configuration information of the QoS flow with actual measurement information of the QoS flow. The priority configuration information of the QoS flow may include a QoS flow type. The QoS flow type may include values such as 3, 5, 7, and 9, and each value represents indicator information such as a priority, a delay, a rate, and a packet loss rate of the QoS flow. If an indicator in the actual measurement information is lower than a preset proportion of the corresponding indicator in the priority configuration information, the communication service management service device may increase the priority of the QoS flow by n levels, where n is a positive integer. For example, if a rate in the actual measurement information is lower than 80% of a rate in the priority configuration information, the communication service management service device may increase the priority of the QoS flow by one level. The communication service management service device increases the priority of the QoS flow, so that the corresponding terminal device or service can obtain more resources during scheduling, to improve the DL throughput and/or the UL throughput.

(2.2) In some embodiments, the communication service management service device may further generate the fifth management indication information based on decision data (namely, the third decision data in S807) and/or the execution data (namely, the third execution data in S807) in the status report of the network slice associated with the communication service.

When the decision information includes information such as adding a network slice resource, newly adding a network slice, reducing a resource, or deleting a network slice, the communication service management service device determines, based on a current network resource availability status, communication service analysis information, execution result information, and a status report of another network slice, whether decision of the network slice management service device is valid, and determines whether to maintain the decision of the network slice management service device or modify the decision of the network slice management service device. Alternatively, the status report of the network slice associated with the communication service may include the decision information of the network slice but does not include execution result information, and may indicate whether the decision information has been executed. If the decision information is not executed, it indicates that the network slice management service device requests the communication service management service device to determine feasibility of the decision information. In this case, the communication service management service device may adjust or improve the decision information based on a network resource managed by the communication service management service device, to generate the fifth management indication information. For example, the communication service management service device determines whether resources of the quantity that is in the decision information can be allocated, and performs adjustment based on a determining result, to form the fifth management indication information.

(3) In some embodiments, the communication service management service device may further generate the fifth management indication information based on the performance indicator requirement of the communication service, the analysis report of the communication service, and the status report of the network slice associated with the communication service. An example is as follows.

When the communication service management service device determines that information indicated by the analysis report of the communication service is consistent with information indicated by the status report of the network slice associated with the communication service, for example, determines, based on the analysis report of the communication service, that a measured value of the performance indicator of the communication service is lower than (or higher than) the performance indicator requirement of the communication service, and determines, based on the status report of the network slice associated with the communication service, that a measured value of a performance indicator corresponding to the network slice is lower than (or higher than) a performance indicator requirement (obtained based on the performance indicator requirement of the communication service) of the network slice, and when resource utilization of the network slice is lower than (or higher than) a preset threshold, the communication service management service device determines that a resource configuration of one or more network slices needs to be added (or reduced), and the generated fifth management indication information indicates (the network slice management service device) to add (or reduce) a resource configuration of a network slice. When the communication service management service device determines that information indicated by the analysis report of the communication service is inconsistent with information indicated by the status report of the network slice associated with the communication service, the communication service management service device determines, based on status reports and historical statuses of a plurality of network slices, to add, maintain, or reduce a resource configuration of a network slice, and the generated fifth management indication information indicates to add, maintain, or reduce the resource configuration of the network slice.

It should be noted that for specific content of the analysis report of the communication service and the status report of the network slice associated with the communication service, refer to the descriptions in S401. Details are not described herein again.

In some embodiments, the communication service management service device may first determine a third management operation set based on the performance indicator requirement of the communication service, the analysis report of the communication service, and/or the status report of the network slice associated with the communication service, and then generate the fifth management indication information based on the third management operation set. The third management operation set is a set of management operations to be performed on the network slice associated with the communication service, and includes any one or more of the following: adding a network slice, deleting a network slice, modifying a network configuration of a network slice, and modifying a running parameter of a network slice.

It should be understood that the fifth management indication information is also referred to as configuration requirement information.

S809: The communication service management service device sends the fifth management indication information to the network slice management service device, and the network slice management service device receives the fifth management indication information.

Specifically, for a manner in which the communication service management service device sends the fifth management indication information to the network slice management service device, refer to the descriptions in S512. Details are not described herein again. The network slice management service device receives the fifth management indication information, and manages the network slice based on the fifth management indication information, for example, adds a network slice, deletes a network slice, or modifies a network configuration of a network slice.

In some embodiments, the network slice management service device sends, to the communication service management service device, a result of managing the network slice, for example, an identifier of the added network slice, indication information indicating that the configuration of the network slice is successfully modified, or indication information indicating that the network slice is successfully deleted.

In the method procedure corresponding to FIG. 8, the communication service management service device may determine a network configuration difference based on a performance indicator requirement of a communication service instance managed by the communication service management service device and an analysis report of the communication service instance and/or a status report of a network slice included in or associated with the communication service instance, and then manage the network slice based on the network configuration difference, to eliminate or reduce the network configuration difference, and further eliminate or reduce a difference between the actual performance indicator and the specified performance indicator requirement that are of the communication service instance, so that consistency between the two is improved, and both a satisfaction degree of the performance indicator requirement of the communication service instance and utilization of a network resource allocated to the communication service instance are ensured.

According to the network management method in any one of FIG. 4 to FIG. 8, a network management device at each hierarchy may determine a network configuration difference based on a performance indicator requirement of a managed object at the management hierarchy of the network management device, and an analysis report of the managed object at the hierarchy and/or a status report of a next-hierarchy managed object included in or associated with the managed object at the hierarchy, and then manage the next-hierarchy managed object based on the network configuration difference, to eliminate or reduce the network configuration difference. In this way, a difference between an actual performance indicator and the specified performance indicator requirement that are of the managed object at the hierarchy is eliminated or reduced, consistency between the two is improved, and a satisfaction degree of the performance indicator requirement of the managed object at the hierarchy and utilization of a network resource allocated to the managed object at the hierarchy are ensured.

The network management method provided in embodiments of this application is described above in detail with reference to FIG. 4 to FIG. 8. The following describes in detail, with reference to FIG. 9 and FIG. 10, a network management apparatus configured to perform the network management method provided in embodiments of this application.

Figure 9:
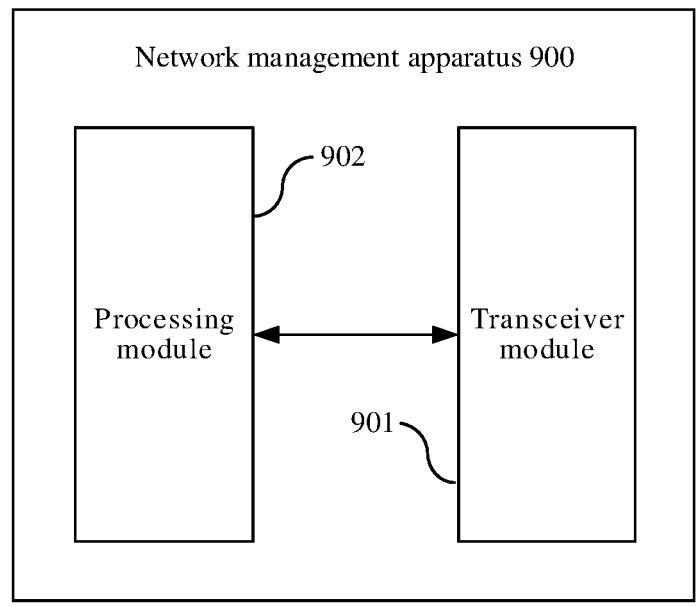
FIG. 9 is a schematic diagram 1 of a structure of a network management apparatus according to an embodiment of this application.

FIG. 9 is a schematic diagram 1 of a structure of a network management apparatus 900 according to an embodiment of this application. The apparatus is used in a first-hierarchy network management device. The first-hierarchy network management device is connected to a second-hierarchy network management device, the first-hierarchy network management device and the second-hierarchy network management device separately manage managed objects at different hierarchies, and the managed object is a device, a network, or a service provided by the network. As shown in FIG. 9, the network management apparatus 900 includes a transceiver module 901 and a processing module 902. For ease of description, FIG. 9 shows only main components of the network management apparatus 900.

In some embodiments, the network management apparatus 900 may be used in the network management system shown in FIG. 1 or FIG. 2, and may perform a function of the first-hierarchy network management device in the network management method shown in any one of FIG. 4 to FIG. 8.

Specifically, the transceiver module 901 is configured to support the first-hierarchy network management device in communicating with another network entity, for example, performing S507, S510, S603, S706, S809, or an indication operation in S402.

The processing module 902 is used as a control function of the first-hierarchy network management device, for example, control the transceiver module 901 to perform S401, an indication operation in S402, S511, S608, or S808. For specific implementations of the transceiver module 901 and the processing module 902, refer to related content in the method embodiment shown in any one of FIG. 4 to FIG. 8. Details are not described herein again.

In some embodiments, the transceiver module 901 may include a receiving module and a sending module (not shown in FIG. 9). The receiving module is configured to receive information sent by another device, for example, the second-hierarchy network management device or a management data analytics service device, and the sending module is configured to send information to another device, for example, the second-hierarchy network management device or a management data analytics service device.

In some embodiments, the network management apparatus 900 may further include a storage module (not shown in FIG. 9), and the storage module stores a program or instructions. When the processing module 902 executes the program or the instructions, the network management apparatus 900 may perform the network management method shown in any one of FIG. 4 to FIG. 8.

It should be noted that the network management apparatus 900 may be a network management device, for example, an operations, administration, and maintenance (operation administration and maintenance, OAM) device, a business support system (business support system, BSS) device, or an operations support system (operations support system, OSS) device, or may be a chip (system) or another component that may be disposed in the network management device, or may be an apparatus including the network management device. This is not limited in this application.

In addition, for a technical effect of the network management apparatus 900, refer to a technical effect of the network management method shown in any one of FIG. 4 to FIG. 8. Details are not described herein again.

Figure 10:
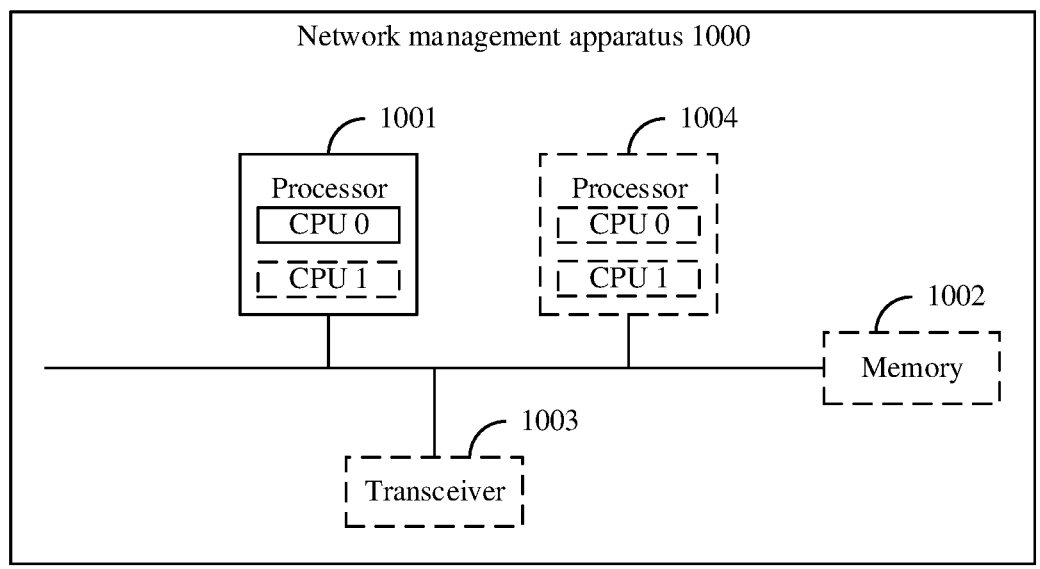
FIG. 10 is a schematic diagram 2 of a structure of a network management apparatus according to an embodiment of this application.

For example, FIG. 10 is a schematic diagram 2 of a structure of a network management apparatus according to an embodiment of this application. The network management apparatus may be a network management device, such as an OAM device, a BSS device, or an OSS device, or may be a chip (system) or another component or assembly that may be disposed in the network management device, or may be an apparatus including the network management device. As shown in FIG. 10, the network management apparatus 1000 may include a processor 1001. In some embodiments, the network management apparatus 1000 may further include a memory 1002 and/or a transceiver 1003. The processor 1001 is coupled to the memory 1002 and the transceiver 1003, for example, may be connected to the memory 1002 and the transceiver 1003 through a communication bus.

The following describes each composition component of the network management apparatus 1000 in detail with reference to FIG. 10.

The processor 1001 is a control center of the network management apparatus 1000, and may be one processor, or may be a collective term of a plurality of processing elements. For example, the processor 1001 is one or more central processing units (central processing units, CPUs), or may be an application-specific integrated circuit (application-specific integrated circuit, ASIC), or is configured as one or more integrated circuits implementing embodiments of this application, for example, one or more microprocessors (digital signal processors, DSPs) or one or more field programmable gate arrays (field programmable gate arrays, FPGAs).

In some embodiments, the processor 1001 may perform various functions of the network management apparatus 1000 by running or executing a software program stored in the memory 1002 and invoking data stored in the memory 1002.

During a specific implementation, in an embodiment, the processor 1001 may include one or more CPUs, for example, a CPU 0 and a CPU 1 in FIG. 10.

During specific implementation, in an embodiment, the network management apparatus 1000 may also include a plurality of processors, for example, the processor 1001 and a processor 1004 shown in FIG. 10. Each of the processors may be a single-core processor (single-CPU) or a multi-core processor (multi-CPU). The processor herein may be one or more devices, circuits, and/or processing cores configured to process data (for example, computer program instructions).

The memory 1002 is configured to store the software program for executing the solutions in this application, and the processor 1001 controls execution. For a specific implementation, refer to the foregoing method embodiments. Details are not described herein again.

In some embodiments, the memory 1002 may be a read-only memory (read-only memory, ROM) or another type of static storage device that can store static information and instructions, or a random access memory (random access memory, RAM) or another type of dynamic storage device that can store information and instructions; or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 1002 may be integrated with the processor 1001, or may exist independently, and is coupled to the processor 1001 through an interface circuit (not shown in FIG. 10) of the network management apparatus 1000. This is not specifically limited in this embodiment of this application.

The transceiver 1003 is configured to communicate with another network management apparatus. For example, the network management apparatus 1000 is a network management device, and the transceiver 1003 may be configured to communicate with a managed network, or communicate with another network management device, to obtain an analysis report and/or a status report of the managed network.

In some embodiments, the transceiver 1003 may include a receiving module and a sending module (not separately shown in FIG. 10). The receiving module may be configured to receive information about the managed network or another network management device. The sending module may be configured to send information to the managed network or another network management device. The transceiver 1003 may implement functions that can be implemented by the transceiver module 901 in FIG. 9.

In some embodiments, the transceiver 1003 may be integrated with the processor 1001, or may exist independently, and is coupled to the processor 1001 through an interface circuit (not shown in FIG. 10) of the network management apparatus 1000. This is not specifically limited in this embodiment of this application.

It should be noted that a structure of the network management apparatus 1000 shown in FIG. 10 does not constitute a limitation on the network management apparatus. An actual network management apparatus may include more or fewer components than those shown in the figure, combine some components, or have different component arrangements.

In addition, for a technical effect of the network management apparatus 1000, refer to a technical effect of the network management method shown in the foregoing method embodiments. Details are not described herein again.

An embodiment of this application further provides a chip system including a processor. The processor is coupled to a memory. The memory is configured to store a program or instructions. When the program or the instructions are executed by the processor, the chip system is enabled to implement the method according to any one of the foregoing method embodiments.

In some embodiments, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

In some embodiments, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (field programmable gate array, FPGA), an application-specific integrated circuit (application-specific integrated circuit, ASIC), a system-on-a-chip (system-on-a-chip, SoC), a central processing unit (central processing unit, CPU), a network processor (network processor, NP), a digital signal processor (digital signal processor, DSP), a microcontroller unit (microcontroller unit, MCU), a programmable logic device (programmable logic device, PLD), or another integrated chip.

An embodiment of this application further provides a network management system. The network management system includes a first-hierarchy network management device and a second-hierarchy network management device.

The first-hierarchy network management device is applicable to the network management system shown in FIG. 1 or FIG. 2, and performs a function of the first-hierarchy network management device in the network management method shown in any one of FIG. 4 to FIG. 8. The second-hierarchy network management device is applicable to the network management system shown in FIG. 1 or FIG. 2, and performs a function of the second-hierarchy network management device in the network management method shown in any one of FIG. 4 to FIG. 8. For specific implementation, refer to the foregoing method embodiments, and details are not described herein again.

It should be understood that, the processor in embodiments of this application may be a central processing unit (central processing unit, CPU). The processor may alternatively be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any processor or the like.

It should be further understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. Through an example rather than a limitative description, random access memories (random access memories, RAMs) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In embodiments of this application, "at least one" means one or more, and "a plurality of" means two or more. The term "at least one of the following (items)" or a similar term refers to any combination of those items, including any combination of singular item or plural items. For example, at least one item (piece) of a, b, or c may indicate a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or a part contributing to the technology of some approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A network management method comprising:
obtaining, by a first-hierarchy network management device, at least one of an analysis report of a first-hierarchy managed object from a management data analytics device, or a status report of at least one second-hierarchy managed object from a second-hierarchy network management device, wherein the first-hierarchy network management device is connected to the second-hierarchy network management device, the first-hierarchy network management device and the second-hierarchy network management device are configured to separately manage managed objects of different hierarchies, a managed object of the managed objects is a device, a network, or a service provided by the network; and
indicating, based on a performance indicator requirement of the first-hierarchy managed object and at least one of the analysis report or the status report, to the second-hierarchy network management device to manage the at least one second-hierarchy managed object, wherein
the first-hierarchy managed object comprises the at least one second-hierarchy managed object or is associated with the at least one second-hierarchy managed object.

2. The network management method according to claim 1, wherein the indicating to the second-hierarchy network management device to manage the second-hierarchy managed object comprises:
generating management indication information based on the performance indicator requirement of the first-hierarchy managed object and at least one of the analysis report or the status report; and
sending the management indication information to the second-hierarchy network management device, wherein
the management indication information comprises at least one of:
configuration operation information comprising a configuration operation to be performed on the at least one second-hierarchy managed object;
configuration requirement information comprising a configuration requirement for the at least one second-hierarchy managed object; or
performance indicator requirement information comprising a performance indicator requirement for the at least one second-hierarchy managed object.

3. The network management method according to claim 2, wherein the management indication information comprises the configuration operation information, and the configuration operation information further comprises at least one:
adding the at least one second-hierarchy managed object;
deleting the at least one second-hierarchy managed object; or
modifying configuration information of the at least one second-hierarchy managed object.

4. The network management method according to claim 2, wherein the generating management indication information based on the performance indicator requirement of the first-hierarchy managed object and at least one of the analysis report or the status report comprises:
determining a network configuration difference based on the performance indicator requirement of the first-hierarchy managed object and at least one of the analysis report or the status report, wherein the network configuration difference is a difference between the at least one second-hierarchy managed object and at least another second-hierarchy managed object that is to be comprised in the first-hierarchy managed object or is to be associated with the first-hierarchy managed object, and that is determined based on the performance indicator requirement and at least one of the analysis report or the status report; and
generating the management indication information based on the network configuration difference.

5. The network management method according to claim 2, wherein the generating management indication information based on the performance indicator requirement of the first-hierarchy managed object and at least one of the analysis report or the status report comprises:
determining a performance indicator difference based on the performance indicator requirement of the first-hierarchy managed object and at least one of the analysis report or the status report, wherein the performance indicator difference is a difference between a measurement result of a performance indicator of the first-hierarchy managed object and the performance indicator requirement of the first-hierarchy managed object; and
generating the management indication information based on the performance indicator difference.

6. The network management method according to claim 2, wherein the sending the management indication information to the second-hierarchy network management device comprises:
sending a closed-loop control management message to the second-hierarchy network management device, wherein the closed-loop control management message comprises the management indication information.

7. The network management method according to claim 1, wherein the obtaining the analysis report of the first-hierarchy managed object from the management data analytics device comprises:
sending an analysis report subscription request message to the management data analytics device, wherein the analysis report subscription request message comprises an identifier of the first-hierarchy managed object; and receiving an analysis report notification message from the management data analytics device, wherein the analysis report notification message comprises the analysis report of the first-hierarchy managed object; or
sending an analysis report request message to the management data analytics device, wherein the analysis report request message comprises the identifier of the first-hierarchy managed object; and receiving an analysis report response message from the management data analytics device, wherein the analysis report response message comprises the analysis report of the first-hierarchy managed object.

8. The network management method according to claim 1, wherein the analysis report of the first-hierarchy managed object comprises at least one of information related to a performance indicator of the first-hierarchy managed object or resource information of the first-hierarchy managed object.

9. The network management method according to claim 8, wherein
the information related to the performance indicator of the first-hierarchy managed object is statistics information or prediction information of a measured value of the performance indicator of the first-hierarchy managed object, or a difference between a measurement result of the performance indicator of the first-hierarchy managed object and the performance indicator requirement of the first-hierarchy managed object; and
the resource information of the first-hierarchy managed object is statistics information or prediction information of a remaining resource amount of the first-hierarchy managed object, or statistics information or prediction information of resource utilization of the first-hierarchy managed object.

10. The method according to claim 1, wherein the obtaining the status report of the at least one second-hierarchy managed object from the second-hierarchy network management device comprises:
sending an operations and maintenance status request message to the second-hierarchy network management device, wherein the operations and maintenance status request message comprises an identifier of the at least one second-hierarchy managed object; and receiving an operations and maintenance status response message from the second-hierarchy network management device, wherein the operations and maintenance status response message comprises the status report of the at least one second-hierarchy managed object; or
sending an operations and maintenance status subscription request message to the second-hierarchy network management device, wherein the operations and maintenance status subscription request message comprises the identifier of the at least one second-hierarchy managed object; and receiving an operations and maintenance status notification message from the second-hierarchy network management device, wherein the operations and maintenance status notification message comprises the status report of the at least one second-hierarchy managed object.

11. The method according to claim 1, wherein
the status report comprises analysis data, and the analysis data comprises at least one of:
a mapping relationship between throughput distribution and service experience of the at least one second-hierarchy managed object, a difference between an actual throughput of the at least one second-hierarchy managed object and a target throughput of the at least one second-hierarchy managed object and a cause of the difference between an actual throughput of the at least one second-hierarchy managed object and a target throughput of the at least one second-hierarchy managed object, or information of a service that is included by the at least one second-hierarchy managed object and has a throughput that is unqualified;
the status report comprises decision data, and the decision data comprises at least one of:
a throughput control policy of the at least one second-hierarchy managed object, management behavior for the at least one second-hierarchy managed object, or resource or parameter configuration information; or
the status report comprises execution data, and the execution data comprises at least one of:
management behavior executed by the second-hierarchy network management device, a resource or parameter configuration quantity, or an execution result.

12. The network management method according to claim 1, wherein
the first-hierarchy network management device is a network slice management service device,
the first-hierarchy managed object is a network slice,
the second-hierarchy network management device is a network slice subnet management service device, and
the at least one second-hierarchy managed object is a network slice subnet.

13. The network management method according to claim 1, wherein
the first-hierarchy network management device is a network slice subnet management service device,
the first-hierarchy managed object is a network slice subnet,
the second-hierarchy network management device is a management device of a network element in the network slice subnet, and
the at least one second-hierarchy managed object is a device in the network slice subnet.

14. The network management method according to claim 1, wherein
the first-hierarchy network management device is a communication service management service device,
the first-hierarchy managed object is a communication service or a communication service instance,
the second-hierarchy network management device is a network slice management service device, and
the at least one second-hierarchy managed object is a network slice management service.

15. A first-hierarchy network management device comprising:
at least one processor, and one or more memories coupled to the at least one processor, the one or more memories configured to store non-transitory instructions, and the at least one processor configured to execute the non-transitory instructions to thereby cause the first-hierarchy network management device to:
obtain at least one of an analysis report of a first-hierarchy managed object from a management data analytics device, or a status report of at least one second-hierarchy managed object from a second-hierarchy network management device; and
indicate, based on a performance indicator requirement of the first-hierarchy managed object and at least one of the analysis report or the status report, to the second-hierarchy network management device to manage the at least one of second-hierarchy managed object, wherein
the first-hierarchy managed object comprises the at least one second-hierarchy managed object or is associated with the at least one second-hierarchy managed object, wherein the first-hierarchy network management device is connected to a second-hierarchy network management device, the first-hierarchy network management device and the second-hierarchy network management device are configured to separately manage managed objects at different hierarchies, a managed object is a device, a network, or a service provided by the network.

16. The first-hierarchy network management device according to claim 15, wherein the at least one processor is further configured to execute the non-transitory instructions to further cause the first-hierarchy network management device to:
generate management indication information based on the performance indicator requirement of the first-hierarchy managed object and at least one of the analysis report or the status report; and
send the management indication information to the second-hierarchy network management device, wherein the management indication information comprises at least one of:
configuration operation information comprising a configuration operation to be performed on the at least one second-hierarchy managed object;
configuration requirement information comprising a configuration requirement for the at least one second-hierarchy managed object; or
performance indicator requirement information comprising a performance indicator requirement for the at least one second-hierarchy managed object.

17. The first-hierarchy network management device according to claim 16, wherein the management indication information comprises the configuration operation information, and the configuration operation information further comprises at least one of:
adding the at least one second-hierarchy managed object;
deleting the at least one second-hierarchy managed object; or
modifying configuration information of the at least one second-hierarchy managed object.

18. The first-hierarchy network management device according to claim 15, wherein the at least one processor is further configured to execute the non-transitory instructions to further cause the first-hierarchy network management device to:
send an analysis report subscription request message to the management data analytics device, wherein the analysis report subscription request message comprises an identifier of the first-hierarchy managed object; and receive an analysis report notification message from the management data analytics device, wherein the analysis report notification message comprises the analysis report of the first-hierarchy managed object; or
send an analysis report request message to the management data analytics device, wherein the analysis report request message comprises the identifier of the first-hierarchy managed object; and receive an analysis report response message from the management data analytics device, wherein the analysis report response message comprises the analysis report of the first-hierarchy managed object.

19. The first-hierarchy network management device according to claim 15, wherein
the information related to the performance indicator of the first-hierarchy managed object is statistics information or prediction information of a measured value of the performance indicator of the first-hierarchy managed object, or a difference between a measurement result of the performance indicator of the first-hierarchy managed object and the performance indicator requirement of the first-hierarchy managed object; and
resource information of the first-hierarchy managed object is statistics information or prediction information of a remaining resource amount of the first-hierarchy managed object, or statistics information or prediction information of resource utilization of the first-hierarchy managed object.

20. The first-hierarchy network management device according to claim 15, wherein
the status report comprises analysis data, and the analysis data comprises at least one of:
a mapping relationship between throughput distribution and service experience of the at least one second-hierarchy managed object, a difference between an actual throughput of the at least one second-hierarchy managed object and a target throughput of the at least one second-hierarchy managed object and a cause of the difference between an actual throughput of the at least one second-hierarchy managed object and a target throughput of the at least one second-hierarchy managed object, or information of a service that is included by the at least one second-hierarchy managed object and has a throughput that is unqualified;
the status report comprises decision data, and the decision data comprises at least one of:
a throughput control policy of the at least one second-hierarchy managed object, management behavior for the at least one second-hierarchy managed object, or resource or parameter configuration information; or
the status report comprises execution data, and the execution data comprises at least one of:
management behavior executed by the second-hierarchy network management device, a resource or parameter configuration quantity, or an execution result.

* * * * *